United States Patent
Ko et al.

(10) Patent No.: US 9,887,850 B2
(45) Date of Patent: Feb. 6, 2018

(54) BROADCASTING SIGNAL TRANSMITTER/RECEIVER AND BROADCASTING SIGNAL TRANSMISSION/RECEPTION METHOD

(75) Inventors: Woo Suk Ko, Seoul (KR); Sangchul Moon, Seoul (KR); Jeong Hwan Park, Seoul (KR); Ho Taek Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 942 days.

(21) Appl. No.: 13/884,180

(22) PCT Filed: Feb. 8, 2011

(86) PCT No.: PCT/KR2011/000822
§ 371 (c)(1),
(2), (4) Date: Sep. 9, 2013

(87) PCT Pub. No.: WO2011/099749
PCT Pub. Date: Aug. 18, 2011

(65) Prior Publication Data
US 2013/0343468 A1 Dec. 26, 2013

Related U.S. Application Data

(60) Provisional application No. 61/304,023, filed on Feb. 12, 2010.

(51) Int. Cl.
*H04N 5/44* (2011.01)
*H04L 12/18* (2006.01)
(Continued)

(52) U.S. Cl.
CPC .......... *H04L 12/18* (2013.01); *H04H 20/42* (2013.01); *H04H 60/73* (2013.01);
(Continued)

(58) Field of Classification Search
None
See application file for complete search history.

(56) References Cited

U.S. PATENT DOCUMENTS

| 8,625,699 B1 | 1/2014 | Lou et al. |
| 2005/0159115 A1* | 7/2005 | Sandhu ............... H04L 1/0068 455/101 |

(Continued)

FOREIGN PATENT DOCUMENTS

| EP | 1806931 A2 | 7/2007 |
| EP | 2079183 A2 | 7/2009 |

(Continued)

OTHER PUBLICATIONS

U.S. Office action corresponding to U.S. Appl. No. 14/524,624 dated Apr. 6, 2017, 12 pages.

*Primary Examiner* — Andy Rao
*Assistant Examiner* — Samuel D Fereja
(74) *Attorney, Agent, or Firm* — Dentons US LLP

(57) ABSTRACT

A broadcasting signal reception method according to the present invention comprises the following steps: OFDM-demodulating by receiving a plurality of broadcasting signals, which contain a transmission frame for transmitting a broadcasting service; outputting the transmission frame by decoding a plurality of OFDM-demodulated broadcasting signals with at least one method among MIMO, MISO, and SISO; and selectively decoding a plurality of PLP's, which are included in the transmission frame, using signaling information included in the transmission frame. In particular, PSI/SI such as PAT/PMT can be transmitted through an arbitrary PLP among the plurality of PLP's; and in the transmitter, an arbitrary PLP, which transmits the PAT/PMP, can be decoded first to enable a search of all PLP's that (Continued)

transmit components included in a single broadcasting service, and a plurality of PLP's can be decoded selectively.

12 Claims, 51 Drawing Sheets

(51) Int. Cl.

| | | |
|---|---|---|
| H04H 20/42 | (2008.01) | |
| H04L 1/00 | (2006.01) | |
| H04N 21/2343 | (2011.01) | |
| H04N 21/235 | (2011.01) | |
| H04N 21/2383 | (2011.01) | |
| H04N 21/435 | (2011.01) | |
| H04N 21/438 | (2011.01) | |
| H04N 21/61 | (2011.01) | |
| H04L 5/00 | (2006.01) | |
| H04L 27/26 | (2006.01) | |
| H04H 60/73 | (2008.01) | |
| H04N 21/2365 | (2011.01) | |
| H04N 21/434 | (2011.01) | |

(52) U.S. Cl.
CPC .......... *H04L 1/0041* (2013.01); *H04L 1/0045* (2013.01); *H04L 5/0023* (2013.01); *H04L 5/0053* (2013.01); *H04L 27/2602* (2013.01); *H04N 5/4401* (2013.01); *H04N 21/235* (2013.01); *H04N 21/2383* (2013.01); *H04N 21/234327* (2013.01); *H04N 21/435* (2013.01); *H04N 21/4382* (2013.01); *H04N 21/6131* (2013.01); *H04L 27/2626* (2013.01); *H04L 27/2647* (2013.01); *H04N 21/2365* (2013.01); *H04N 21/4345* (2013.01)

(56) References Cited

U.S. PATENT DOCUMENTS

| | | | |
|---|---|---|---|
| 2005/0275752 A1* | 12/2005 | Li ...................... H04N 7/17318 348/398.1 |
| 2006/0093067 A1* | 5/2006 | Jalali ...................... H04L 5/023 375/299 |
| 2008/0039107 A1* | 2/2008 | Ma ............................ H04B 7/02 455/450 |
| 2008/0092163 A1* | 4/2008 | Song ...................... H04H 20/16 725/39 |
| 2008/0134165 A1* | 6/2008 | Anderson ................. G06F 8/65 717/173 |
| 2008/0201746 A1* | 8/2008 | Xu .......................... H04H 60/72 725/54 |
| 2009/0028253 A1 | 1/2009 | Wu et al. |
| 2009/0067384 A1* | 3/2009 | Himmanen ............ H04H 20/30 370/330 |
| 2009/0116374 A1 | 5/2009 | Henriksson et al. |
| 2009/0190677 A1 | 7/2009 | Jokela et al. |
| 2009/0196217 A1 | 8/2009 | Himmanen et al. |
| 2009/0203326 A1* | 8/2009 | Vesma ................... H04H 60/73 455/69 |
| 2009/0219918 A1 | 9/2009 | Lee et al. |
| 2009/0225822 A1* | 9/2009 | Tupala ................ H04L 27/2659 375/226 |
| 2009/0328099 A1* | 12/2009 | Praden ............... H04N 5/44543 725/39 |
| 2010/0002696 A1* | 1/2010 | Vare ..................... H04L 12/1836 370/390 |
| 2010/0040091 A1* | 2/2010 | Kamalizad ............... H04B 3/54 370/503 |
| 2010/0083311 A1* | 4/2010 | Vare ........................ H04N 7/163 725/39 |
| 2010/0111157 A1 | 5/2010 | Sawai |
| 2010/0195633 A1* | 8/2010 | Vare .................... H04W 36/385 370/338 |
| 2010/0220708 A1 | 9/2010 | Mantravadi et al. |
| 2010/0226426 A1* | 9/2010 | Tupala ................... H04H 20/72 375/240.01 |
| 2010/0250764 A1* | 9/2010 | Vare ............... H04N 21/234327 709/231 |
| 2010/0272210 A1* | 10/2010 | Kwon ................... H04L 27/183 375/295 |
| 2010/0313236 A1* | 12/2010 | Straub ................ H04N 21/4349 725/146 |
| 2010/0322349 A1 | 12/2010 | Lee et al. |
| 2011/0286535 A1 | 11/2011 | Ko et al. |
| 2012/0121032 A1 | 5/2012 | Sandhu |
| 2012/0170540 A1 | 7/2012 | Khan |
| 2012/0300690 A1* | 11/2012 | Vare ..................... H04L 1/0079 370/312 |
| 2012/0320994 A1 | 12/2012 | Loghin et al. |
| 2012/0321023 A9 | 12/2012 | Li et al. |
| 2013/0205344 A1* | 8/2013 | Lee ........................ H04H 20/93 725/54 |
| 2014/0157330 A1* | 6/2014 | Xu .......................... H04H 20/22 725/62 |
| 2014/0269515 A1* | 9/2014 | Zhao ................. H04L 29/12207 370/328 |
| 2014/0348271 A1 | 11/2014 | Ma et al. |
| 2014/0369432 A1 | 12/2014 | Schwager et al. |
| 2015/0163548 A1* | 6/2015 | Ospalik ............. H04N 7/17318 725/37 |
| 2016/0028515 A1 | 1/2016 | Schwager et al. |
| 2016/0043784 A1 | 2/2016 | Ling et al. |
| 2016/0080049 A1 | 3/2016 | Lastinger et al. |

FOREIGN PATENT DOCUMENTS

| | | |
|---|---|---|
| KR | 10-2009-0076589 A | 7/2009 |
| KR | 1020090076589 | 7/2009 |
| WO | WO 2005-032035 A1 | 4/2005 |
| WO | 2008/130168 A1 | 10/2008 |
| WO | 2008/147162 A1 | 12/2008 |
| WO | WO 2009-136733 A2 | 11/2009 |

* cited by examiner

FIG. 35

| | |
|---|---|
| for i=0..NUM_PLP-1 { | |
| PLP_ID | (8 bits) |
| PLP_GROUP_ID | (8 bits) |
| PLP_TYPE | (3 bits) |
| PLP_PAYLOAD_TYPE | (5 bits) |
| PLP_COMPONENT_TYPE | (x bits) |
| PLP_COD | (3 bits) |
| PLP_MOD | (3 bits) |
| PLP_FEC_TYPE | (2 bits) |
| } | |

FIG. 36

| | |
|---|---|
| for i=0..NUM_PLP-1 { | |
| PLP_ID | (8 bits) |
| PLP_GROUP_ID | (8 bits) |
| PLP_TYPE | (3 bits) |
| PLP_PAYLOAD_TYPE | (5 bits) |
| PLP_COMPONENT_TYPE | (8 bits) |
| PLP_PROFILE | (8 bits) |
| PLP_COD | (3 bits) |
| PLP_MOD | (3 bits) |
| PLP_FEC_TYPE | (2 bits) |
| } | |

FIG. 38

| Name | No.of bits | Identifier |
|---|---|---|
| delivery_system_descriptor() { | | |
|   descriptor_tag | 8 | uimsbf |
|   descriptor_length | 8 | uimsbf |
|   system_id | 16 | uimsbf |
|   PLP_GROUP_ID | 8 | uimsbf |
|   if (descriptor_length > 3) { | | |
|     system_parameters() | | |
|     for (i=0; i<N; i++) { | | |
|       cell_parameters() | | |
|     } | | |
|   } | | |
| } | | |

FIG. 41

| Name | No.of bits | Identifier |
|---|---|---|
| component_id_descriptor() { | | |
|   descriptor_tag | 8 | uimsbf |
|   descriptor_length | 8 | uimsbf |
|   system_id | 16 | uimsbf |
|   PLP_ID | 8 | uimsbf |
|   PLP_COMPONENT_TYPE | 8 | uimsbf |
| } | | |

FIG. 44

| Name | No.of bits | Identifier |
|---|---|---|
| delivery_system_descriptor() { | | |
|   descriptor_tag | 8 | uimsbf |
|   descriptor_length | 8 | uimsbf |
|   system_id | 16 | uimsbf |
|   PLP_GROUP_ID | 8 | uimsbf |
|   BASE_PLP_ID | 8 | uimsbf |
|   if (descriptor_length > 3) { | | |
|     system_parameters() | | |
|     for (i=0; i<N; i++) { | | |
|       cell_parameters() | | |
|     } | | |
|   } | | |
| } | | |

FIG. 45

| Name | No.of bits | Identifier |
|---|---|---|
| component_id_descriptor() { | | |
|   descriptor_tag | 8 | uimsbf |
|   descriptor_length | 8 | uimsbf |
|   system_id | 16 | uimsbf |
|   PLP_ID | 8 | uimsbf |
|   PLP_PROFILE | 8 | uimsbf |
| } | | |

FIG. 49

| Name | No.of bits | Identifier |
|---|---|---|
| IP/MAC_location_information() { | | |
|   descriptor_tag | 8 | uimsbf |
|   descriptor_length | 8 | uimsbf |
|   system_id | 16 | uimsbf |
|   PLP_GROUP_ID | 8 | uimsbf |
|   PLP_ID | 8 | uimsbf |
| } | | |

BROADCASTING SIGNAL TRANSMITTER/RECEIVER AND BROADCASTING SIGNAL TRANSMISSION/RECEPTION METHOD

This application is a 35 USC §371 National Stage entry of International Application No. PCT/KR2011/000822 filed on Feb. 8, 2011, and claims priority of U.S. Provisional Application No. 61/304,023 filed on Feb. 12, 2010, all of which are incorporated by reference in their entirety herein.

FIELD OF THE INVENTION

The present invention relates to a broadcast signal transmitter/receiver and a broadcast signal transmitting/receiving method, and, most particularly, to a broadcast signal transmitter/receiver and a broadcast signal transmitting/receiving method to increase a data transmission efficiency, to transmit a broadcast signal that can maintain a compatibility with a conventional broadcast signal transmitter/receiver, and to transmit signaling information that can receive a broadcast signal according to the characteristics of the receiver.

BACKGROUND ART

As the time has neared to end (or terminate) the transmission of analog broadcast signals, diverse technologies for transceiving (i.e., transmitting and receiving) digital broadcast signals are being researched and developed. Herein, a digital broadcast signal may include high capacity video/audio data as compared to an analog broadcast signal, and, in addition to the video/audio data, the digital broadcast signal may also include diverse additional data.

More specifically, a digital broadcasting system for digital broadcasting may provide HD (High Definition) level images, multiple-channel sound (or audio), and a wide range of additional services. However, a data transmission efficiency for transmitting high capacity data, a robustness of a transceiving (transmitting and receiving) network, and flexibility in a network considering mobile receiving equipments are still required to be enhanced.

DETAILED DESCRIPTION OF THE INVENTION

Technical Objects

A object of the present invention is to provide a method and apparatus for transceiving broadcast signals, which can receive digital broadcast signals without error even under an indoor environment or using mobile receiving equipment. Another object of the present invention is to provide a broadcast signal transceiver for transceiving broadcast signals and a method for transceiving a broadcast signals, which can transmit signaling information to receive broadcast signals according to the characteristics of the receiver. Yet another object of the present invention is to provide a broadcast signal transceiver for transceiving broadcast signals and a method for transceiving a broadcast signals, which can maintain compatibility with a conventional broadcast system.

Technical Solutions

In order to achieve the above-described technical objects of the present invention, according to an aspect of the present invention, a broadcast signal receiver may include an OFDM demodulator configured to receive a plurality of broadcast signals, each including a transmission frame for transmitting a broadcast service, and to perform OFDM demodulation on the received broadcast signals, wherein the transmission frame includes a preamble and multiple PLPs including a base layer and an enhancement layer of the broadcast service, and wherein the preamble includes first signaling information, and wherein the multiple PLPs include second signaling information and third signaling information, a processor configured to decode each of the OFDM-demodulated multiple broadcast signals by using at least one of MIMO, MISO, and SISO methods, and to output the transmission frame, a first decoder 110200 configured to decode first signaling information included in a preamble of the outputted transmission frame, wherein the first signaling information includes a first identifier configured to identify each of the multiple PLPs, and a second decoder 110100 configured to decode the second signaling information, to decode a PLP including the third signaling information by using the decoded second signaling information, and to selectively decode the multiple PLPs by using the third signaling information, wherein the second signaling information includes a descriptor including a second identifier configured to indicate a PLP including the third signaling information, and wherein the third signaling information including a third identifier configured to identify a type of data, among the base layer and the enhancement layer of a broadcast service, being included in each of the multiple PLPs.

Effects of the Invention

According to the present invention, in a digital broadcasting system, by using a MIMO system, the data transmission efficiency may be increased, and the Robustness of the broadcast signal transception (transmission and/or reception) may be enhanced.

Additionally, according to the present invention, due to the MIMO processing, the receiver may efficiently recover the MIMO reception signals even in diverse broadcasting environments.

Moreover, according to the embodiment of the present invention, by performing a maximum usage of the related art transceiving (transmitting and/or receiving) system while using the MIMO system, the present invention may provide an apparatus for transmitting/receiving a broadcast signal and a method for transmitting/receiving a broadcast signal that can ensure backward compatibility. And, the present invention may provide an apparatus for transmitting/receiving a broadcast signal and a method for transmitting/receiving a broadcast signal that can selectively (or optionally) receive or process data depending upon the characteristics of the receiver.

Furthermore, according to the present invention, the present invention may provide an apparatus for transmitting/receiving a broadcast signal and a method for transmitting/receiving a broadcast signal that can receive digital broadcast signals through a mobile receiving device or in an in-door environment without any error.

BRIEF DESCRIPTION OF THE DRAWINGS

FIG. 35 illustrates fields included in L1 signaling information region of FIG. 34 according to an embodiment of the present invention.

FIG. 36 illustrates fields included in L1 signaling information region of FIG. 34 according to another embodiment of the present invention.

FIG. 38 illustrates an exemplary delivery system descriptor field according to the first embodiment of the present invention.

FIG. 41 illustrates an exemplary component ID descriptor field according to the second embodiment of the present invention.

FIG. 44 illustrates an exemplary delivery system descriptor field according to the third embodiment of the present invention.

FIG. 45 illustrates an exemplary component ID descriptor field according to the third embodiment of the present invention.

FIG. 49 illustrates an exemplary IP/MAC_loc information field according to the fourth embodiment of the present invention.

Figure 1:
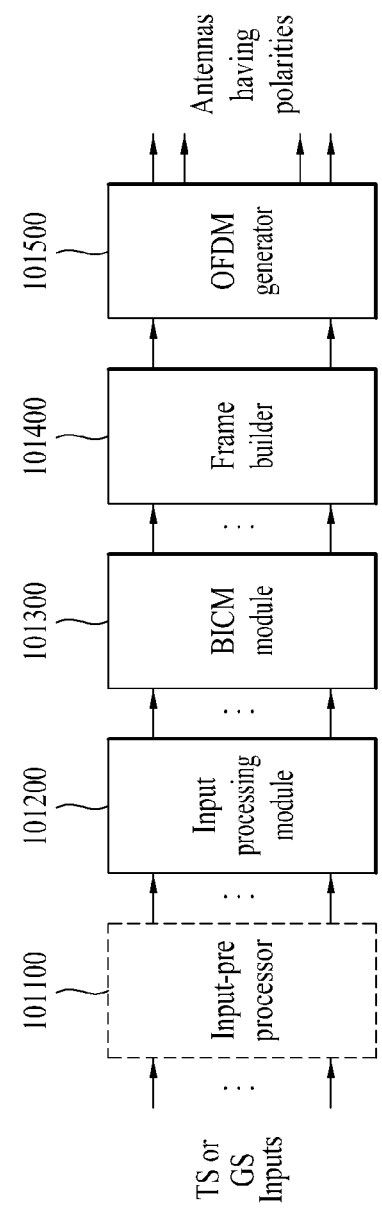
FIG. 1 illustrates a broadcast signal transmitter using a MIMO scheme according to an embodiment of the present invention.

BEST MODE FOR CARRYING OUT THE
PRESENT INVENTION

Reference will now be made in detail to the preferred embodiments of the present invention, examples of which are illustrated in the accompanying drawings. Wherever possible, the same reference numbers will be used throughout the drawings to refer to the same or like parts. And, the scope and spirit of the present invention will not be limited only to the exemplary embodiments presented herein. Although the terms used in the present invention are selected from generally known and used terms, the detailed meanings of which are described in relevant parts of the description herein. It should be noted that the terms used herein may vary depending upon the intentions or general practice of anyone skilled in the art and also depending upon the advent of a novel technology. Some of the terms mentioned in the description of the present invention have been selected by the applicant at his or her discretion, terms used herein. Furthermore, it is required that the present invention is understood, not simply by the actual terms used but by the meaning of each term lying within.

Various technologies are being adopted in the digital broadcasting system in order to enhance the transmission efficiency and to perform robust communication. Herein, a method of using multiple antennae in the transmitting end or in the receiving end is being proposed as an example of such various technologies. And, such method may be further divided into a single antenna transmission single antenna reception method (SISO; Single-Input Single-Output), a single antenna transmission multiple antennae reception method (SIMO; Single-Input Multi-Output), a multiple antennae transmission single antenna reception method (MISO; Multi-Input Single-Output), and a multiple antennae transmission multiple antennae reception method (MIMO; Multi-Input Multi-Output). Hereinafter, the usage of 2 antennae may be given as an example for the multiple antennae method, for simplicity in the description of the present invention. However, the description of the present invention may be applied to a system using at least two or more antennae.

The SISO method refers to a general broadcasting system using 1 transmission antenna and 1 reception antenna. And, the SIMO method refers to a broadcasting system using 1 transmission antenna and multiple reception antennae.

The MISO method refers to a broadcasting system that can provide transmission diversity by using multiple transmission antennae and multiple reception antennae. Herein, an example of the MISO method may correspond to an Alamouti method. The MISO method refers to a method that can receive antenna through 1 antenna without any performance loss. In the receiving system, the same data may be received through multiple reception antennae in order to enhance performance. However, in this case, such method will be described in the present invention while being included within the range of the MISO.

Performances of systems employing MIMO depend on characteristics of a transmission channel and, particularly, systems having independent channel environments exhibit high performance. That is, the performance of a system to which MIMO is applied can be improved when channels from antennas of a transmitter to antennas of a receiver are uncorrelated and independent. However, in a channel environment in which correlation between channels between transmit antennas and receive antennas is high, such as a line-of sight (LOS) environment, the performance of a system employing MIMO may abruptly decrease or the system may not operate.

When MIMO is applied to broadcast systems using single-input single-output (SISO) and MISO schemes, a data transmission efficiency can increase. However, the above-mentioned problems are generated and compatibility should be maintained such that a receiver having a single antenna can be provided with MIMO service. Accordingly, the present invention proposes a method capable of solving these problems.

Furthermore, the present invention proposes a broadcast signal transceiver and a broadcast signal transmission/reception method for a system capable of transmitting/receiving an additional broadcast signal (or enhanced broadcast signal), for example, a mobile broadcast signal, while sharing an RF band with a conventional terrestrial broadcast system, for example, DVT-T2.

To achieve this, the present invention can use a video coding method having scalability, which can divide video components into a basic video component having low definition while being robust against a communication environment and a video component vulnerable to the communication environment while being capable of providing high definition images and respectively transmit the different types of video components. While the present invention describes SVC as the video coding method having scalability, other arbitrary video coding methods can be used. Embodiments of the present invention will now be described in detail with reference to the attached drawings.

A broadcast signal transmitter and receiver of the present invention can perform MISO processing and MIMO processing on a plurality of signals transmitted and received through a plurality of antennas. A description will be given of a broadcast signal transceiver that processes two signals transmitted and received through two antennas.

FIG. 1 illustrates a broadcast signal transmitter using the MIMO scheme according to an embodiment of the present invention.

As shown in FIG. 1, the broadcast signal transmitter according to the present invention may include an input processor 101100, an input processing module 101200, a Bit Interleaved Coded Modulation (BICM) encoder 101300, a frame builder 101400, and an Orthogonal Frequency-Division Multiplexing (OFDM) generator (or transmitter) 101500. The broadcast signal transmitter according to the present invention may receive a plurality of MPEG-TS streams or a General Stream Encapsulation (GSE) stream (or GS stream).

The input processor 101100 may generate physical layer pipes (PLPs) on a service basis in order to give robustness to the input stream, that is, the plurality of MPEG-TS streams or the GSE stream.

Herein, the PLP corresponds to data unit being identified (or recognized) in a physical layer, and the data are process in the same transmission path for each PLP. More specifically, the PLP corresponds to data being processed in the transmission path, wherein the data have the same physical layer characteristic. And, the PLP may be mapped in cell units within a frame. Additionally, the PLP may also be considered as a physical layer TDM (Time Division Multiplex) channel carrying one or more multiple services.

Accordingly, the path through which such service is being transmitted, or a stream unit that can be identified in the physical layer and transmitted through such path will be referred to as a PLP.

The input processing module 101200 may generate a base band (BB) frame including the generated PLPs. The BICM encoder 101300 may add redundancy to the BB frame to correct an error on a transmission channel and interleave PLP data included in the BB frame.

The frame builder 101400 may accomplish a transmission frame structure by mapping the plurality of PLPs to a transmission frame and adding signaling information thereto. The OFDM generator 101500 may demodulate input data from the frame builder according to OFDM to divide the input data into a plurality of paths such that the input data is transmitted through a plurality of antennas.

Figure 2:
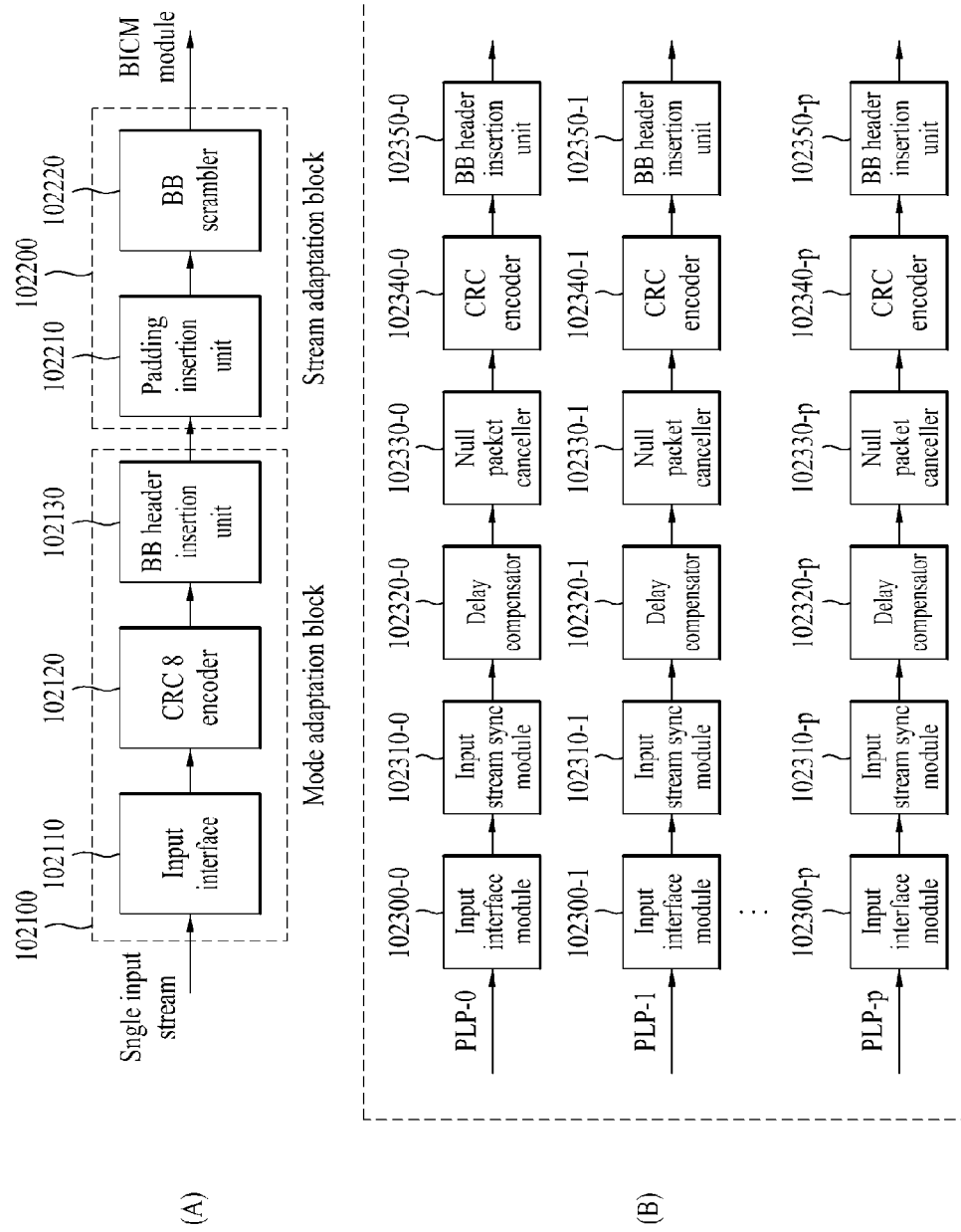
FIG. 2 illustrates an input processing module 101200 according to an embodiment of the present invention.

FIG. 2 illustrates an input processing module 101200 according to an embodiment of the present invention.

FIG. 2(A) show an embodiment of the input processing module 101200 when a single input stream is input to the input processing module 101200. When there is a single input stream, the input processing module 101200 may include a mode adaptation block 102100 and a stream adaptation block 102200.

The mode adaptation block 102100 may include an input interface module 102110 for dividing the input bitstream into logical units for FEC (BCH/LDPC) encoding performed in a BICM encoder following the input processing module 101200 and mapping the logical units, a cyclic redundancy check (CRC)-8 encoder 102120 for performing CRC encoding on the mapped bitstream, and a BB header insertion unit 102130 for inserting a BB header having a fixed size to a data field. In this case, the BB header may include mode adaptation type (TS/GS/IP) information, user packet length information, data field length information, etc.

The stream adaptation block 102200 may include a padding insertion unit 102210 for inserting a padding bit into the input bitstream to accomplish one BB frame for FEC encoding when the input bitstream does not fill the BB frame, and a BB scrambler 102220 for generating a pseudo random binary sequence (PRBS) and performing an XOR operation on the input bitstream and the generated PRBS to randomizing the input bitstream.

FIG. 2(B) illustrates another embodiment of the mode adaptation block 102100 included in the input processing module 101200 when a plurality of input streams is input to the input processing module 102100.

The mode adaptation block 102100 may include p+1 input interface modules 102300-0 to 102300-*p*, p+1 input stream sync modules 102310-0 to 102310-*p*, p+1 delay compensators 102320-0 to 102320-*p*, p+1 null packet cancellers 102330-0 to 1-2330-*p*, p+1 CRC encoders 102340-0 to 102340-*p*, and p+1 BB header insertion units 102350-0 to 102350-*p*.

P+1 input streams may be independently processed into streams converted from a plurality of MPEG-TSs or GSE streams, and each of the processed streams may be a complete stream including a plurality of service components or a stream of a minimum unit including only a single service component.

Paths through which the input streams to be independently processed are transmitted may be referred to as PLPs. Services may be transmitted/received through a plurality of RF channels. PLP data may be included in slots distributed at time intervals in the plurality of RF channels, or distributed at time intervals in one RF channel. Such signal frame may transmit time distributed (or time dispersed) PLPs to at least one RF channel. In other words, one PLP may be time distributed to one RF channel or multiple RF channels, thereby being transmitted.

To increase transmission efficiency, an embodiment of the present invention selects a PLP from the plurality of PLPs and transmits information that can be commonly applied to the plurality of PLPs through the selected PLP. This PLP may be referred to as a common PLP or L2 signaling information. There may be multiple common PLPs according to the intention of a designer. Furthermore, common PLP may be located following L1 signaling information within a transmission frame.

The p+1 input interface modules 102300-0 to 102300-*p*, p+1 CRC encoders 102340-0 to 102340-*p*, and p+1 BB header insertion units 102350-0 to 102350-*p* have the same functions as those of the input interface module 102100, CRC-8 encoder 102120, and BB header insertion unit 102130 shown in FIG. 2(A), and thus detailed descriptions thereof are omitted. The p+1 input stream sync modules 102310-0 to 102310-*p* may insert input stream clock reference (ISCR) information, that is, timing information necessary for a receiver to restore a transport stream (TS) or a generic stream (GS).

The p+1 delay compensators 102320-0 to 102320-*p* may acquire synchronization by delaying data for PLPs in each group on the basis of the timing information inserted by the input stream sync modules, and the p+1 null packet cancellers 102330-0 to 1-2330-*p* may delete unnecessarily transmitted null packets inserted in delay-compensated BB frames and insert the number of deleted null packets to positions at which the null packets are deleted.

Figure 3:
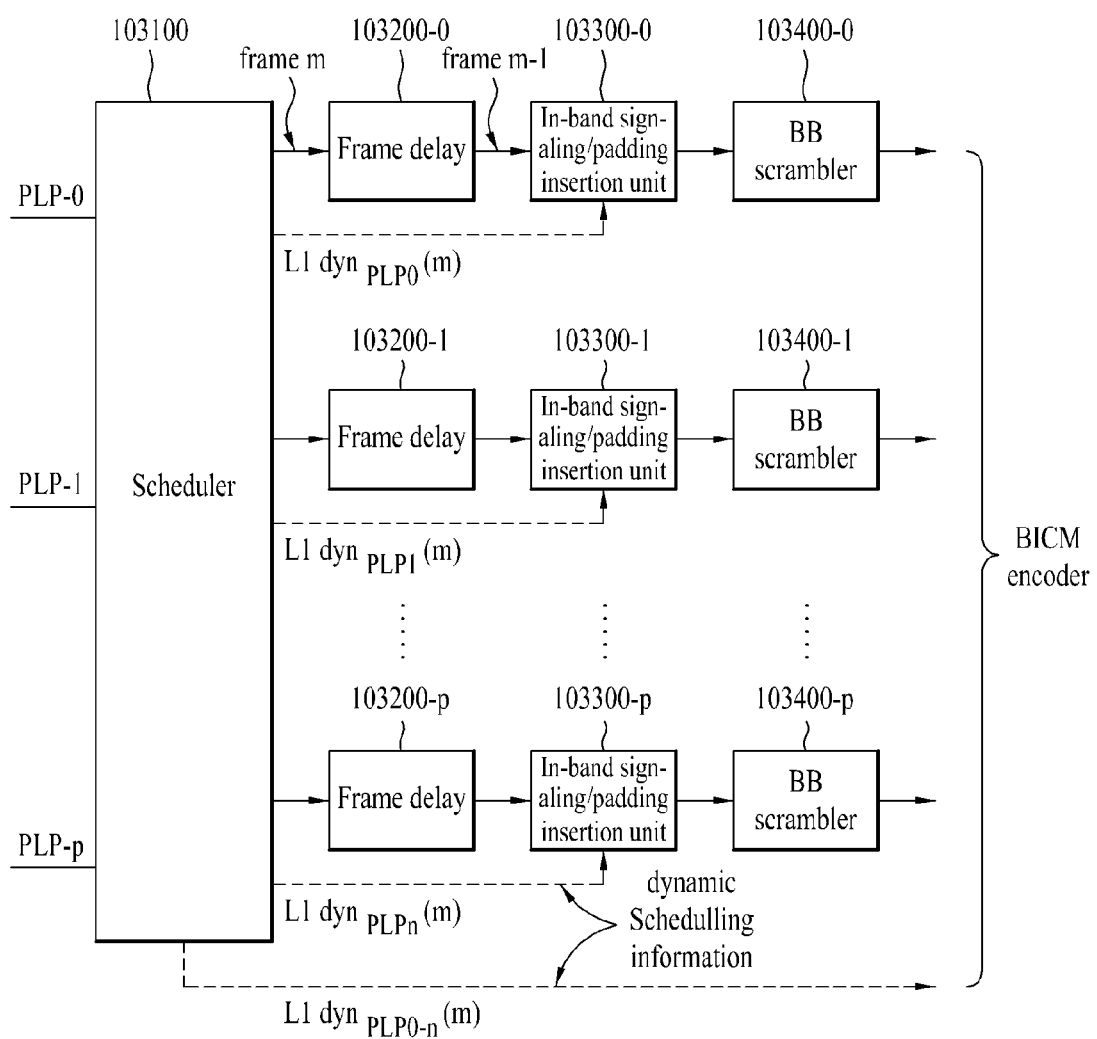
FIG. 3 illustrates a stream adaptation block 102200 included in an input processing module according to another embodiment of the present invention.

FIG. 3 illustrates the stream adaptation block included in the input processing module according to another embodiment of the present invention.

The stream adaptation block 102200 shown in FIG. 3 may include a scheduler 103100 for performing scheduling for allocating a plurality of PLPs to slots of a transport stream and transmitting L1-dynamic signaling information of a current frame to the BICM encoder 101300, separately from in-band signaling, p+1 frame delays 103200-0 to 103211-*p* for delaying input data by one frame such that the current frame can include scheduling information about the following frame for in-band signaling, p+1 in-band signaling/padding inserting units 103400-0 to 103400-*p* for inserting undelayed L1-dynamic signaling information to the data delayed by one frame and, when a padding space is present, inserting a padding bit to the padding space or inserting in-band signaling information to the padding space, and p+1 BB scramblers 103400-0 to 103400-*p*. The p+1 BB scramblers 103400-0 to 103400-*p* operate in the same manner as the BB scrambler 102220 shown in FIG. 2(A), and thus detailed description thereof is omitted.

Figure 4:
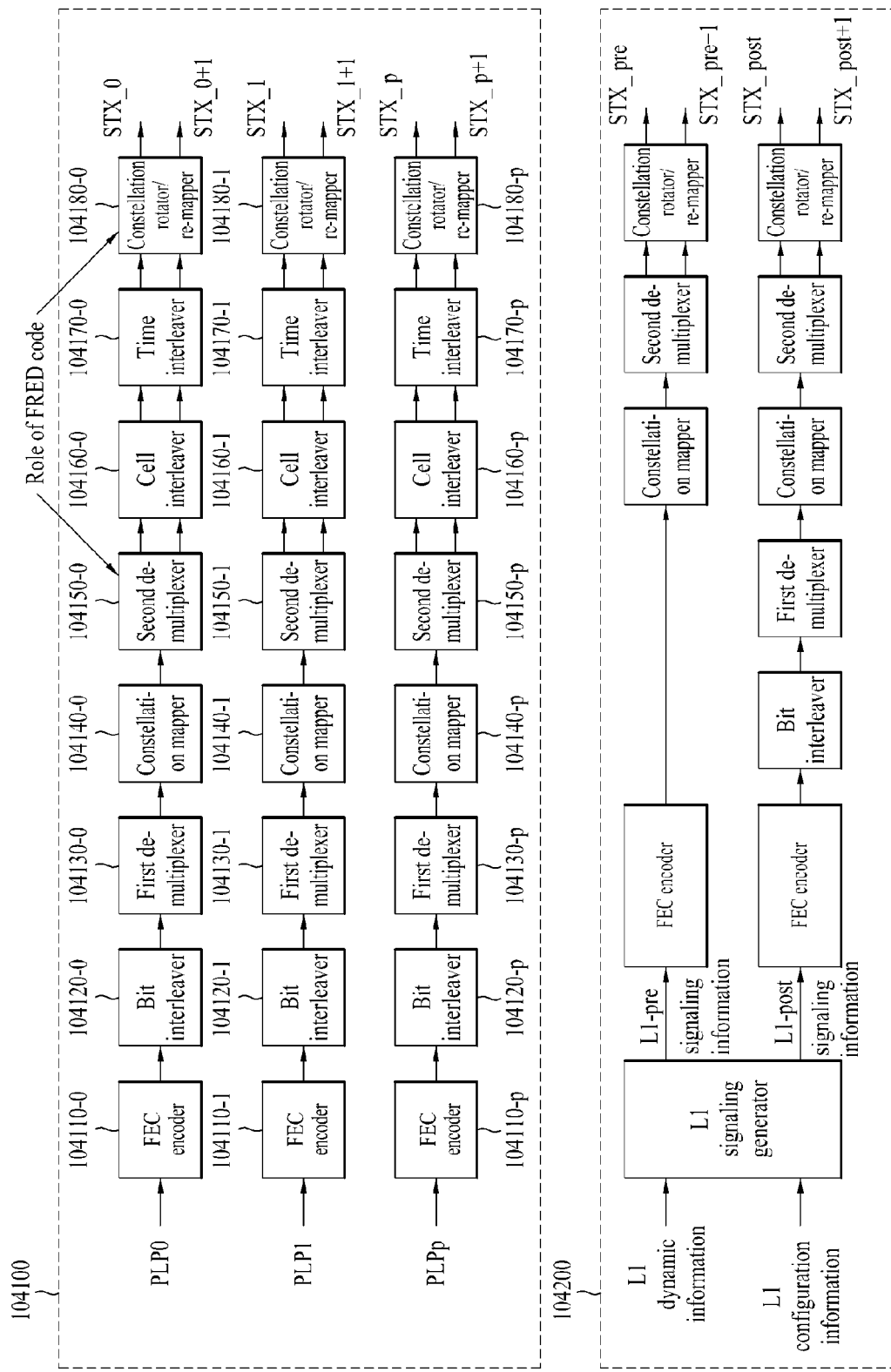
FIG. 4 illustrates a BICM encoder 101300 according to an embodiment of the present invention.

FIG. 4 illustrates the BICM encoder 101300 according to an embodiment of the present invention.

The BICM encoder 101300 may include a first BICM encoding block 104100 and a second BICM encoding block 104200. The first BICM encoding block 104100 may include blocks for respectively processing a plurality of input-processed PLPs, and the second BICM encoding block 104200 may include blocks for respectively processing signaling information. The signaling information may include L1-pre signaling information and L1-post signaling information. Positions of the blocks may be changed by a designer. The blocks will now be described in detail.

The first BICM encoding block 104100 may include p+1 number of FEC encoders 104110-0~*p* configured to add a redundancy, so that the receiving unit can correct an error occurring on a transmission channel with respect to data including in the PLP (hereinafter referred to as PLP data), and to perform BCH encoding and LDPC encoding, p+1 number of bit interleavers 1041200-0~p configured to perform bit interleaving in a single FEC block unit with respect to the PLP data being processed with FEC encoding, p+1 number of first demultiplexers 104130-0~p configured to perform demultiplexing on the bit-interleaved PLP data in single FEC block units, wherein the data reliability distribution being generated during the LDPC encoding process is dispersed in a later process, p+1 number of constellation mappers 104140-0~p configured to respectively map the demultiplexed bit unit PLP data to the constellation in symbol units, p+1 number of second demultiplexers 104150-0~p configured to divide the cells mapped to the constellation to 2 paths, i.e., to a first path and a second path, and to output the divided cells through the respective path, p+1 number of cell interleavers 1041600-0~p configured to perform interleaving in cell units on the PLP data being mapped to the constellation, p+1 number of time interleavers 104170-0~p configured to perform interleaving in time units on the cell-interleaved PLP data, and p+1 number of constellation rotators/re-mappers 104180-0~p configured to remap bit unit bit unit PLP data being inputted through the first path and the second path to the constellation in symbol units, and configured to rotate the constellation to a predetermined angle (or degree) in accordance with the modulation type.

The first BICM encoding block 104100 may include a MISO encoder or a MIMO encoder for performing MISO encoding or MIMO encoding for the plurality of PLPs. In this case, The MISO/MIMO encoder may follow the p+1 constellation mappers 104140-0 to 104140-p or follow the p+1 time interleavers 104170-0 to 104170-p. Otherwise, the MISO/MIMO encoder may be included in the OFDM generator 101500.

Data output through the first path divided by the p+1 second demultiplexers 104150-0 to 104150-p may be transmitted through a first antenna Tx_1 and data output through the second path may be transmitted through a second antenna Tx_2.

The constellations rotated by the p+1 constellation rotators/remappers 104180-0 to 104180-p may be represented by an in-phase (I-phase) component and a quadrature-phase (Q-phase) component. The p+1 constellation rotators/remappers 104180-0 to 104180-p may delay only the Q-phase component by a predetermined value. Then, the p+1 constellation rotators/remappers 104180-0 to 104180-p may remap the interleaved PLP data to new constellations using the I-phase component and the delayed Q-phase component. Accordingly, a diversity gain can be obtained since I/Q components of the first and second paths are mixed and thus the same information is transmitted through the first and second paths. The p+1 constellation rotators/remappers 104180-0 to 104180-p may be located before the cell interleavers, which can be changed by the designer. Consequently, the first BICM encoding block 104100 can output two pieces of data for each PLP. For example, the first BICM encoding block 104100 can receive PLP0, process received PLP0 and output STX_0 and STX_0+1. In this case, multiple PLPs may be included in the base layer and enhancement layer of a broadcast service, which is processed by using the SVC method. And, herein, the multiple PLPs may include network information, such as an NIT (Network Information Table), or PLP information, and may also include service information such as an SDT (Service Description Table), an EIT (Event Information Table), and a PMT (Program Map Table)/PAT (Program Association Table), and, among the multiple PLPs, only a specific PLP may include the service information. This is a feature that may be varied or modified depending upon the intentions of the system designer. Therefore, a respective broadcast signal receiver may decode all of the multiple PLPs or may decode only a specific PLP, so as to acquire service information, thereby being capable of receiving a desired (or wanted) broadcast service.

The second BICM encoding block 104200 may include an L1 signaling generator 104210 for encoding input L1-dynamic information and L1-configurable information to generate L1-pre signaling information and L1-post signaling information, two FEC encoders, a bit interleaver, a demultiplexer, two constellation mappers, two dividers, and two constellation rotators/remappers.

The L1 signaling generator 104210 may be included in the stream adaptation block 102200 described in FIG. 2 and FIG. 3, which may be changed by the designer. Other blocks operate in the same manner as those included in the first BICM encoding block 104100, and thus detailed description thereof is omitted.

The L1-pre signaling information may include information necessary for the receiver to decode the L1-post signaling information, and the L1-post signaling information may include information necessary for the receiver to restore received data. To decode L1-signaling information and data in the receiver, correct and rapid decoding of the L1-pre signaling information is necessary. Accordingly, the second BICM encoding block 104200 according to the present invention does not perform bit interleaving and demultiplexing on the L1-pre signaling information such that the receiver can rapidly decode the L1-pre signaling information. Consequently, the second BICM encoding block 104200 can output two pieces of data for the L-dynamic information and L1-configurable information. For example, the first BICM encoding block 104100 can receive and process the L1-dynamic information and output STX-pre and STX_pre+1.

The BICM encoder 101300 may process the data input through the first and second paths and output the processed data to the frame builder 101400 through the first and second paths. This may be changed according to the intention of the designer.

Figure 5:
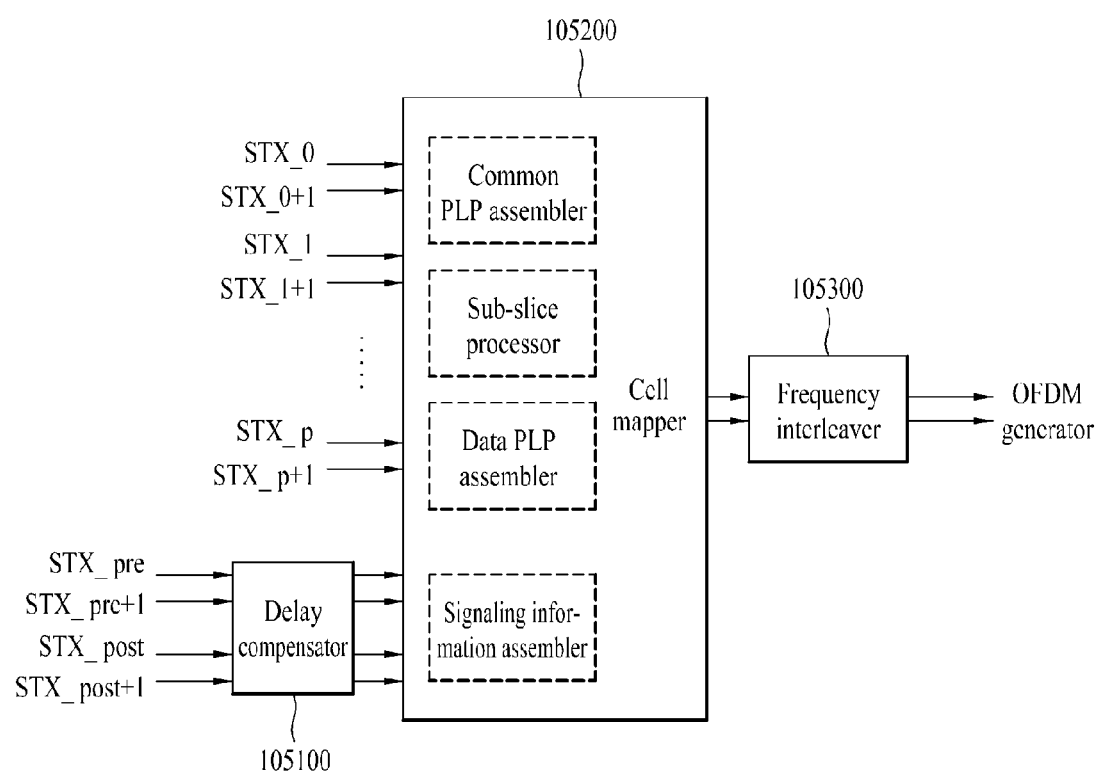
FIG. 5 illustrates a frame builder 101400 according to an embodiment of the present invention.

FIG. 5 illustrates the frame builder 101400 according to an embodiment of the present invention.

As described above, the first BICM encoding block 104100 can output two data such as STX_k and STX_k+1 for a plurality of PLP data and the second BICM encoding block 104200 can output four signaling data, that is, STX_pre, STX_pre+1, STX_post and STX_post+1 for the L-pre signaling information and the L1-post signaling information.

Each output data is input to the frame builder 101400. In this case, as shown in FIG. 5, the frame builder 101400 may receive the four signaling data, that is, STX_pre, STX_pre+1, STX_post and STX_post+1 first from among the data output from the BICM encoder 101300. The frame builder 104100 may include a delay compensator 105100 for compensating a delay of one transmission frame and a delay according to processing in the BICM encoding module 101300 for the L1-pre signaling data or the L1-post signaling data, a cell mapper 105200 for arranging input common PLP cells, PLP cells including normal data and cells including signaling information in an OFDM symbol based array of a transmission frame using scheduling information, and a frequency interleaver 105300 for interleaving cells input thereto in the frequency domain and outputting the interleaved data through first and second paths.

The cell mapper 1054200 may include a common PLP assembler, sub-slice processor, data PLP assembler and signaling information assembler blocks and perform an arrangement-related function using scheduling information included in signaling information. The cell mapper 105200 may apply the same cell mapping scheme or different cell mapping schemes to the first and second paths depending on the scheduling information.

The frame builder 101400 may process data input through the first and second paths and output the processed data to the OFDM generator through the first and paths, which may be changed according to the intention of the designer.

Figure 6:
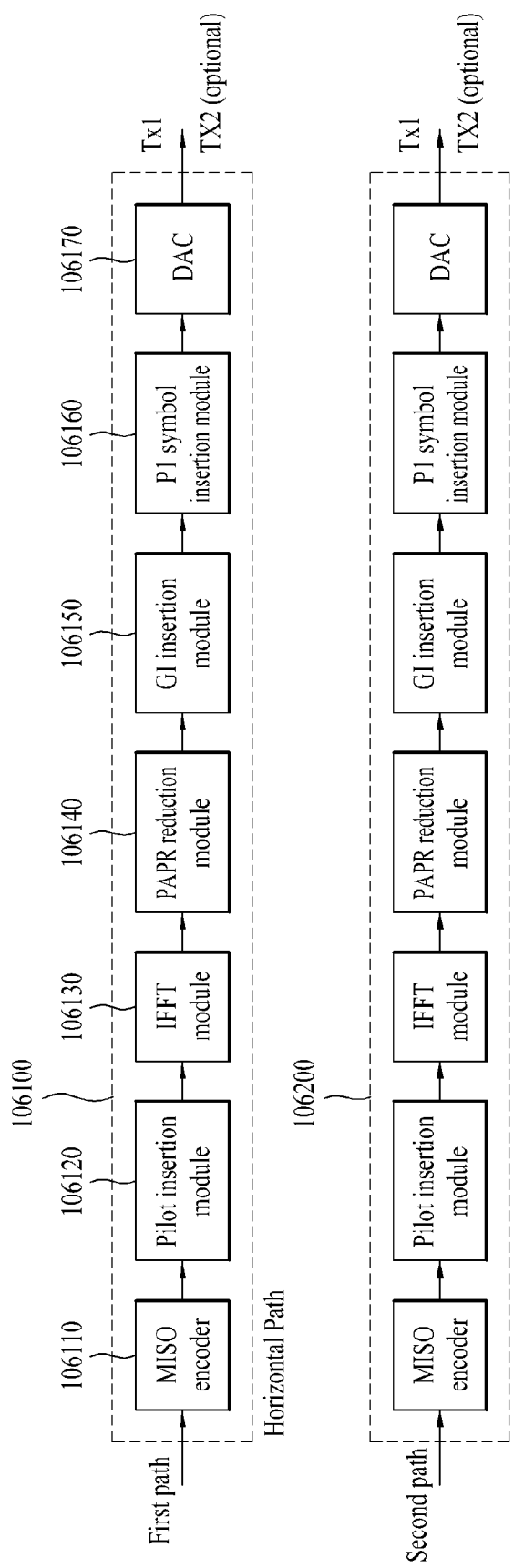
FIG. 6 illustrates an OFDM generator 101500 according to an embodiment of the present invention.

FIG. 6 illustrates the OFDM generator 101500 according to an embodiment of the present invention.

The OFDM generator 101500 according to an embodiment of the present invention may receive broadcast signals through first and second paths, demodulates the received broadcast signals and output the demodulated signals to two antennas TX1 and TX2. The OFDM generator 101500 may be referred to as a transmission unit.

In the present invention, a block for modulating the broadcast signal to be transmitted through the first antenna TX1 may be referred to as a first OFDM generating unit 106100 and a block for modulating the broadcast signal to be transmitted through the second antenna TX2 may be referred to as a second OFDM generating unit 106200.

When channel correlation between channels transmitted through the first and second antennas is high, the first and second antennas may apply a polarity to transmitted signals according to the sign of the correlation and transmit the signals. A MIMO scheme using this technique may be referred to as a polarity multiplexing MIMO scheme, the first antenna that adds a polarity to a received signal and transmits the signal with the polarity may be referred to as a vertical antenna, and the second antenna that adds a polarity to a received signal and transmits the signal with the polarity may be referred to as a horizontal antenna. A description will be given of modules included in the first OFDM generating unit 106100 and the second OFDM generating unit 106200.

The first OFDM generating unit 106100 may include a MISO encoder 10610 for MISO-encoding input symbols transmitted through each path such that the input symbols have transmit diversity, a pilot insertion module 106120 for inserting a pilot having a predetermined pilot pattern into a predetermined position in a transmission frame and outputting the transmission frame to an inverse fast Fourier transform (IFFT) module 106130, the IFFT module 106130 performing IFFT on the signal having the pilot on each path, a peak-to-average power ratio (PAPR) module 106140 for reducing a PAPR of signals in the time domain and outputting the signals with the reduced PAPR to a guard interval (GI) insertion module 106150 or feeding back necessary information to the pilot insertion module 106120 according to a PAPR reduction algorithm, the GI insertion module 106150 copying the last part of an effective OFDM symbol, inserting a GI into each OFDM symbol in the form of a cyclic prefix (CP) and outputting each OFDM symbol to a P1 symbol insertion module 106160, the P1 symbol insertion module 106160 inserting a P1 symbol into the beginning of each transmission frame, and a digital-to-analog converter (DAC) module 106170 converting each signal frame having the P1 symbol inserted thereto into an analog signal and transmitting the analog signal through the first antenna Tx1.

Additionally, depending upon the intentions of the system designer, the MISO encoder 106110 may perform processing on the inputted symbols by using at least one of the MIMO, MISO, and SISO methods. In this case, the MISO encoder 106110 may perform an overall MIMO encoding process on the multiple PLP data, or the MISO encoder 106110 may perform MISO encoding on a portion of the PLP data, and the MISO encoder 106110 may perform MISO encoding on the signaling data. Furthermore, the MISO encoder 106110 may also perform a dual SISO encoding process on the signaling data.

Moreover, depending upon the intentions of the system designer, the MISO encoder 106110 may be included in front of the first OFDM generating unit 106100, instead of being included in the first OFDM generating unit 106100.

The second OFDM generating unit 106200 may include the same modules as those of the first OFDM generating unit 106100. The modules included in the second OFDM generating unit 106200 perform the same functions as those of the modules included in the first transmitter 106100, and thus detailed descriptions are omitted.

Figure 7:
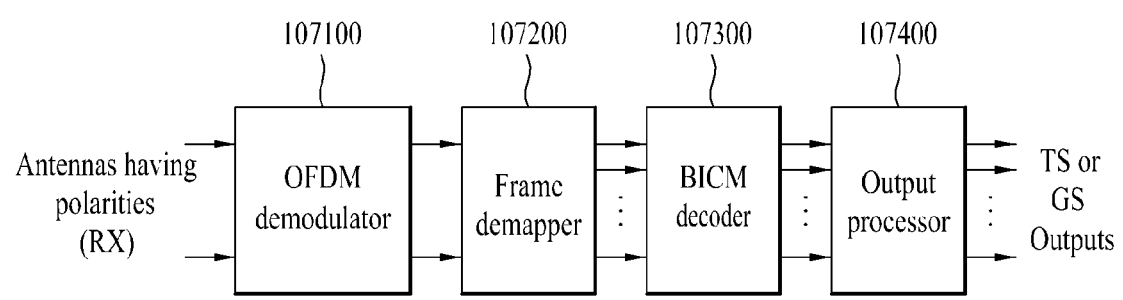
FIG. 7 illustrates a broadcast signal receiver according to an embodiment of the present invention.

FIG. 7 illustrates a broadcast signal receiver according to an embodiment of the present invention.

As shown in FIG. 7, the broadcast signal receiver may include an OFDM demodulator 107100, a frame demapper 107200, a BICM decoder 107300, and an output processor 107400. The OFDM demodulator (or OFDM demodulation unit or reception unit) 107100 may convert signals received through a plurality of receive antennas into signals in the frequency domain. The frame demapper 107200 may output PLPs for a necessary service from among the converted signals. The BICM decoder 107300 may correct an error generated according to a transmission channel. The output processor 107400 may perform procedures necessary to generate output TSs or GSs. Here, dual polarity signals may be input as input antenna signals and one or more streams may be output as the TXs or GSs.

Figure 8:
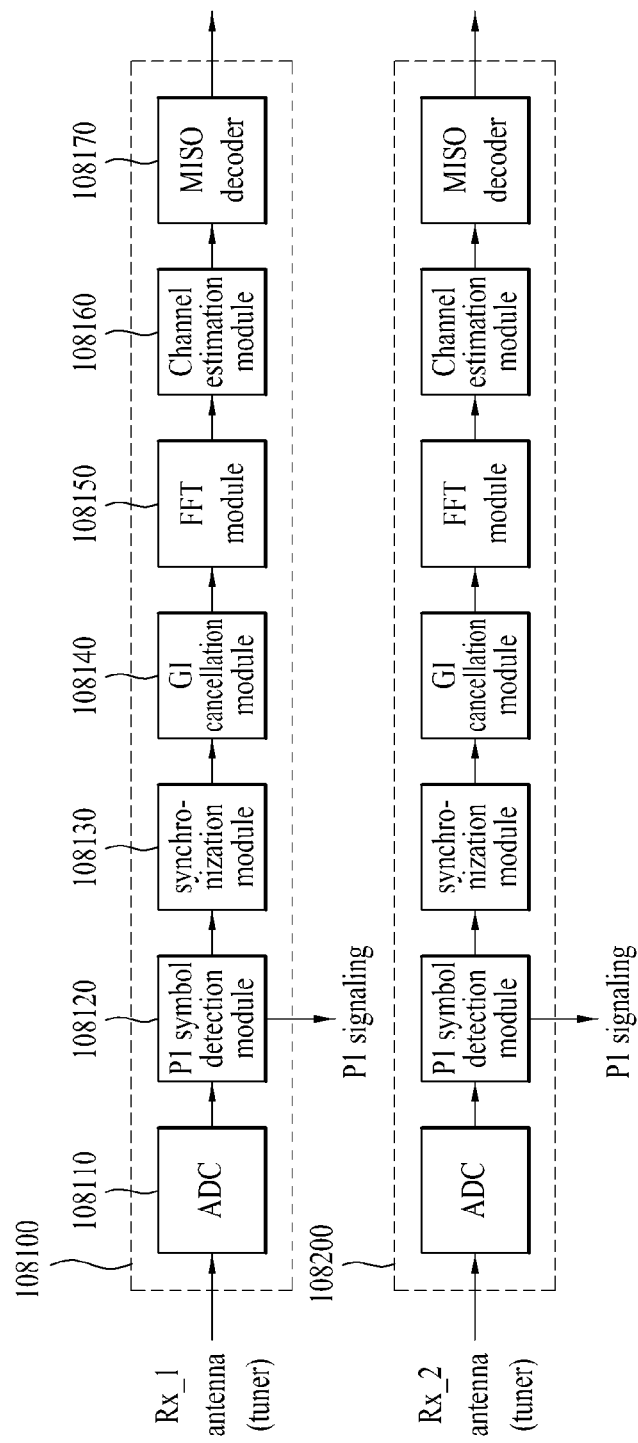
FIG. 8 illustrates an OFDM demodulator 101800 according to an embodiment of the present invention.

FIG. 8 illustrates the OFDM demodulator 108100 according to an embodiment of the present invention.

The OFDM demodulator 108100 may receive broadcast signals of the respective paths through two antennas Rx1 and Rx2 and perform OFDM demodulation on the broadcast signals. A block that demodulates the broadcast signal received through the first antenna Rx1 may be referred to as a first OFDM demodulating unit 108100 and a block that demodulates the broadcast signal received through the second antenna Rx2 may be referred to as a second OFDM demodulating unit 108200. Furthermore, according to an embodiment of the present invention, polarity multiplexing MIMO can be employed. That is, the first OFDM demodulating unit 108100 may demodulate the broadcast signal input through the first antenna Rx1 according to OFDM and output the demodulated broadcast signal to the frame demapper 107200 through a first path, and the second OFDM demodulating unit 108200 may demodulate the broadcast signal input through the second antenna Rx2 according to OFDM and output the demodulated broadcast signal to the frame demapper 107200 through a second path.

The first OFDM demodulating unit 108100 may include an ADC module 108110, a P1 symbol detection module 108120, a synchronization module 108130, a GI cancellation module 108140, an FFT module 108150, a channel estimation module 108160, and a MISO decoder 108170.

The second OFDM demodulating unit 108200 may include modules identical to the modules of the first OFDM demodulating unit 108100 and the modules included in the second OFDM demodulating unit 108200 perform the same functions as the modules included in the first OFDM demodulating unit 108100.

Additionally, depending upon the intentions of the system designer, the MISO decoder 108170 may perform processing on the inputted data by using at least one of the MIMO, MISO, and SISO methods. In this case, the MISO decoder 108170 may perform an overall MIMO decoding process on the multiple PLP data, or the MISO decoder 108170 may perform MISO decoding on a portion of the PLP data, and the MISO decoder 108170 may only perform a MISO encoding process on the signaling data, so as to output a transmission frame. Furthermore, the MISO decoder 108170 may also perform a dual SISO decoding process on the signaling data.

Moreover, depending upon the intentions of the system designer, the MISO decoder 108170 may be included in front of the first OFDM demodulating unit 106100, instead of being included in the first OFDM demodulating unit 106100.

The OFDM demodulator 107100 shown in FIG. 8 can perform a reverse procedure of the procedure of the OFDM generator 101500 illustrated in FIG. 6, and thus detailed description thereof is omitted.

Figure 9:
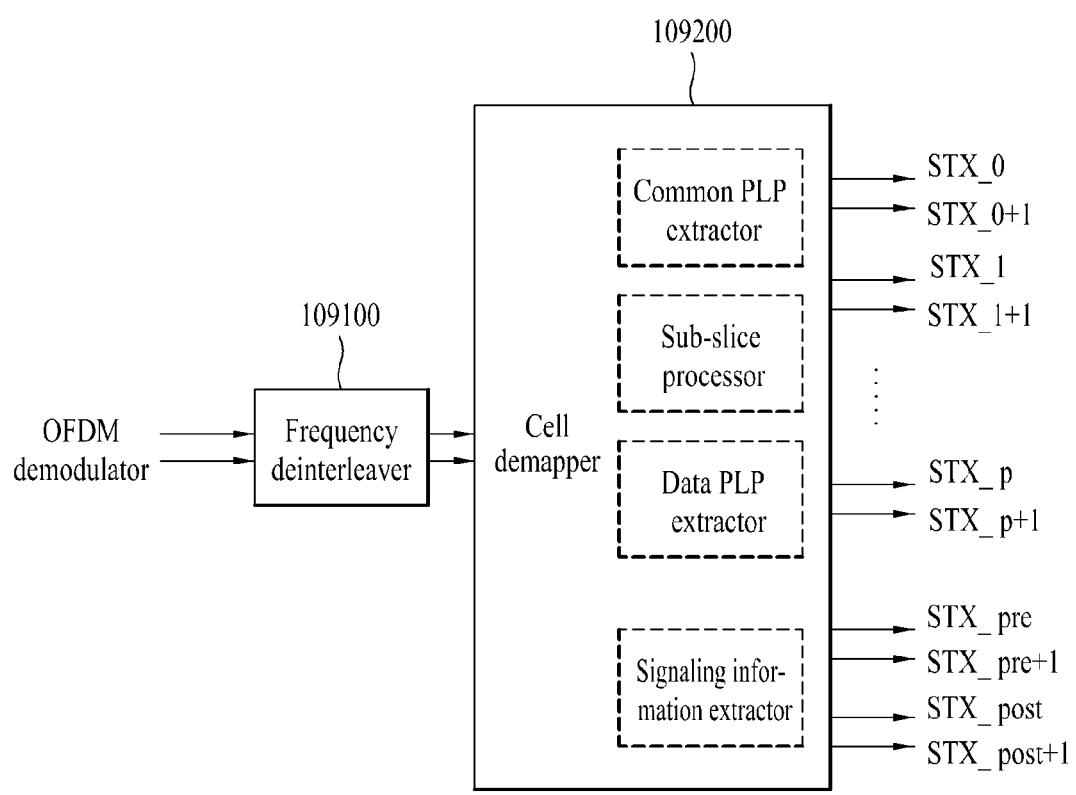
FIG. 9 illustrates a frame demapper 107200 according to an embodiment of the present invention.

FIG. 9 illustrates the frame demapper 107200 according to an embodiment of the present invention.

As shown in FIG. 9, the frame demapper 107200 may include a frequency deinterleaver 109100 for processing data input through the first and second paths and a cell mapper 109200. This may be modified by the designer. The frame demapper 107200 shown in FIG. 9 can perform a reverse procedure of the procedure of the frame builder 101400 illustrated in FIG. 5 and thus detailed description thereof is omitted.

Figure 10:
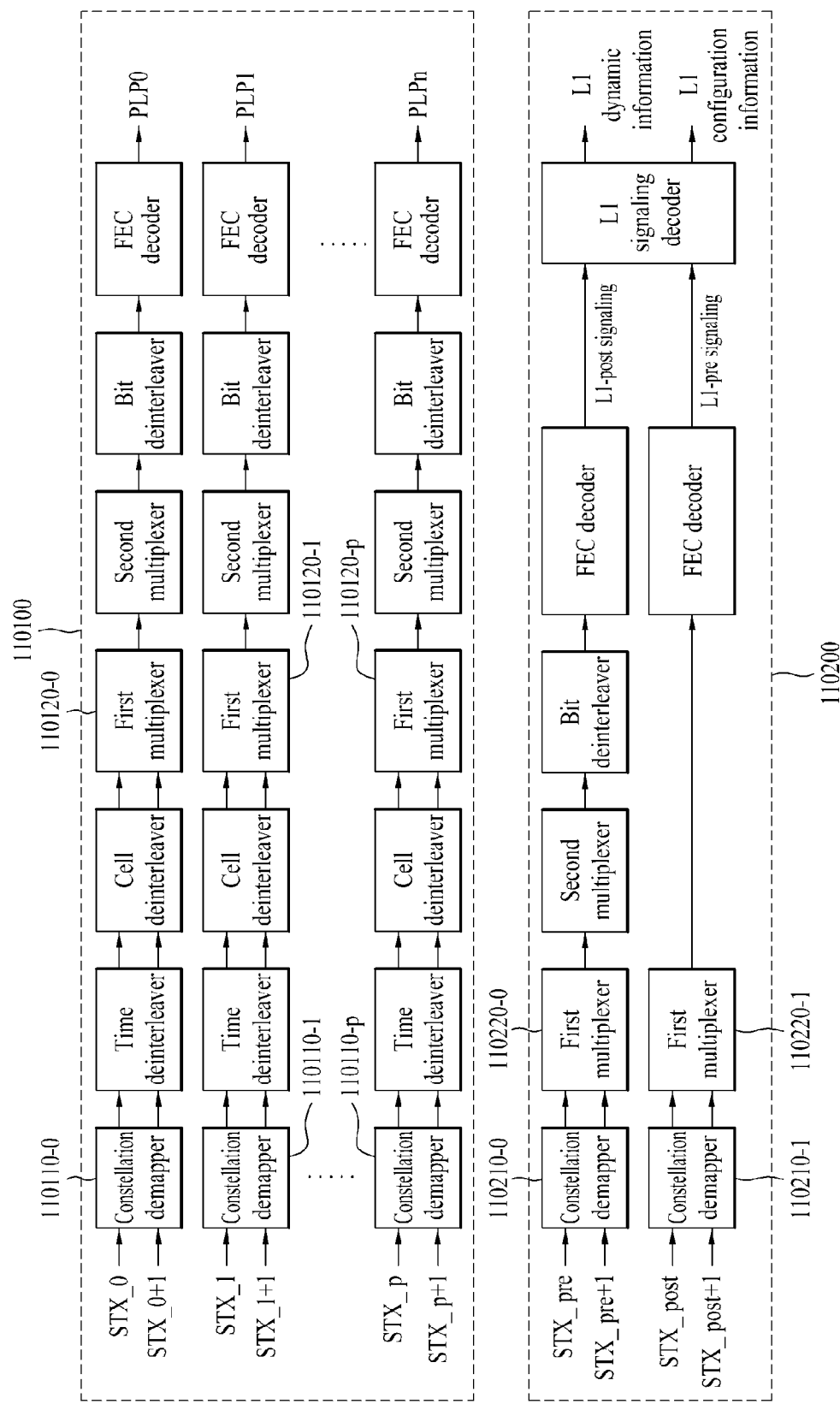
FIG. 10 illustrates a BICM decoder 107300 according to an embodiment of the present invention.

FIG. 10 illustrates the BICM decoder 107300 according to an embodiment of the present invention.

Referring to FIG. 10, the BICM decoder 107300 may include a first BICM decoding block 110100 for processing data SRx_0 to SRx_P+1 output through the first and second paths from the frame demapper 107200 and a second BICM decoding block 110200 for processing data SRx_pre to SRx_post+1 output through the first and second paths. In this case, p+1 constellation demappers 110110-0 to 110110-$p$ included in the first BICM decoding block 110100 and two constellation demappers 110210-0 and 110210-1 included in the second BICM decoding block 110200 may rotate constellations by a predetermined angle, delay only Q-phase components of the constellations by a predetermined value and calculate LLR values in consideration of the constellation rotation angle. If constellation rotation and Q-phase component delay are not performed, the LLR values can be calculated on the basis of normal QAM. The p+1 constellation demappers 110110-0 to 110110-$p$ included in the first BICM decoding block 110100 and the two constellation demappers 110210-0 and 110210-1 included in the second BICM decoding block 110200 may be located before the cell interleaver, which may be modified by the designer.

The BICM decoder 107300 according to the present invention may include a MISO decoder or a MIMO decoder according to the intention of the designer. In this case, the MISO decoder or the MIMO decoder may follow the cell interleaver or the constellation demappers. This may be modified according to the designer.

Additionally, depending upon the intentions of the system designer, the BICM decoder 107300 according to the present invention may also include an MISO decoder or an MIMO decoder. In this case, the MISO decoder or the MIMO decoder may be positioned after the cell interleaver, or may be placed after the constellation demapper. Herein, the position of the MISO decoder or the MIMO decoder may be varied depending upon the intentions of the system designer.

Additionally, the BICM decoder 107300 according to the present invention may refer to a single block including a first BICM decoding block 110100 and a second BICM decoding block 110200. Alternatively, each of the first BICM decoding block 110100 and the second BICM decoding block 110200 may also be referred to as an independent decoder. This may be varied depending upon the intentions of the system designer. Therefore, when the second BICM decoding block 110100 decodes the signaling information, the first BICM decoding block 110200 uses the decoded signaling information so as to identify and decode a PLP including a wanted (or desired) service or service component.

The p+1 number of first multiplexers 110120-0~$p$ and 2 first multiplexers 110220-0~$p$, shown in FIG. 10, may merge the cell being separately transmitted through the first path and the second path to a single cell stream.

Other blocks included in the BICM decoder 107300 may perform a reverse procedure of the procedure of the BICM encoder illustrated in FIG. 4 and thus detailed description thereof is omitted.

Figure 11:
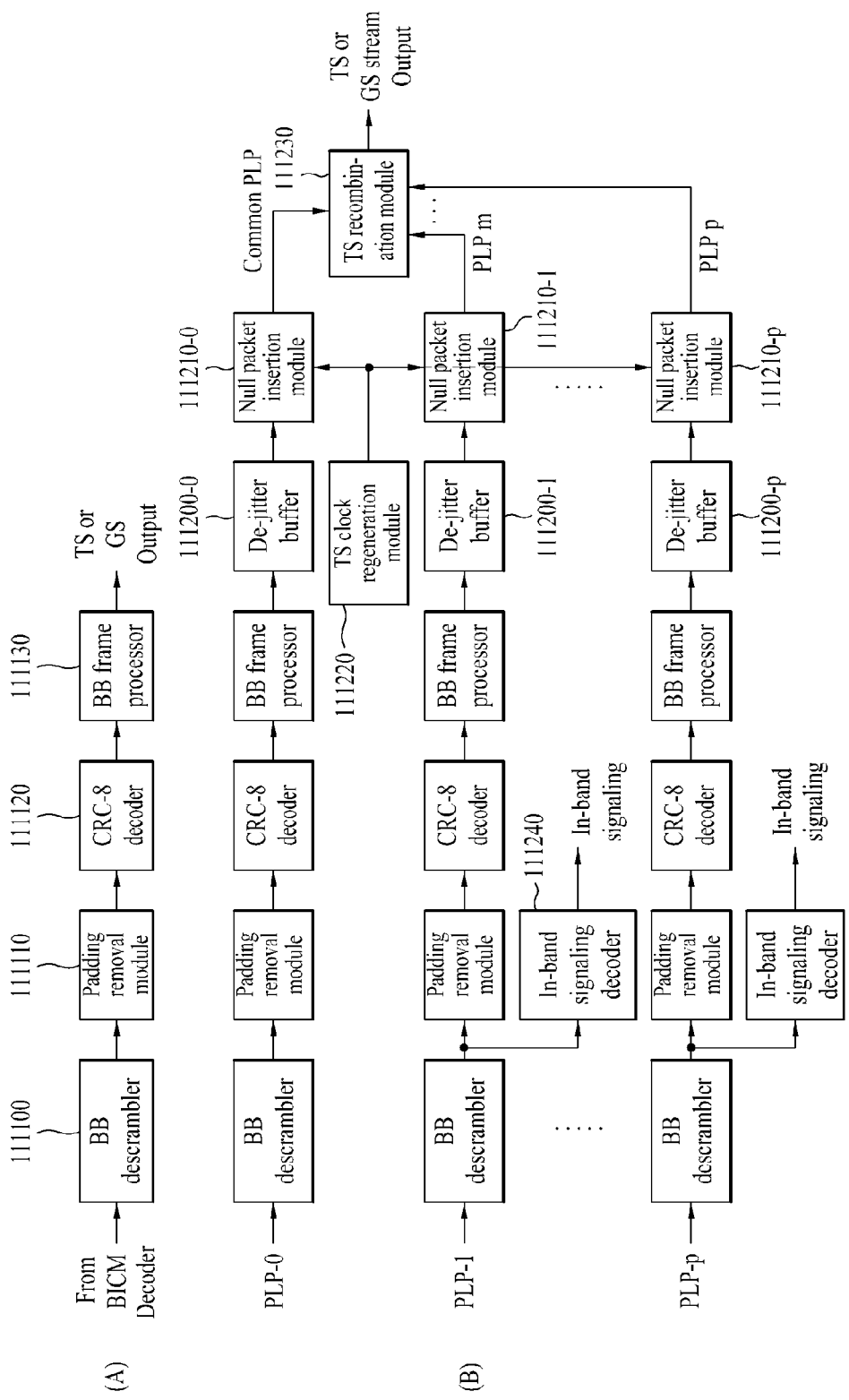
FIG. 11 illustrates an output processing module 107500 of the broadcast signal receiver according to an embodiment of the present invention.

FIG. 11 illustrates the output processing module 107500 of the broadcast signal receiver according to an embodiment of the present invention.

The output processing module 107500 shown in FIG. 11(A) corresponds to the input processing module 101100 for processing a single PLP, illustrated in FIG. 1(A), and performs a reverse procedure of the procedure of the input processing module 101100. The output processing module 107500 may include a BB descrambler 111100, a padding removal module 111110, a CRC-8 decoder 111120 and a BB frame processor 111130. The output processing module 107500 shown in FIG. 11(A) may receive a bitstream from the BICM decoder 107300 (or decoding module) of the broadcast signal receiver, which performs a reverse procedure of the BICM encoding procedure of the broadcast signal transmitter and performs a reverse procedure of the procedure of the input processing module 101200 illustrated in FIG. 1, and thus detailed description thereof is omitted.

FIG. 11(B) illustrates the output processing module 107500 of the broadcast signal receiver according to another embodiment of the present invention. The output processing module 107500 shown in FIG. 11(B) may correspond to the input processing module 101200 for processing a plurality of PLPs, illustrated in FIG. 2(B), and perform a reverse procedure of the procedure of the input processing module 101200. The output processing module 107500 shown in FIG. 11(B) may include a plurality of blocks for processing a plurality of PLPs. Specifically, the output processing module 107500 may include p+1 BB descramblers, p+1 padding removal modules, p+1 CRC-8 decoders, p+1 BB frame processors, p+1 de-jitter buffers 111200-0 to 111200-$p$ for compensating a delay inserted by the broadcast signal transmitter for synchronization of the plurality of PLPs according to time to output (TTO) parameter information, p+1 null packet insertion modules 111210-0 to 111210-$p$ for restoring null packets cancelled by the transmitter with reference to deleted null packet (DNP) information, a TS clock regeneration module 111220 for restoring detailed time synchronization of output packets on the basis of input stream time reference (ISCR) information, an in-band signaling decoder 111240 for restoring and outputting in-band signaling information transmitted through padding bit fields of data PLPs, and a TS recombining module 111230 for receiving data PLPs related to a restored common PLP and restoring original TSs, IPs or GSs. The output processing module 107500 shown in FIG. 11(B) may include an L1 signaling decoder (not shown). Descriptions of the blocks corresponding to the blocks shown in FIG. 11(A) are omitted.

Processing of the plurality of PLPs according to the broadcast signal receiver may be described for a case in which data PLPs related to a common PLP are decoded or a case in which the broadcast signal receiver simultaneously decodes a plurality of services or service components (e.g. components of scalable video service (SVS)). The BB descramblers, padding removal modules, CRC-8 decoders and BB frame processors correspond to those illustrated in FIG. 11(A).

Figure 12:
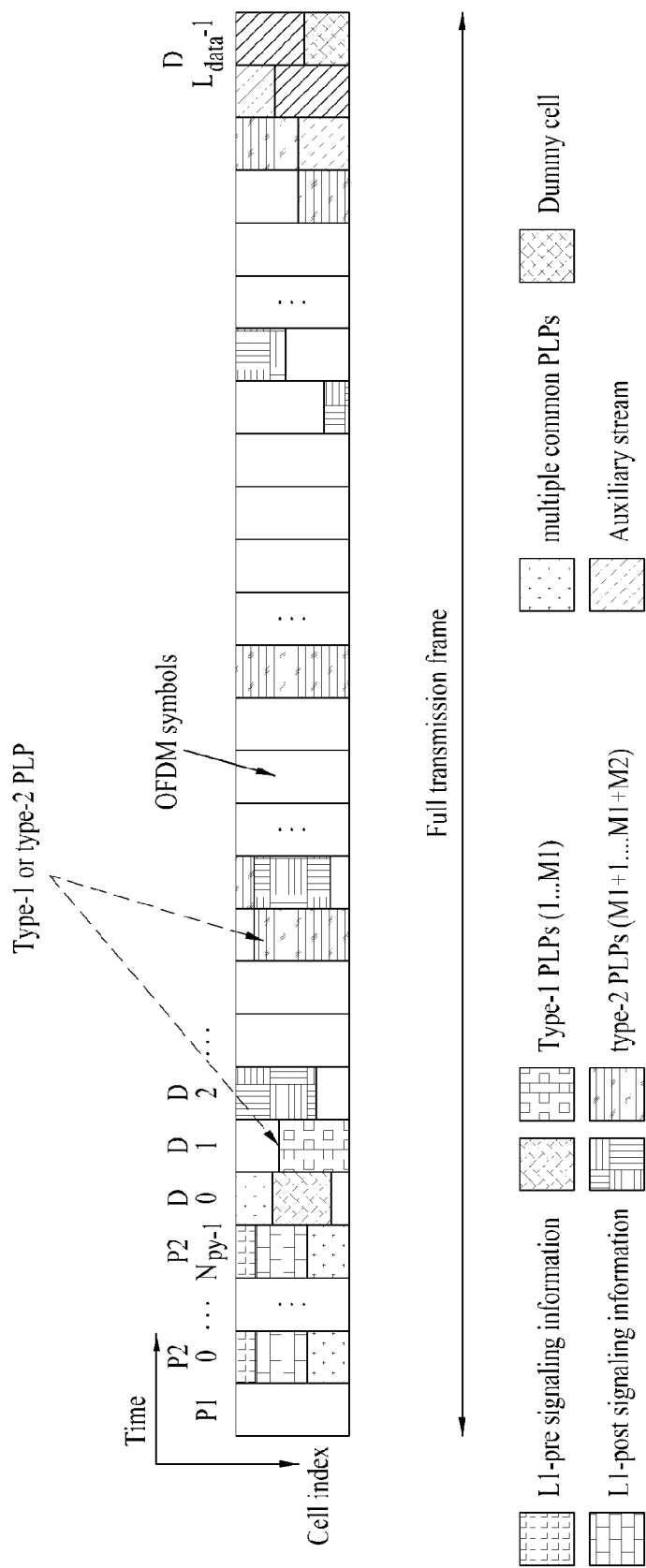
FIG. 12 illustrates a structure of a PLP based additional transmission frame according to an embodiment of the present invention.

FIG. 12 illustrates an additional frame structure based on PLP according to an embodiment of the present invention.

As shown in FIG. 12, a frame according to an embodiment of the present invention may include a preamble area and a data area. The preamble area may include a P1 symbol and a P2 symbol and the data area may include a plurality of data symbols.

The P1 symbol may transmit P1 signaling information associated with a basic transmission parameter and transmission type and a corresponding preamble identifier and the receiver may detect the frame using the P1 symbol. A plurality of P2 symbols may be provided and may carry L1 signaling information and signaling information such as a command PLP. The common PLP may include network information such as a Network Information Table (NIT), PLP information, and service information such as a Service Description Table (SDT) or an Event Information Table (EIT).

A plurality of data symbols located next to the P1 symbol may include a plurality of PLPs. The plurality of PLPs may include audio, video, and data TS streams and PSI/SI information such as a Program Association Table (PAT) and a Program Map Table (PMT). In the present invention, a PLP that transmits PSI/SI information may be referred to as a base PLP or a signaling PLP. The PLPs may include a type-1 PLP that is transmitted through one sub-slice per frame and a type-2 PLP that is transmitted through two sub-slices per frame. The plurality of PLPs may transmit one service and may also transmit service components included in one service. When the PLPs transmit service components, the transmitting side may transmit signaling information which indicates that the PLPs transmit service components.

In addition, additional data (or an enhanced broadcast signal) in addition to basic data may be transmitted through a specific PLP while sharing an RF frequency band with the conventional terrestrial broadcast system according to an embodiment of the present invention. In this case, the transmitting side may define a system or a signal that is currently transmitted through signaling information of the P1 symbol described above. The following description is given with reference to the case in which the additional data is video data. That is, as shown in FIG. 12, PLP M1 112100 and PLP (M1+M2) 112200 which are type 2 PLPs may be transmitted while including additional video data. In addition, in the present invention, a frame that transmits such additional video data may be referred to as an additional transmission frame. Furthermore, in addition to transmitting additional video data depending upon the intentions of the system designer, an additional transmission frame may also transmit data related to a new broadcasting system other than the related art terrestrial broadcasting system.

Figure 13:
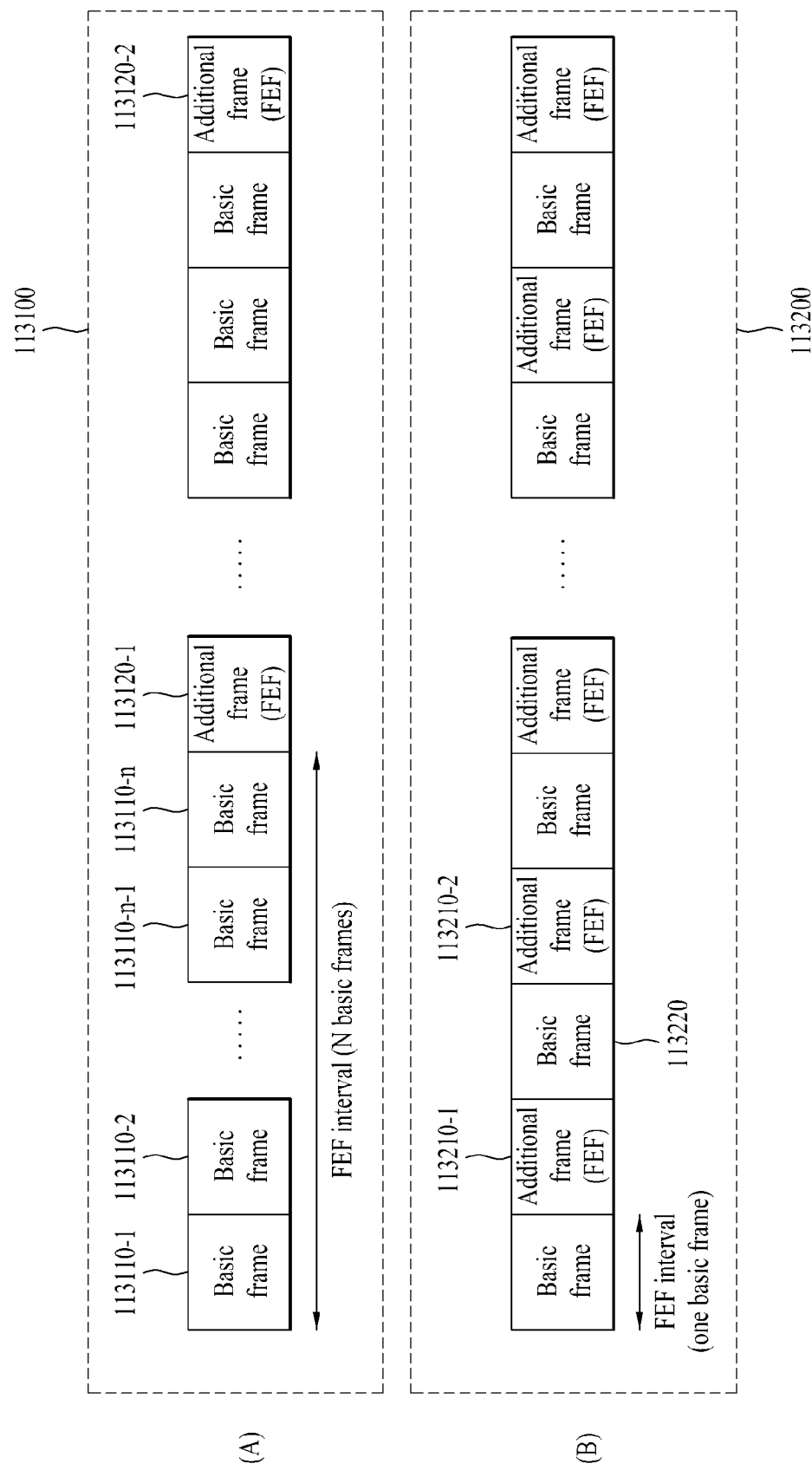
FIG. 13 illustrates structures of an FEF based additional transmission frame according to an embodiment of the present invention.

FIG. 13 illustrates a structure of an FEF based an additional transmission frame according to an embodiment of the present invention.

Specifically, FIG. 13 shows the case in which a Future Extension Frame (FEF) is used in order to transmit additional video data. In the present invention, a frame that transmits basic video data may be referred to as a basic frame and an FEF that transmits additional video data may be referred to as a additional transmission frame.

FIG. 13 shows structures of superframes 11100 and 113200 in each of which a basic frame and additional transmission frame are multiplexed. Frames 113100-1 to 113100-*n* that are not shaded from among frames included in the superframe 113100 are basic frames and shaded frames 113120-1 and 113120-2 are additional transmission frames.

FIG. 13(A) shows the case in which the ratio of basic frames to additional transmission frames is N:1. In this case, the time required for the receiver to receive a next additional transmission frame 113120-2 after receiving one additional transmission frame 113120-1 may correspond to N basic frames.

FIG. 13(B) shows the case in which the ratio of basic frames to additional transmission frames is 1:1. In this case, the proportion of additional transmission frames in the superframe 113200 may be maximized and therefore the additional transmission frames may have a structure very similar to that of the basic frames in order to maximize the extent of sharing with the basic frames. In addition, in this case, the time required for the receiver to receive a next additional transmission frame 113210-2 after receiving one additional transmission frame 113210-1 corresponds to 1 basic frame 113220 and therefore the superframe period is shorter than that of FIG. 13(A).

FIG. 14(A) and FIG. 14(B) illustrate a P1 symbol generation procedure for identifying additional frames according to an embodiment of the present invention.

In the case in which additional video data is transmitted through additional frames which are distinguished from basic frames as shown in FIG. 13, there is a need to transmit additional signaling information for enabling the receiver to identify and process an additional frame. An additional frame of the present invention may include a P1 symbol for transmitting such additional signaling information and the P1 symbol may be referred to as a new_system_P1 symbol. This new_system_P1 symbol may be different from a P1 symbol that is used in a conventional frame and a plurality of new_system_P1 symbols may be provided. In an embodiment, the new_system_P1 symbol may be located before a first P2 symbol in a preamble area of the frame.

The present invention may modify the P1 symbol of a conventional transmission frame and use the modified P1 symbol in order to generate the new_system_P1 symbol. To achieve this, the present invention proposes a method of generating the new_system_P1 symbol by modifying the P1 symbol structure of the conventional transmission frame or modifying a symbol generator 114100.

FIG. 14(A) shows the P1 symbol structure of the conventional transmission frame. In the present invention, it is possible to modify the PI symbol structure of the conventional transmission frame shown in FIG. 14(A) to generate the new_symbol_P1 symbol. In this case, the new_system_P1 symbol may be generated by changing frequency shift values f_SH for prefix and post fix of the conventional P1 symbol or by changing the duration (T_P1C or T_P1B) of the P1 symbol. However, when the P1 symbol structure is modified to generate an new_system_P1 symbol, parameters f_SH, T_P1C and T_P1B used for the P1 symbol structure need to be appropriately modified.

FIG. 14(B) illustrates a P1 symbol generator for generating a P1 symbol. The present invention may generate the new_system_P1 symbol by modifying the P1 symbol generator shown in FIG. 14(B). In this case, it is possible to generate the new_system_P1 symbol using a method of changing a distribution of active carriers used for a P1 symbol in a CDS table module 114110, an MSS module 114120 and a C-A-B structure module 114130 included in the P1 symbol generator 114100 (e.g. the CDS table module 114110 uses a different complementary set of sequence (CSS)) or a method of changing a pattern for information transmitted through the P1 symbol (e.g. the MSS module 114120 uses a different CSS).

Figure 15:
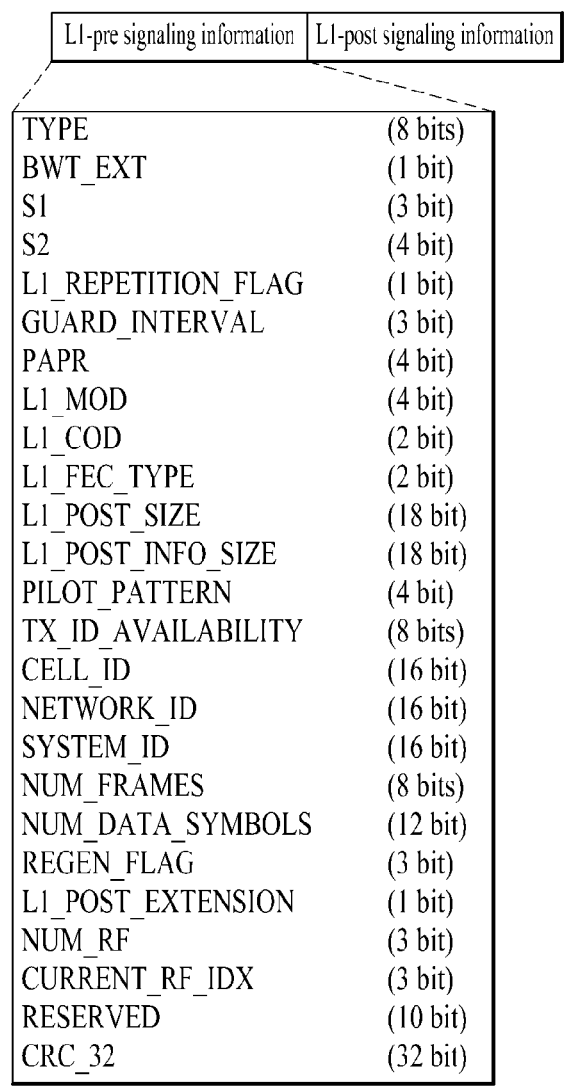
FIG. 15 illustrates L1-pre signaling information according to an embodiment of the present invention.

FIG. 15 shows L1-pre signaling information according to an embodiment of the present invention.

As described above, L1 signaling information may include L1-pre signaling information and L1-post signaling information.

FIG. 15 shows an embodiment of a table included in the L1-pre signaling information. The L1-pre signaling information may include information necessary to receive and decode the L1-post signaling information. Fields included in the table will now be described. The size of each field and field types that can be included in the table may be changed.

The TYPE field has 8 bits and may indicate whether the type of an input stream is TS or GS.

The BWT_EXT field has 1 bit and may indicate bandwidth extension of an OFDM symbol.

The S1 field has 3 bits and may represent whether a current transmission system is a MISO system or a MIMO system.

The S2 field has 4 bits and may indicate an FFT size.

The L1_REPETITION_FLAG field has 1 bit and may represent a repetition flag of an L1 signal.

The GUARD_Interval field has 3 bits and may indicate the size of a guard interval of the current transmission system.

The PAPR field has 4 bits and may indicate a PAPR reduction scheme. As described above, ACE or TR scheme may be used as the PAPR scheme in the present invention.

The L1_MOD field has 4 bits and may indicate QAM modulation type of the L1-post signaling information.

The L1_COD field has 2 bits and may indicate the code rate of the L1-post signaling information.

The L1_FEC_TYPE field has 2 bits and may indicate the FEC type of the L1-post signaling information.

The L1_POST_SIZE field has 18 bits and may indicate the size of the L1-post signaling information.

The L1_POST_INFO_SIZE field has 18 bits and may indicate the size of an information region of the L1-post signaling information.

The PILOT_PATTERN field has 4 bits and may indicate a pilot insertion pattern.

The TX_ID_AVAILABILITY field has 8 bits and may indicate transmitter identification availability in a current geographical cell range.

The CELL_ID field has 16 bits and may indicate a cell identifier.

The NETWORK_ID field has 16 bits and may indicate a network identifier.

The SYSTEM_ID field has 16 bits and may indicate a system identifier.

The NUM_FRAMES field has 8 bits and may indicate the number of transmission frames per super-frame.

The NUM_DATA_SYMBOLS field 12 bits and may indicate the number of OFDM symbols per transmission frame.

The REGEN_FLAG field has 3 bits and may indicate the number of regenerations of a signal according to a repeater.

The L1_POST_EXTENSION field has 1 bit and may indicate presence or absence of an extension block of the L1-post signaling information.

The NUM_RF field has 3 bits and may indicate the number of RF bands for TFS.

The CURRENT_RF_IDX field has 3 bits and may indicate the index of a current RF channel.

The RESERVED field has 10 bits and is reserved for later use.

The CRC_32 field has 32 bits and may indicate a CRC error extraction code of the L1-pre signaling information.

Figure 16:
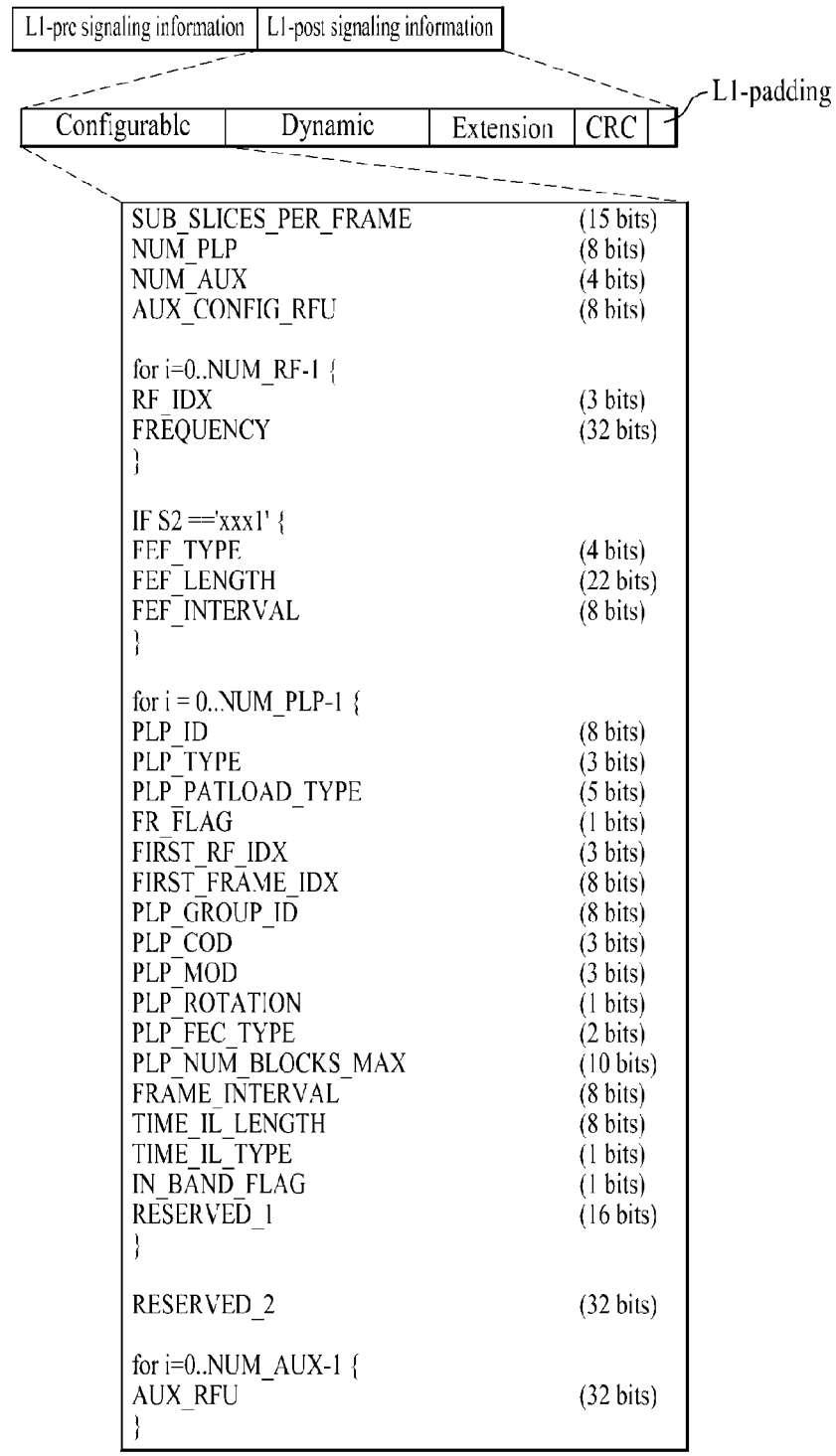
FIG. 16 illustrates L1-post signaling information according to an embodiment of the present invention.

FIG. 16 shows L1-post signaling information according to an embodiment of the present invention.

The L1-post signaling information may include parameters necessary for the receiver to encode PLP data.

The L1-post signaling information may include a configurable block, a dynamic block, an extension block, a cyclic redundancy check (CRC) block, and an L1 padding block.

The configurable block may include information equally applied to one transmission frame and the dynamic block may include characteristic information corresponding to a currently transmitted frame.

The extension block may be used when the L1-post signaling information is extended, and the CRC block may include information used for error correction of the L1-post signaling information and may have 32 bits. The padding block may be used to adjust sizes of information respectively included in a plurality of encoding blocks to be equal when the L1-post signaling information is transmitted while being divided into the encoding blocks and has a variable size.

FIG. 16 shows a table included in the configurable block, which includes the following fields. The size of each field and field types that can be included in the table are variable.

The SUB_SLICES_PER_FRAME field has a size of bits and may indicate the number of sub-slices per transmission frame.

The NUM_PLP field has a size of 8 bits and may indicate the number of PLPs.

The NUM_AUX field has a size of 4 bits and may indicate the number of auxiliary streams.

The AUX_CONFIG_RFU field has a size of 8 bits and is a reserved region.

The following fields are included in a frequency loop.

The RF_IDX field has a size of 3 bits and may indicate an RF channel index.

The FREQUENCY field has a size of 32 bits and may indicate an RF channel frequency.

The following fields are used only when the LSB of S2 field is 1, that is, when S2='xxx1'.

The FEF_TYPE field has a size of 4 bits and may be used to indicate a future extension frame (FEF).

The FEF_LENGTH field has a size of 22 bits and may indicate the length of an FEF.

The FEF_INTERVAL field has a size of 8 bits and may indicate the duration of an FEF interval.

The following fields are included in a PLP loop.

The PLP_ID field has a size of 8 bits and may be used to identify a PLP.

The PLP_TYPE field has a size of 3 bits and may indicate whether a current PLP is a common PLP or a PLP including normal data.

The PLP_PAYLOAD_TYPE field has a size of 5 bits and may indicate a PLP payload type.

The FF_FLAG flag has a size of 1 bit and may indicate a fixed frequency flag.

The FIRST_RF_IDX field has a size of 3 bits and may indicate the index of the first RF channel for TFS.

The FIRST_FRAME_IDX field has a size of 8 bits and may indicate the first frame index of a current PLP in a super-frame.

The PLP_GROUP_ID field has a size of 8 bits and may be used to identify a PLP group. A PLP group may be referred to as a link-layer-pipe (LLP) and PLP_GROUP_ID field is called LLP_ID field in an embodiment of the present invention.

The PLP_COD field has a size of 3 bits and may indicate a code rate of a PLP.

The PLP_MOD field has a size of 3 bits and may indicate a QAM type of a PLP.

The PLP_ROTATION field has a size of 1 bit and may indicate a constellation rotation flag of a PLP.

The PLP_FEC_TYPE field has a size of 2 bits and may indicate FEC type of a PLP.

The PLP_NUM_BLOCKS_MAX field has a size of 10 bits and may indicate a maximum number of PLPs of FEC blocks.

The FRAME_INTERVAL field has a size of 8 bits and may indicate an interval of a transmission frame.

The TIME_IL_LENGTH field has a size of 8 bits and may indicate a symbol interleaving (or time interleaving) depth.

The TIME_IL_TYPE field has a size of 1 bit and may indicate a symbol interleaving (or time interleaving) type.

The IM-BAND_B_FLAG field has a size of 1 bit and may indicate an in-band signaling flag.

The RESERVED_1 field has a size of 16 bits and is used in the PLP loop in the future.

The RESERVED_2 field has a size of 32 bits and is used in the configurable block in the future.

The following fields are included in an auxiliary stream loop.

The AUX_RFU field has a size of 32 bits and may be used in the auxiliary stream loop in the future.

Figure 17:
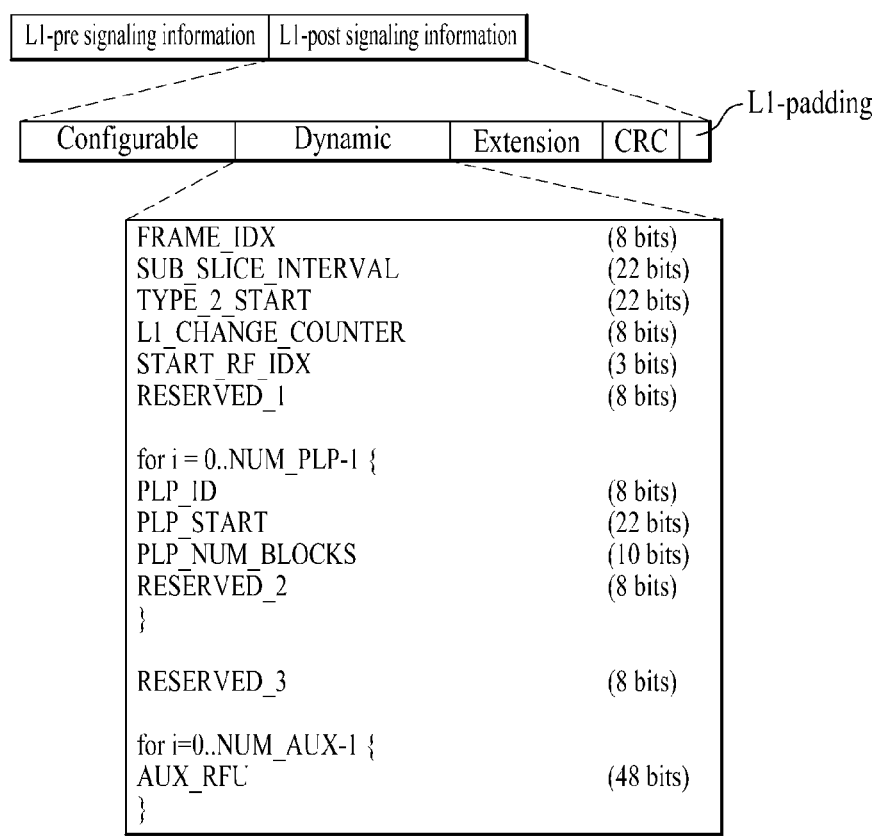
FIG. 17 illustrates L1-post signaling information according to another embodiment of the present invention.

FIG. 17 shows L1-post signaling information according to another embodiment of the present invention.

A table shown in FIG. 17 is included in the dynamic block and includes the following fields. The size of each field and field types that can be included in the table are variable.

The FRAME_IDX field has a size of 8 bits and may indicate a frame index in a super-frame.

The SIB_SLICE_INTERVAL field has a size of 22 bits and may indicate a sub-slice interval.

The TYPE_2_START field has a size of 22 bits and may indicate a start position of PLPs of a symbol interleaver over a plurality of frames. L1_CHANGE_COUNTER field has a size of 8 bits and may indicate a change in L1 signaling.

The START_RF_IDX field has a size of 3 bits and may indicate a start RF channel index for TFS.

The RESERVED_1 field has a size of 8 bits and is a reserved field.

The following fields are included in the PLP loop.

The PLP_ID field has a size of 8 bits and may be used to identify each PLP.

The PLP_START field has a size of 22 bits and may indicate a PLP start address in a frame.

The PLP_NUM_BLOCKS field has a size of 10 bits and may indicate the number of PLPs of FEC blocks.

The RESERVED_2 field has a size of 8 bits and may be used in the PLP loop in the future.

The RESERVED_3 field has a size of 8 bits and may be used in the dynamic block in the future.

The following field is included in the auxiliary stream loop.

The AUX_RFU field has a size of 48 bits and may be used in the auxiliary stream loop in the future.

In addition, the present invention proposes a MIMO system using scalable video coding (SVC). SVC is a video coding method developed to cope with a variety of terminals and communication environments and variations in the terminals and communication environments. SVC can code a video hierarchically such that desired definition is generated and transmit additional video data having a base layer from which video data about an image having basic definition can be restored and an enhancement layer from which an image having higher definition can be restored. Accordingly, a receiver can acquire the basic definition image by receiving and decoding only the video data of the base layer, or obtain the higher definition image by decoding the video data of the base layer and the video data of the enhancement layer according to characteristics thereof. In the following description, the base layer can include video data corresponding to the base layer and the enhancement layer can include video data corresponding to the enhancement layer. In the following, video data may not be a target of SVC, the base layer can include data capable of providing a fundamental service including basic video/audio/data corresponding to the base layer, and the enhancement layer can include data capable of providing a higher service including higher video/audio/data corresponding to the enhancement layer.

The present invention proposes a method of transmitting the base layer of SVC through a path through which signals can be received according to SISO or MISO using SVC and transmitting the enhancement layer of SVC through a path through which signals can be received according to MIMO in the broadcast system of the present invention. That is, the present invention provides a method by which a receiver having a single antenna acquires an image with basic definition by receiving the base layer using SISO or MISO and a receiver having a plurality of antennas acquires an image with higher definition by receiving the base layer and the enhancement layer using MIMO.

Figure 18:
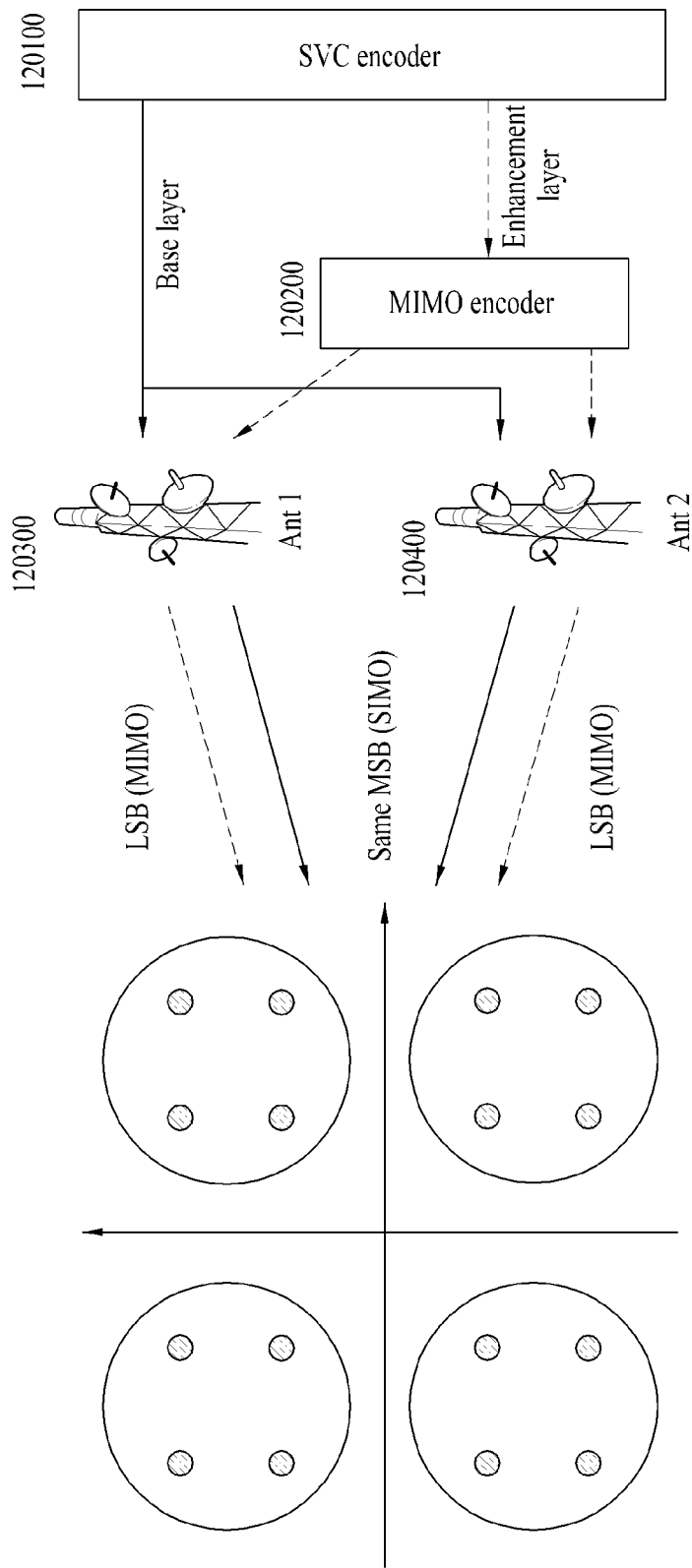
FIG. 18 illustrates an MIMO broadcast signal transceiver using SVC according to a first embodiment of the present invention.

FIG. 18 illustrates a MIMO broadcast signal transmitter and a transmission method using SVC according to a first embodiment of the present invention.

Referring to FIG. 18, the broadcast signal transmitter may include an SVC encoder 120100 for encoding a broadcast service using SVC, and a MIMO encoder 120200 for distributing data according to a space diversity or space multiplexing scheme such that the data can be transmitted through a plurality of antennas. The broadcast signal transmitter shown in FIG. 18 uses hierarchical modulation.

The SVC encoder 120100 encodes a broadcast service and outputs a base layer and an enhancement layer. The base layer is transmitted as the same data through a first antenna (Ant1) 120300 and a second antenna (Ant2) 120400. The enhancement layer is encoded by the MIMO encoder 120200 and transmitted as the same data or different data through the first and second antennas 120300 and 120400. In this case, the transmitter performs symbol mapping during data modulation, which is shown in the left of FIG. 18 (a symbol mapper is not shown).

The broadcast signal transmitter may map bits corresponding to the base layer to the MSB of data modulated during symbol mapping and map bits corresponding to the enhancement layer to the LSB of the data by performing hierarchical modulation.

Figure 19:
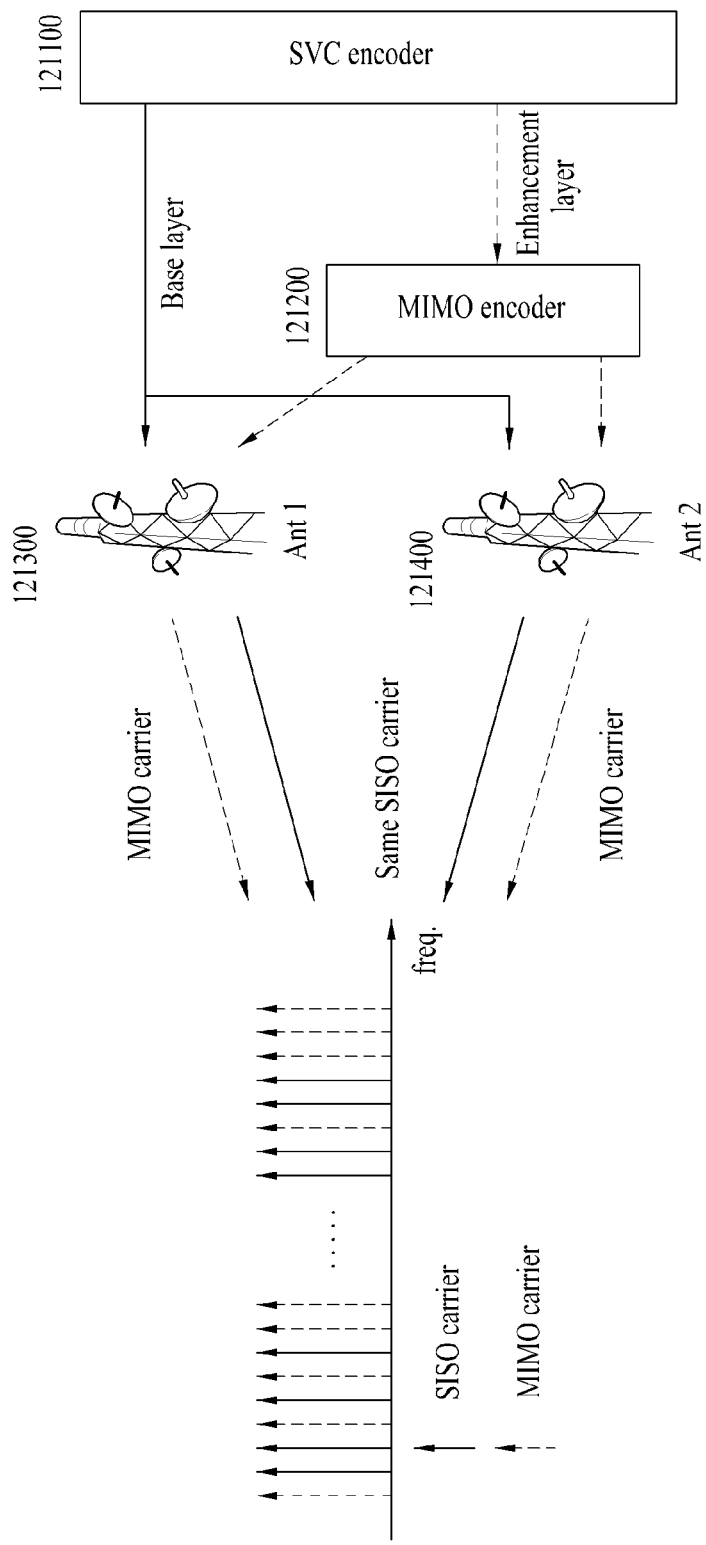
FIG. 19 illustrates a MIMO broadcast signal transceiver using SVC according to a second embodiment of the present invention.

FIG. 19 illustrates a MIMO broadcast signal transmitter and a transmission method using SVC according to a second embodiment of the present invention.

Referring to FIG. 19, the broadcast signal transmitter may include an SVC encoder 121100 for encoding a broadcast signal using SVC, and a MIMO encoder 121200 for distributing data according to a space diversity or space multiplexing scheme such that the data can be transmitted through a plurality of antennas. The broadcast signal transmitter shown in FIG. 19 uses frequency division multiplexing (FDM).

The SVC encoder 121100 encodes a broadcast service and outputs a base layer and an enhancement layer. The base layer is transmitted as the same data through a first antenna (Ant1) 121300 and a second antenna (Ant2) 121400. The enhancement layer is encoded by the MIMO encoder 121200 and transmitted as the same data or different data through the first and second antennas 121300 and 121400.

The broadcast signal transmitter may process data using FDM in order to improve data transmission efficiency and, particularly, may transmit data through a plurality of subcarriers using OFDM. In addition, the broadcast signal transmitter may classify subcarriers into subcarriers used to transmit SISO/MISO signals and subcarriers used to transmit MIMO signals and transmit the signals using the subcarriers. The base layer output from the SVC encoder 121100 may be transmitted through the plurality of antennas using SISO/SISO carriers, whereas the enhancement layer may be MIMO-encoded and then transmitted through the plurality of antennas using MIMO carriers.

A broadcast signal receiver may receive OFDM symbols, acquire the base layer by decoding data corresponding to the SISO/MISO carriers and acquire the enhancement layer by MIMO-decoding data corresponding to the MIMO carriers. Then, the service may be restored and provided using only the base layer when MIMO decoding cannot be performed, and using both the base layer and the enhancement layer when MIMO decoding can be performed according to channel state and reception system. In the second embodiment, since bit information of a service is subjected to MIMO processing after mapped to symbols, the MIMO encoder 121200 can be located after the symbol mapper so as to simplify the configuration of the broadcast signal transmitter than that of the broadcast signal transmitter shown in FIG. 19.

Figure 20:
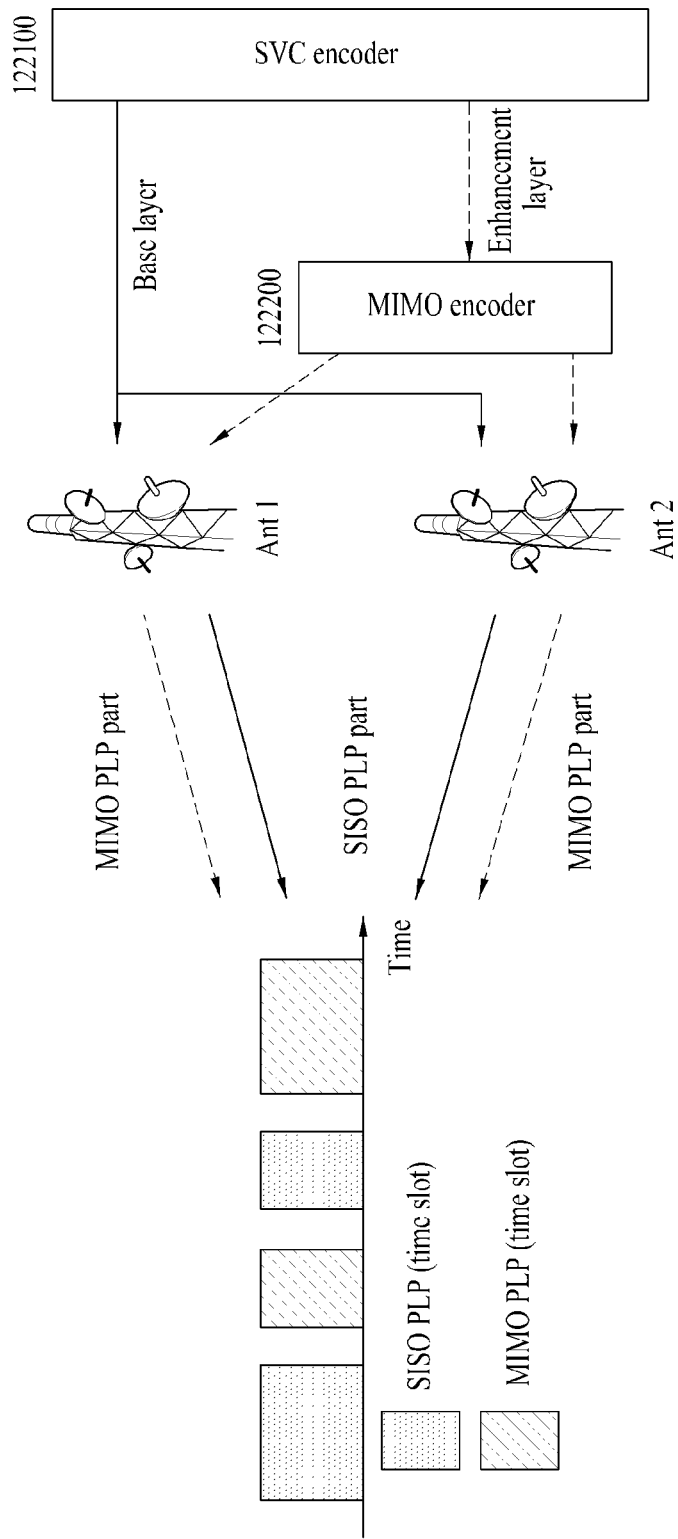
FIG. 20 illustrates a MIMO broadcast signal transceiver using SVC according to a third embodiment of the present invention.

FIG. 20 illustrates a MIMO broadcast signal transmitter and transmission method using SVC according to a third embodiment of the present invention.

Referring to FIG. 20, the broadcast signal transmitter may include an SVC encoder 122100 for encoding a broadcast service using SVC and a MIMO encoder 122200 for distributing data through space diversity or space multiplexing such that the data can be transmitted through a plurality of antennas. The broadcast signal transmitter shown in FIG. 20 uses time division multiplexing (TDM).

In the embodiment shown in FIG. 20, the broadcast signal transmitter may respectively transmit a base layer and an enhancement layer encoded according to SVC through SISO/MISO slots and MIMO slots. These slots may be time or frequency slots and they are time slots in the embodiment shown in FIG. 20. Otherwise, the slots may be PLPs. A broadcast signal receiver checks the type of received slots, receives the base layer from SISO/MISO slots and receives the enhancement layer from MIMO slots. As described above, the receiver may restore the service using only the base layer or by performing MIMO decoding and using both the base layer and the enhancement layer according to channel or receiver state.

In the above-mentioned first to third embodiments, the methods of generating the base layer and the enhancement layer using SVC and transmitting the base layer and the enhancement layer using one of SISO/SIMO and MIMO have been described. The base layer and the enhancement layer transmitted in this manner correspond to MIMO broadcast data. A description will be given of a method of transmitting the MIMO broadcast data including the base layer and the enhancement layer in association with terrestrial broadcast frames for transmitting terrestrial broadcast signals. In the following description, the MIMO broadcast data including the base layer and the enhancement layer may be generated according to one of the first to third embodiments or according to a combination of one or more of the first to third embodiments.

(1) Method of Transmitting MIMO Broadcast Data Using Predetermined PLP

It is possible to transmit the MIMO broadcast data included in a predetermined PLP while distinguishing the predetermined PLP from a PLP including terrestrial broadcast data. In this case, the predetermined PLP is used to transmit the MIMO broadcast data, and signaling information for describing the predetermined PLP may be additionally transmitted. In the following, the predetermined PLP including the MIMO broadcast data may be referred to as a MIMO broadcast PLP and the PLP including the terrestrial broadcast data may be referred to as a terrestrial broadcast PLP.

(2) Method of Transmitting MIMO Broadcast Data Using Predetermined Frame

It is possible to include the MIMO broadcast data generated as described above in a predetermined frame and to transmit the predetermined frame including the MIMO broadcast data while distinguishing the predetermined frame from a terrestrial broadcast frame. In this case, the predetermined frame is used to transmit the MIMO broadcast data, and signaling information for describing the predetermined frame may be additionally transmitted. The predetermined frame may be an FEF illustrated in FIG. 13. In the following description, the predetermined frame including the MIMO broadcast data is referred to as a MIMO broadcast frame.

(3) Method of Transmitting MIMO Broadcast PLP Using Terrestrial Broadcast Frame and MIMO Broadcast Frame PLPs including MIMO broadcast data may be transmitted through a terrestrial broadcast frame and a MIMO broadcast frame. Since a MIMO broadcast PLP may be present in the terrestrial broadcast frame (or basic frame), distinguished from the above-mentioned embodiments, it is necessary to signal the relationship between connected PLPs present in the terrestrial broadcast frame and the MIMO broadcast frame. To achieve this, the MIMO broadcast frame may also include L1 signaling information, and information about the MIMO broadcast PLP present in the broadcast frame may be transmitted along with L1 signaling information of the terrestrial broadcast frame.

MIMO broadcast PLPs included in the MIMO broadcast frame may include SISO, MISO and MIMO PLPs. In this case, SISO/MISO PLPs or carriers may transmit the base layer and MIMO PLPs or carriers may transmit the enhancement layer. The proportion of the SISO/MISO PLPs or carriers and the proportion of the MIMO PLPs may vary between 0 to 100%, and the proportions may be differently set on a per frame basis.

Figure 21:
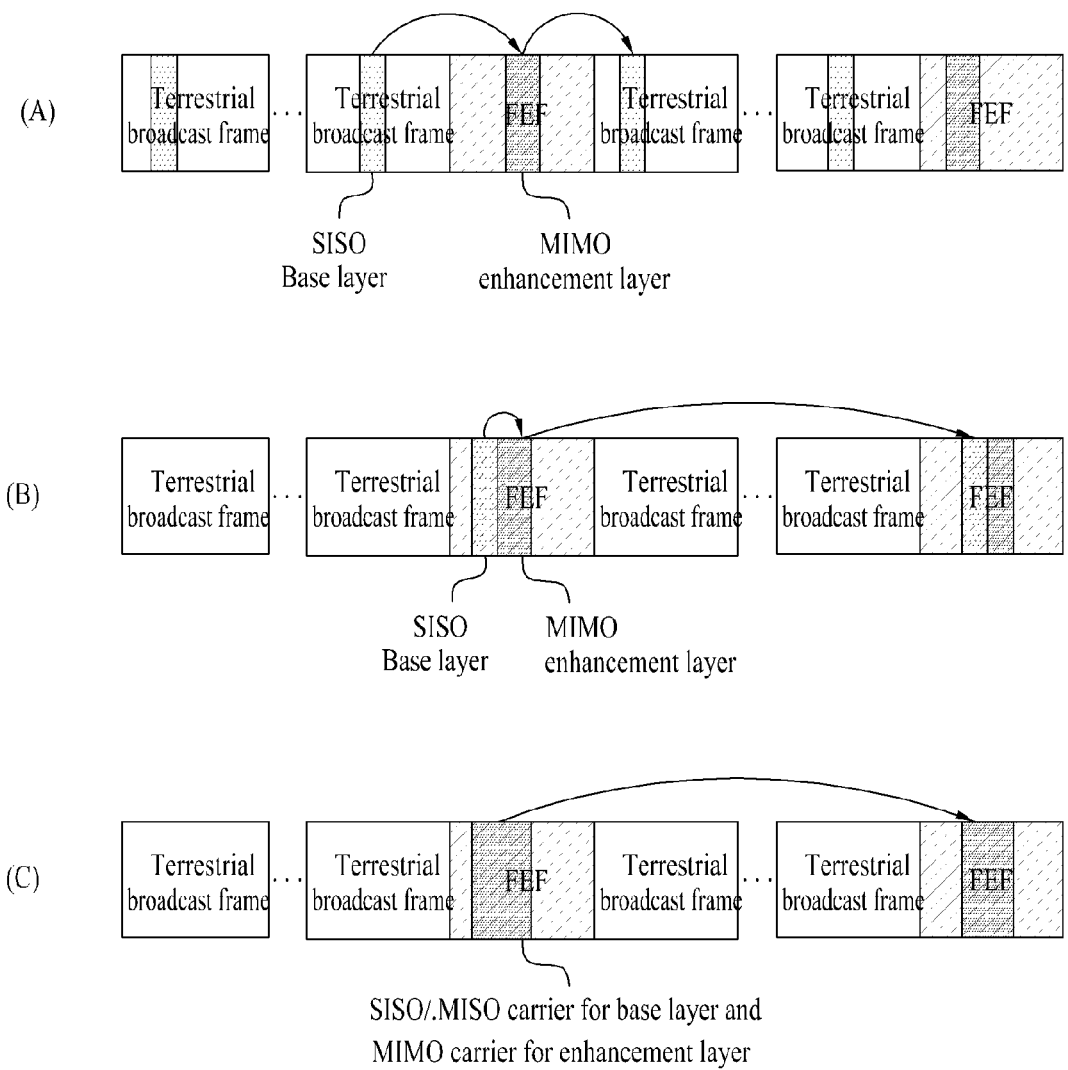
FIG. 21 illustrates a structure of a transmission stream transmitted by a terrestrial broadcast system to which a MIMO transmission system using SVC according to an embodiment of the present invention is applied.

FIG. 21 shows structures of transmission streams transmitted by a terrestrial broadcast system to which the MIMO transmission system using SVC according to an embodiment of the present invention is applied. FIG. 21 illustrates exemplary broadcast signals using at least one of the methods described with reference to FIGS. 18 to 20 and the methods (1), (2) and (3).

FIG. 21(A) illustrates a broadcast signal including terrestrial broadcast frames and MIMO broadcast frames. In FIG. 21(A), MIMO broadcast PLPs may be present in the terrestrial broadcast frames and MIMO broadcast frames. MIMO broadcast PLPs included in the terrestrial broadcast frames are base layers and MIMO broadcast PLPs included in the MIMO broadcast frames are enhancement layers. The MIMO broadcast PLPs may be transmitted according to SISO, MISO or MIMO.

FIG. 21(B) illustrates a broadcast signal including terrestrial broadcast frames and MIMO broadcast frames. In FIG. 21(B), MIMO broadcast PLPs may be present in only MIMO broadcast frames. In this case, the MIMO broadcast PLPs may include a PLP including a base layer and a PLP including an enhancement layer.

FIG. 21(C) illustrates a broadcast signal including terrestrial broadcast frames and MIMO broadcast frames. MIMO broadcast data is present in only MIMO broadcast frames. However, a base layer and an enhancement layer may be distinguished from each other by carriers instead of PLPs and transmitted, distinguished from FIG. 21(C). That is, it is possible to respectively allocate data corresponding to the base layer and data corresponding to the enhancement layer to separate subcarriers, modulate the data according to OFDM, and transmit the modulated data, as described with reference to FIG. 19.

In the aforementioned MIMO broadcast system using SVC, the broadcast signal transmitter may receive and process a base layer and an enhancement layer while distinguishing the base layer and the enhancement layer from each other using PLPs. For example, in the mode adaptation block 102100 for processing a plurality of PLPs, shown in FIG. 2(B), the base layer can be included in PLP0 and the enhancement layer can be included in PLP1. The broadcast signal receiver corresponding to the broadcast signal transmitter may receive and process a broadcast signal including the base layer and the enhancement layer distinguished from each other by PLPs and transmitted from the broadcast signal transmitter. The broadcast signal transmitter may transmit the base layer and the enhancement layer using one PLP. In this case, the broadcast signal transmitter may include an SVC encoder for SVC-encoding data and outputting the data as a base layer and an enhancement layer. The broadcast signal receiver corresponding to the broadcast signal transmitter may receive and process a broadcast signal including a base layer and an enhancement layer transmitted through one PLP.

MIMO is a broadcast system that provides transmit/receive diversity and high transmission efficiency using a plurality of transmit antennas and a plurality of receive antennas. MIMO can process signals differently in temporal and spatial dimensions and transmit a plurality of data streams through parallel paths simultaneously operating in the same frequency band to achieve diversity and high transmission efficiency.

In an embodiment, MIMO can use spatial multiplexing (SM) and Golden code (GC) schemes.

A modulation scheme in broadcast signal transmission may be represented as M-QAM (Quadrature Amplitude Modulation) in the following description. That is, BPSK (Binary Phase Shift Keying) can be represented by 2-QAM when M is 2 and QPSK (Quadrature Phase Shift Keying) can be represented by 4-QAM when M is 4. M can indicate the number of symbols used for modulation. A description will be given of a case in which a MIMO system transmits two broadcast signals using two transmit antennas and receives two broadcast signals using two receive antennas as an example.

Figure 22:
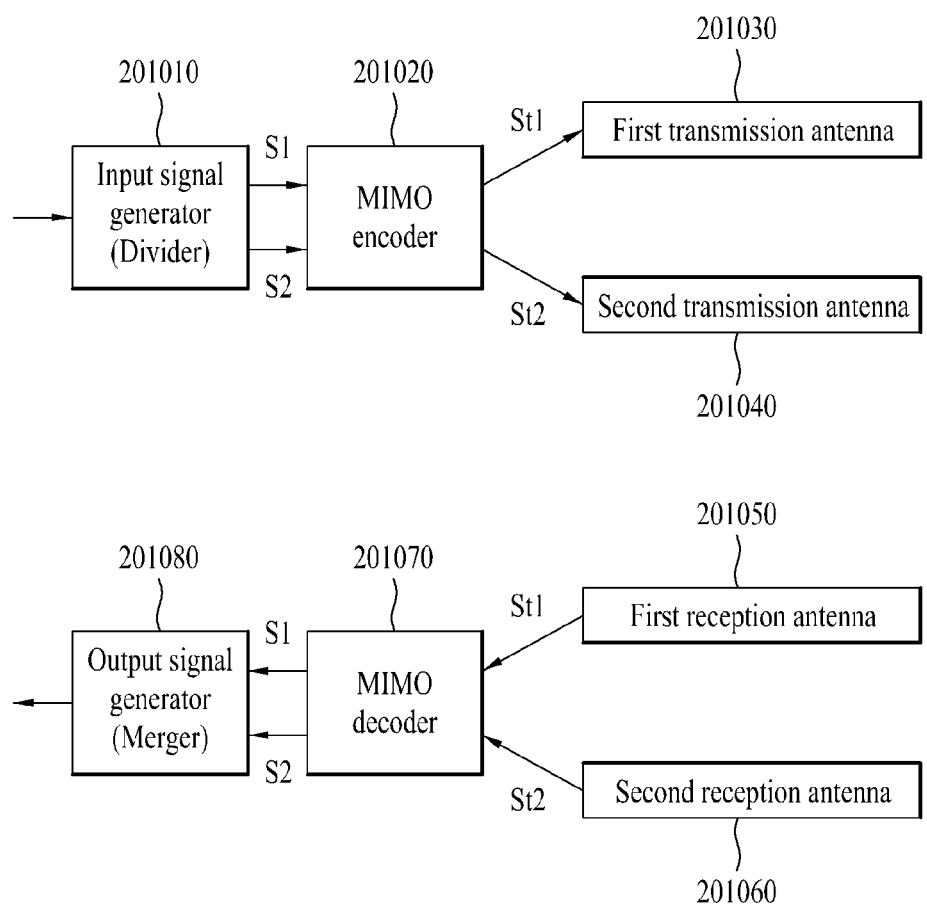
FIG. 22 illustrates a MIMO broadcast signal transceiving system according to an embodiment of the present invention.

FIG. 22 illustrates MIMO transmission and reception systems according to an embodiment of the present invention.

As shown in FIG. 22, the MIMO transmission system includes an input signal generator 201010, a MIMO encoder 201020, a first transmit antenna 201030, and a second transmit antenna 201040. In the following, the input signal generator 201010 may be referred to as a divider and the MIMO encoder 201020 may be referred to as a MIMO processor.

The MIMO reception system may include a first receive antenna 201050, a second receive antenna 201060, a MIMO decoder 201070, and an output signal generator 201080. In the following, the output signal generator 201080 may be referred to as a merger and the MIMO decoder 101070 may be referred to as an ML detector.

In the MIMO transmission system, the input signal generator 201010 generates a plurality of input signals for transmission through a plurality of antennas. In the following, the input signal generator 201010 may be referred to as a divider. Specifically, the input signal generator 201010 may divide an input signal for transmission into 2 input signals and output the first input signal S1 and the second input signal S2 for MIMO transmission.

The MIMO encoder 201020 may perform MIMO encoding on the plurality of input signals S1 and S2 and output a first transmission signal St1 and a second transmission signal St2 for MIMO transmission and the output transmission signals may be transmitted through a first antenna 201030 and a second antenna 201040 via required signal processing and modulation procedures. The MIMO encoding 201020 may perform encoding on a per symbol basis. The SM scheme or the GC scheme may be used as the MIMO encoding method. In the following, the MIMO encoder may be referred to as a MIMO processor. Specifically, the MIMO encoder may process a plurality of input signals according to a MIMO matrix and a parameter value of the MIMO matrix which are described below.

The input signal generator 201010 is an element that outputs a plurality of input signals for MIMO encoding and may also be an element such as a demultiplexer or a frame builder depending on the transmission system. The input signal generator 201010 may also be included in the MIMO encoder 201020 such that the MIMO encoder 201020 generates a plurality of input signals and performs encoding on the plurality of input signals. The MIMO encoder 201020 may be a device that performs MIMO encoding or MIMO processing on a plurality of signals and outputs the encoded or processed signals so as to acquire diversity gain and multiplexing gain of the transmission system.

Since signal processing should be performed on a plurality of input signals after the input signal generator 201010, a plurality of devices may be provided next to the input signal generator 201010 to process signals in parallel or one device including one memory may be provided to sequentially process signals or to simultaneously process signals in parallel.

The MIMO reception system receives a first reception signal Sr1 and a second reception signal Sr2 using a first receive antenna 201050 and a second receive antenna 201060. The MIMO decoder 201070 then processes the first reception signal and the second reception signal and outputs a first output signal and a second output signal. The MIMO decoder 201070 processes the first reception signal and the second reception signal according to the MIMO encoding method used by the MIMO encoder 201020. As an ML detector, the MIMO decoder 201070 outputs a first output signal and a second output signal using information regarding the channel environment, reception signals, and the MIMO matrix used by the MIMO encoder in the transmission system. In an embodiment, when ML detection is performed, the first output signal and the second output signal may include probability information of bits rather than bit values and may also be converted into bit values through FEC decoding.

The MIMO decoder of the MIMO reception system processes the first reception signal and the second reception signal according to the QAM type of the first input signal and the second input signal processed in the MIMO transmission system. Since the first reception signal and the second reception signal received by the MIMO reception system are signals that have been transmitted after being generated by performing MIMO encoding on the first input signal and the second input signal of the same QAM type or different QAM types, the MIMO reception system may determine a combination of QAM types of the reception signals to perform MIMO decoding on the reception signals. Accordingly, the MIMO transmission system may transmit information identifying the QAM type of each transmission signal in the transmission signal and the QAM type identification information may be included in a preamble portion of the transmission signal. The MIMO reception system may determine the combination of the QAM types of the reception signals from the QAM type identification information of the transmission signals and perform MIMO decoding on the reception signals based on the determination.

The following is a description of a MIMO encoder and a MIMO encoding method that have low system complexity, high data transmission efficiency, and high signal reconstruction (or restoration) performance in various channel environments according to an embodiment of the present invention.

The SM scheme is a method in which data is simultaneously transmitted through a plurality of antennas without MIMO encoding. In this case, the receiver can acquire information from data that is simultaneously received through a plurality of receive antennas. The SM scheme has an advantage in that the complexity of a Maximum Likelihood (ML) decoder that the receiver uses to perform signal reconstruction (or restoration) is relatively low since the decoder only needs to check a combination of received signals. However, the SM scheme has a disadvantage in that transmit diversity cannot be achieved at the transmitting side. In the case of the SM scheme, the MIMO encoder bypasses a plurality of input signals. In the following, such a bypass process may be referred to as MIMO encoding.

The GC scheme is a method in which data is transmitted through a plurality of antennas after the data is encoded according to a predetermined rule (for example, according to an encoding method using golden code). When the number of the antennas is 2, transmit diversity is acquired at the transmitting side since encoding is performed using a 2×2 matrix. However, there is a disadvantage in that the complexity of the ML decoder of the receiver is high since the ML decoder needs to check 4 signal combinations.

The GC scheme has an advantage in that it is possible to perform more robust communication than using the SM scheme since transmit diversity is achieved. However, such a comparison has been made when only the GC scheme and the SM scheme are used for data processing for data transmission and, if data is transmitted using additional data coding (which may also be referred to as outer coding), transmit diversity of the GC scheme may fail to yield additional gain. This failure easily occurs especially when such outer coding has a large minimum Hamming distance. For example, the transmit diversity of the GC scheme may fail to yield additional gain compared to the SM scheme when data is transmitted after being encoded by adding redundancy for error correction using a Low Density Parity Check (LDPC) code having a large minimum Hamming distance. In this case, it may be advantageous for the broadcast system to use the SM scheme having low complexity.

Accordingly, the present invention suggests that a more efficient MIMO broadcast system be designed using a robust outer code while using an SM scheme having low complexity. However, the SM scheme may have a problem associated with reception signal reconstruction (or restoration) depending on the degree of correlation between a plurality of MIMO transmission and reception channels.

Figure 23:
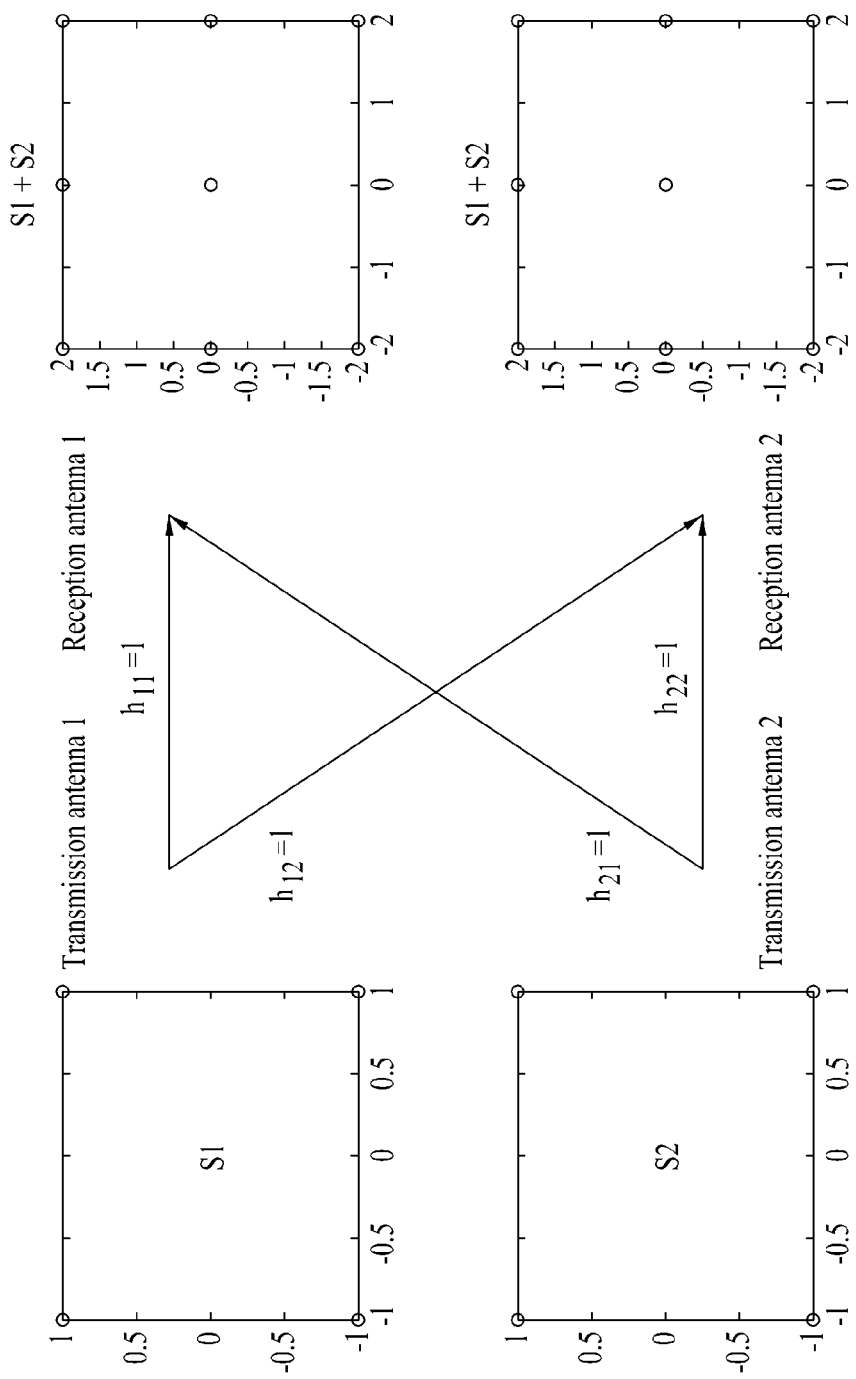
FIG. 23 illustrates a method of transceiving data dependent on MIMO transmission of an SM scheme in channel environment according to an embodiment of the present invention.

FIG. 23 illustrates a data transmission and reception method according to MIMO transmission of the SM scheme in a channel environment according to an embodiment of the present invention.

The MIMO transmission system may transmit input signal 1 (S1) and input signal 2 (S2) respectively through transmit antenna 1 and transmit antenna 2 according to the SM scheme. FIG. 23 illustrates an embodiment in which the transmitting side transmits a symbol modulated according to 4-QAM.

The transmit antenna 1 receives a signal through two paths. In the channel environment of FIG. 23, the received signal of the receive antenna 1 is S1*$h_{11}$+S2$h_{21}$ and the received signal of the receive antenna 2 is S1*$h_{12}$+S2$h_{22}$. The receiving side may acquire S1 and S2 through channel estimation to reconstruct data.

This is a scenario in which the transmission and reception paths are independent of each other. In the following, such an environment is referred to as being uncorrelated. On the other hand, channels of the transmission and reception paths may have a very high correlation with each other as in a Line Of Sight (LOS) environment, which is referred to as being fully correlated in the following description.

In the case in which channels are fully correlated in MIMO, each channel may be represented by a 2×2 matrix whose elements are all 1 (i.e., $h_{11}=h_{12}=h_{21}=h_{22}=1$) as shown in FIG. 23. Here, the receive antenna 1 and the receive antenna 2 receive the same reception signal (S1+S2). That is, if signals transmitted through 2 transmit antennas pass through the same channel and are received by 2 receive antennas, a reception signal received by the receiver, i.e., data added (or combined) through the channel, cannot express both symbols S1 and S2. As shown in FIG. 23, in the fully correlated channel environment, the receiver cannot receive a 16-QAM symbol, into which the signal S1 represented by a 4-QAM symbol and the signal S2 represented by a 4-QAM symbol are combined and the receiver cannot separate and reconstruct the signals S1 and S2 since the receiver receives a combined signal S1+S2 represented by 9 symbols as shown on the right side of FIG. 23.

In the following, a received signal that has passed through fully correlated channels may be represented by a signal corresponding to the sum of signals transmitted by the transmission system. That is, the MIMO encoding method will now be described on the assumption that, when the transmission system having two antennas transmits a first transmission signal and a second transmission signal, a received signal that has passed through the fully correlated channels corresponds to the sum of the first and second transmission signals.

In this case, the receiver cannot reconstruct a signal received according to MIMO using the SM scheme even when the receiver is in a very high SNR environment. In the case of a communication system, communication is generally performed in two ways and therefore such a channel environment may be signaled to the transmitter through a feedback channel established between the transmitter and the receiver to allow the transmitter to change the transmission method. However, in the case of a broadcast system, it may be difficult to perform bidirectional communication through a feedback channel and one transmitter covers a large number of receivers and a large range and therefore it may be difficult to deal with various channel environment changes. Accordingly, if the SM scheme is used in such a fully correlated channel environment, the receiver cannot receive services and it is difficult to deal with such an environment, increasing costs, unless the coverage of the broadcast network is reduced.

The following is a description of a method for dealing with the case in which the correlation between MIMO channels is 1, i.e., the case in which channels are in a fully correlated channel environment.

The present invention suggests that a MIMO system be designed such that signals received through MIMO channels satisfy the following conditions so as to deal with the case in which the MIMO channels are fully correlated.

1) A received signal should be able to represent both original signals S1 and S2. That is, coordinates of a constellation received by the receiver should be able to uniquely represent sequences of S1 and S2.

2) A minimum Euclidean distance of a received signal should be increased so as to reduce symbol error rate.

3) Hamming distance characteristics of a received signal should be good so as to reduce bit error rate.

First, the present invention suggests a MIMO encoding method that uses a MIMO encoding matrix including an encoding factor "a" as expressed in the following Equation 1 so as to satisfy such requirements.

$$\begin{bmatrix} 1 & a \\ a & -1 \end{bmatrix}$$ [Equation 1]

When a MIMO encoder encodes input signals S1 and S2 using a MIMO encoding matrix as shown in Equation 1, reception signal 1 (Rx1) and reception signal 2 (Rx2) received by antenna 1 and antenna 2 are calculated as expressed in the following Equation 2. The reception signal 1 (Rx1) and reception signal 2 (Rx2) are calculated as expressed in the last line of Equation 2, especially, when MIMO channels are fully correlated.

$Rx_1 = h_{11}(S1+aS2)+h_{21}(aS1-S2),$ if $h_{11}=h_{21}=h_{12}=h_{22}=h,$ $Rx_2 = h_{12}(S1+aS2)+h_{22}(aS1-S2)$ $R=Rx_1=Rx_2=h\{(a+1)S1+(a-1)S2\}$ [Equation 2]

First, when MIMO channels are uncorrelated, the reception signal 1 (Rx1) is calculated as $Rx1=h_{11}(S1+a*S2)+h_{21}(a*S1-S1)$ and the reception signal 2 (Rx2) is calculated as $Rx2=h_{12}(S1+a*S2)+h_{22}(a*S1-S2)$. Thus, since the signals S1 and S2 have the same power, it is possible to use gain of the MIMO system together with the SM scheme. When MIMO channels are fully correlated, the reception signals (R=Rx1=Rx2) expressed as $R=h\{(a+1)S1+(a-1)S2\}$ are acquired and therefore it is possible to separate and acquire the signals S1 and S2 and the signals S1 and S2 are designed such that both have different power and therefore it is possible to secure robustness accordingly.

That is, the MIMO encoder may encode input signals S1 and S2 such that the input signals S1 and S2 have different powers according to the encoding factor "a" and are also received with different distributions even in fully correlated channels. For example, input signals S1 and S2 may be encoded such that both have different powers and the encoded signals may then be transmitted using constellations which have different Euclidean distances through normalization to allow the receiver to separate and reconstruct the input signals even when the signals have passed through fully correlated channels.

The MIMO encoding matrix described above may be represented as Equation 3 taking into consideration a normalization factor.

$$\frac{1}{\sqrt{1+a^2}}\begin{pmatrix} 1 & a \\ a & -1 \end{pmatrix} =$$ [Equation 3]

$$\begin{pmatrix} \frac{1}{\sqrt{1+a^2}} & \frac{a}{\sqrt{1+a^2}} \\ \frac{a}{\sqrt{1+a^2}} & \frac{-1}{\sqrt{1+a^2}} \end{pmatrix} = \begin{bmatrix} \cos\theta & \sin\theta \\ \sin\theta & -\cos\theta \end{bmatrix}$$

MIMO encoding of the MIMO encoder that uses the MIMO encoding matrix (or rotation matrix) shown in Equation 3 may be considered as rotating the input signals by an arbitrary angle of θ that can be represented by the encoding factor a, separating the cosine and sine components (or real and imaginary components) of the rotated signals, assigning positive and negative (+/−) signs to the separated components, and transmitting the separated components through different antennas. For example, the MIMO encoder may encode the input signals S1 and S2 such that the cosine component of the input signal S1 and the sine component of the input signal S2 are transmitted through one transmit antenna and the sine component of the input signal S1 and the cosine component of the input signal S2 to which a negative sign is attached are transmitted through another transmit antenna. The angle, by which the input signals are rotated, changes according to change of the value of the encoding factor "a" and the power distributions of the input signals S1 and S2 become different according to the value of the factor and the angle. Since the power distribution difference can be represented by a distance between symbol coordinates in the constellations, the encoded input signals can be represented by different constellations even when the input signals are received by the receiving side via fully correlated channels such that it is possible to identify and separate the signals, thereby enabling reconstruction of the original input signals.

Specifically, the Euclidian distances of transmission signals change as the power distributions change, the transmission signals received by the receiving side can be represented by identifiable constellations having different Euclidian distances such that it is possible to reconstruct the signals even when the signals have passed through a fully correlated channel. That is, the MIMO encoder can encode the input signal S1 and the input signal S2 into signals having different Euclidian distances according to the value "a" and the receiving side can receive and reconstruct the encoded and transmitted signals using identifiable constellations.

MIMO encoding of the input signals using the above-described MIMO encoding matrix may be represented as Equation 4.

$$\begin{pmatrix} X1 \\ X2 \end{pmatrix} = \frac{1}{\sqrt{1+a^2}} \begin{pmatrix} 1 & a \\ a & -1 \end{pmatrix} \begin{pmatrix} S1 \\ S2 \end{pmatrix}$$ [Equation 4]

In Equation 4, S1 and S2 respectively represent normalized QAM symbols of constellations mapped by symbol mappers on MIMO paths of the input signals S1 and S2. X1 and X2 respectively denote MIMO-encoded symbols. That is, the MIMO encoder can apply the matrix as represented by Equation 4 to the first input signal including the symbols corresponding to S1 and the second input signal including the symbols corresponding to S2 to output a first transmission signal including the symbols corresponding to X1 and a second transmission signal including the symbols corresponding to X2.

The MIMO encoder may perform encoding on input signals using the MIMO encoding matrix described above while additionally adjusting the encoding factor a. That is, it is possible to adjust and optimize the encoding factor "a" taking into consideration additional data reconstruction performance of the MIMO transmission and reception system.

1. First Embodiment: MIMO Encoding Method that Optimizes the Encoding Factor "a" Taking into Consideration Euclidian Distances (in a Fully Correlated MIMO Channel Environment)

It is possible to calculate the encoding factor value "a" taking into consideration the Euclidean distance while using the MIMO encoding matrix. In a MIMO system having two transmit antennas and two receive antennas, when transmission signal St1 is an M-QAM symbol and transmission signal St2 is an N-QAM symbol, a signal St1+St2 that is received by the receiving side via a fully correlated MIMO channel is an (M*N)-QAM signal. Additionally, in a MIMO system having 2 transmission antennae and 2 reception antennae, when the transmission signal St1 corresponds to an M-QAM symbol, and when the transmission signal St2 corresponds to an M-QAM symbol, the signal St1+St2 passing through a fully correlated channel and being received by the receiving end becomes an (M*M)-QAM signal.

The first embodiment of the present invention suggests a method for optimizing the value "a" such that symbols have the same Euclidian distance in a constellation of a symbol of a reception signal that has passed through a fully correlated channel. That is, in the case in which input signals are encoded using the MIMO matrix, it is possible to calculate or set the value of the encoding factor "a" such that reception symbols have the same Euclidian distances in a constellation of a reception signal that has passed through a fully correlated channel and to encode the input signals using the calculated or set value "a" of the encoding factor. Such a value "a" may be represented by Equation 5 for each modulation scheme combination.

$$a = \begin{cases} 3, & \text{for } QPSK + QPSK \\ (4+\sqrt{5})/(4-\sqrt{5}), & \text{for } QPSK + 16 \text{ QAM} \\ 0.6, & \text{for } 16 \text{ QAM} + 16 \text{ QAM} \end{cases}$$ [Equation 5]

The distribution and constellation of the transmission and reception symbols change according to modulation schemes of the reception signals and a combination of the modulation schemes and the Euclidean distance changes according to the distribution and constellation of the symbols and therefore the value "a" for optimizing the Euclidean distance may also change accordingly. Equation 3 also shows an encoding factor value "a" for optimizing the Euclidean distance calculated when transmission and reception signals are a combination of 4-QAM and 16-QAM (i.e., QPSK+16-QAM) and an encoding factor value "a" calculated when transmission and reception signals are a combination of 16-QAM and 16-QAM (i.e., 16-QAM+16-QAM).

In other words, in the first embodiment, the value "a" is set such that the constellation of a signal obtained by summing first and second transmission signals that are obtained by MIMO-encoding first and second 4-QAM input signals, for example, is identical to the constellation of a 16-QAM signal.

2. Second Embodiment: MIMO Encoding Method Taking into Consideration Gray Mapping in Addition to Euclidian Distance The second embodiment suggests a MIMO encoding method in which an encoding factor value "a" is set so as to optimize the Euclidean distance, similar to the first embodiment, and MIMO encoding is performed such that a reception signal that has passed through a fully correlated channel has a gray mapping (or gray mapping form).

In the MIMO encoding method of the second embodiment, at the receiving side, the signs of real and imaginary parts of the input signal S2 among the input signals S1 and S2 may be changed according to a value of the input signal S1 such that each signal becomes a gray mapping signal. Data values included in the input signal S2 may be changed using a method represented by the following Equation 6.

That is, the MIMO encoder may perform MIMO encoding after changing signs of the input signal S2 according to the value of the input signal S1 while using the same MIMO encoding factor as used in the first embodiment. In other words, the sign of the input signal S2 may be determined according to the sign of the input signal S1, and then the MIMO encoding matrix may be applied to the first and second input signals S1 and S2 to output the first and second transmission signals, as described above.

Equation 6

$S1 = b_0 b_1 ... b_{N-1}$, $N = \log_2 M$, $M$ = QAM size of S1
real(S1) = $b_0 b_2 .. b_{N-2}$
imag(S1) = $b_1 b_3 .. b_{N-1}$ Equation 6

```
for i = 1...N − 1
    si = sq = 1
    if i = index of real(S1) and b₁ = 1
        si = −si
    if i = index of imag(S1) and b₁ = 1
        sq = −sq
end for
S2 = si · real(S2) + i · sq · imag(S2)
```

If bit values assigned to the real and imaginary parts of the input signal S1 among the input signals S1 and S2 and are XORed as in Equation 6 and the signs of the real and imaginary parts are determined according to the XORed value and transmission signal 1 and transmission signal 2 are transmitted respectively through antenna 1 and antenna 2, then reception symbols of a reception signal, which is received by the receiver via a fully correlated channel, have a gray mapping form such that the Hamming distance between adjacent symbols in the constellation does not exceed 2.

Since an (M*N)-QAM signal received by the receiver has a minimum Euclidean distance and a gray mapping form, the second embodiment may achieve the same performance as the SIMO scheme even in a fully correlated MIMO channel environment. However, when signals S1 and S2 are acquired by decoding the reception signal at the ML decoder, complexity may be increased since the value of S2 depends on the value of S1 and performance may be degraded due to the correlation between input signals in an uncorrelated MIMO channel.

3. Third Embodiment: MIMO Encoding Method that Sets MIMO Encoding Factor Taking into Consideration Hamming Distance in Addition to Euclidian Distance The third embodiment suggests a method in which MIMO encoding is performed by setting an encoding factor value "a" so as to optimize the Euclidian distance taking into consideration the Hamming distance of a reception signal rather than allowing the entire constellation of the reception signal to have a Euclidian distance as in the first embodiment.

In the third embodiment, the Euclidian distance is adjusted so as to compensate for the reconstruction performance difference due to the Hamming distance difference using the power difference. That is, the Euclidian distance between adjacent symbols in an interval, whose Hamming distance is twice greater than another interval since the number of bits thereof is twice greater than the other interval, can be increased so as to increase power of the interval, thereby compensating for performance degradation due to the Hamming distance difference when a reception signal is reconstructed. First, a relative Euclidian distance of a reception signal into which 2 transmission signals St1 and St2 received by the receiver are combined is determined. It can be seen from the above Equation 1 that the minimum Euclidean distance of a 16-QAM symbol whose power is reduced is 2(a−1) and the minimum Euclidean distance of a 16-QAM symbol whose power is increased is 2(a+1) (since one reception signal is expressed as R=h{(a+1)S1+(a−1)S2}). This may be represented by Equation 7.

$$2D_{H_1} = D_{H_2}$$
$$\sqrt{2} D_{E_1} = D_{E_2}$$
$$2\sqrt{2}(a-1) = 2((a+1) - 3(a-1))$$
$$a = \frac{\sqrt{2}+4}{\sqrt{2}+2}$$

[Equation 7]

That is, the MIMO encoder performs MIMO encoding on input signals by distributing different powers to the input signals using the MIMO matrix such that the signals have different Euclidian distances. In this case, the MIMO encoder may perform MIMO encoding by calculating and setting the encoding factor value "a" such that input signals with distributed power have Euclidian distances for compensating for a Hamming distance difference according to the third embodiment.

A description will be given of an MIMO transmitter and MIMO receiver using the aforementioned MIMO method.

Figure 24:
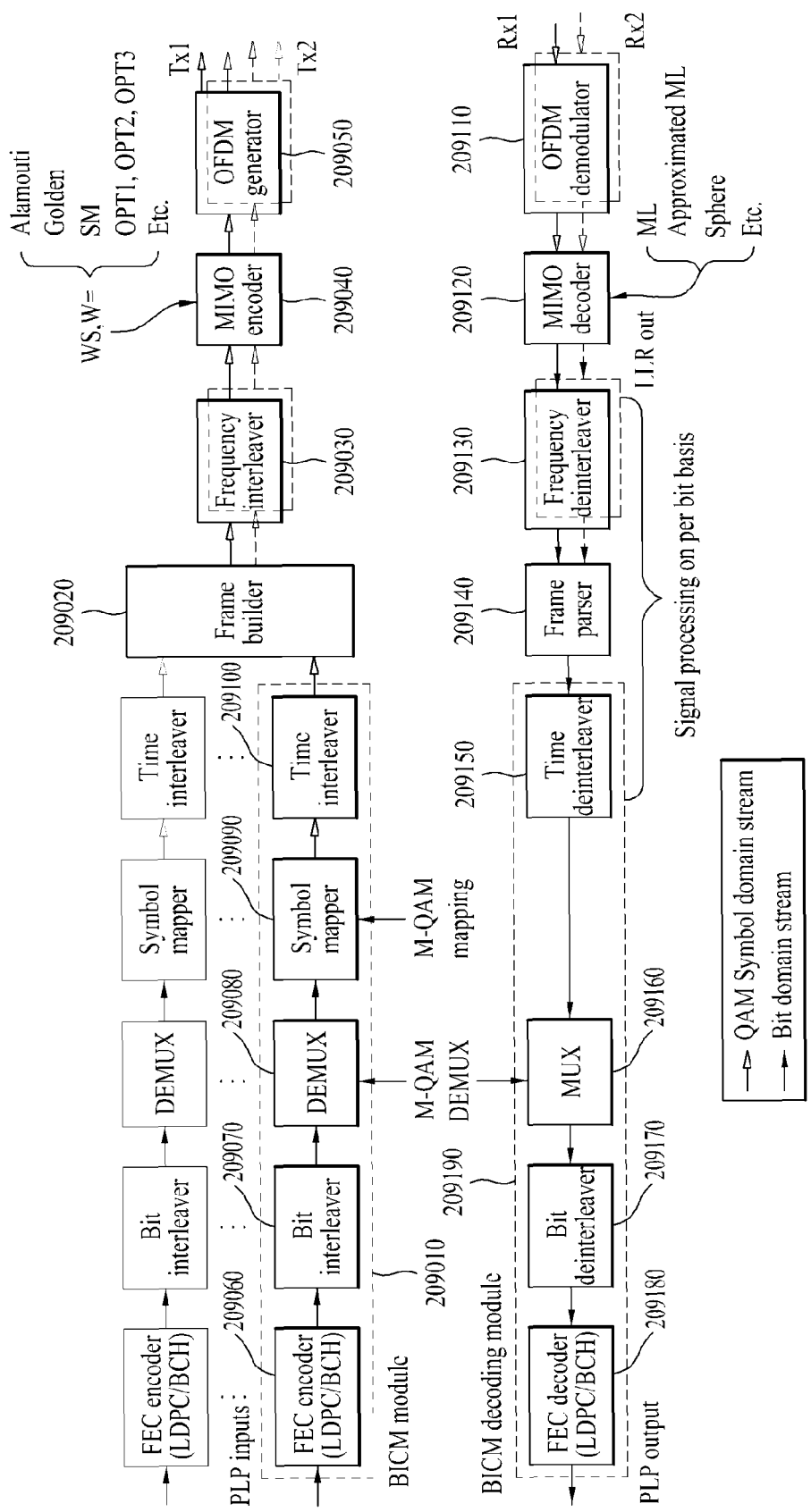
FIG. 24 illustrates an MIMO transmitter and an MIMO receiver according to an embodiment of the present invention.

FIG. 24 is a block diagram illustrating a MIMO transmitter and a MIMO receiver according to an embodiment of the present invention.

FIG. 24 illustrates an embodiment in which the MIMO transmitter and the MIMO receiver perform MIMO communication using two antennas, respectively. Particularly, the MIMO transmitter uses the same modulation scheme for input signals. That is, M-QAM is used as a modulation scheme for two input signals to transmit the two input signals through two antennas (e.g. QPSK+QPSK or 16-QAM+16-QAM). Hereinafter, this may be expressed as an M-QAM+M-QAM.

The MIMO transmitter may include a BICM module 209010, a frame builder 209020, a frequency interleaver 209030, a MIMO encoder 209040, and an OFDM generator 209050. The BICM module 209010 may include an FEC encoder 209060, a bit interleaver 209070, a demultiplexer 209080, a symbol mapper 209090, and a time interleaver 209100. The MIMO encoder 209040 may be referred to as a MIMO processor.

The MIMO receiver may include an OFDM demodulator 209110, a MIMO decoder 209120, a frequency deinterleaver 209130, a frame parser 209140, a time deinterleaver 209150, a multiplexer 209160, a bit deinterleaver 209170, and an FEC decoder 209180. The time deinterleaver 209150, the multiplexer 209160, the bit deinterleaver 209170 and the FEC decoder perform a reverse procedure of the procedure of the BICM module and may be referred to as a BICM decoding module 209190 in the following. The MIMO decoder 209120 may be referred to as a MIMO maximum likelihood (ML) detector.

Hereinafter, the elements of the MIMO transmitter may perform the same functions as the blocks included in the broadcast signal transmitter shown in FIG. 1 to FIG. 6, and the elements of the MIMO receiver may perform the same functions as the blocks included in the broadcast signal receiver shown in FIG. 7 to FIG. 11. Therefore, detailed description of the same or similar functions will be omitted for simplicity.

In the MIMO transmitter, a plurality of PLPs is input to respective BICM paths. FIG. 24 illustrates that one PLP is input to the BICM module 209010. The MIMO transmitter may include a plurality of BICM modules and PLPs respectively subjected to BICM may be applied to the frame builder 209020. The demultiplexer 209080 demultiplexes the bitstreams on the basis of M-QAM. The symbol mapper 209090 performs M-QAM gray mapping on the bitstreams output from the demultiplexer 209080 to output M-QAM symbol streams. The time interleaver 209100 interleaves the symbol streams in time and, particularly, time-interleaves symbols output from one or more LDPC blocks. In FIG. 24, signal processing in blocks following the symbol mapper may be performed on a symbol-by-symbol basis.

The frame builder 209020 arranges the symbols in PLPs, output through each BICM path, in frames. The frame builder 209020 additionally functions as an input signal generator that generates or arranges a plurality of input signals for MIMO transmission. Here, the frame builder 209020 in the MIMO transmitter may arrange symbols such that different PLPs are not encoded together. In the embodiment of FIG. 24 in which signals are transmitted using two antennas, the frame builder 209020 may arrange two different symbols in the same cell position to generate and output two input signals. When the frame builder 209020 outputs two symbol data (i.e. two input signals) allocated to the same cell position in parallel, the frequency interleaver 209030 interleaves the two symbol data in the same pattern in the frequency domain. The MIMO encoder 209040 MIMO-encodes the two input signals for the two antennas, that is, the two symbol data output from the frequency interleaver 209030. Here, the MIMO encoding method can be used for MIMO encoding, and thus the aforementioned MIMO encoding matrix including parameter a can be used.

The OFDM generator 209050 may OFDM-modulate the MIMO-encoded symbol data and transmit the OFDM-modulated symbol data. The MIMO encoder 209040 may perform MISO processing or SISO processing in addition to MIMO encoding. In the embodiment of FIG. 24, the MIMO transmitter may use two antennas when only MIMO processing is performed and may use four antennas when MISO processing is additionally performed. When all PLPs are processed according to SISO and transmitted, one to four antennas may be arbitrarily used.

The MIMO receiver uses at least two antennas to receive a MIMO signal. If a received signal is a SISO signal or a MISO signal, the MIMO receiver may use one or more antennas.

The MIMO transmitter may include as many frequency interleavers and OFDM generators as the number of input signals transmitted to a plurality of antennas, which are arranged in parallel, such that the frequency interleavers 209030 and the OFDM generator 209050 can perform the aforementioned operations in parallel. Otherwise, one frequency interleaver 209030 and one OFDM generator 209050 may include memories to process a plurality of signals in parallel.

In the MIMO receiver, the OFDM demodulator 209110 OFDM demodulates a plurality of receiving signals that are received from a plurality of antennae and transmits a plurality of symbol data and channel information.

The MIMO decoder 209120 processes the channel information and the plurality of received symbol data output from the OFDM demodulator 209110 and outputs a plurality of output signals. The MIMO decoder 209120 can use the following Equation 8.

$$\log\left(\frac{\sum_{s \in S_0} e^{-\frac{1}{2\sigma^2}\sum_{s,h,t}|y_{h,t}-H_{h,t}WS_s|^2}}{\sum_{s \in S_1} e^{-\frac{1}{2\sigma^2}\sum_{s,h,t}|y_{h,t}-H_{h,t}WS_s|^2}}\right) \quad \text{[Equation 8]}$$

In Equation 8, $y_{h,t}$ denotes a signal received by the receiver where h denotes a channel received for each receive antenna. That is, $y_{h,t}$ represents a received signal that has passed through a channel corresponding to time t. For example, $y_{h,t}$ represents signals received during one unit time and represents signals received for time of two units in the case of the GC scheme. $H_{h,t}$ denotes channel information to which the received signal has been subjected. In the embodiments of the present invention, h may be represented by a 2×2 matrix indicating a MIMO channel and t denotes a time unit. W denotes a MIMO encoding matrix and $S_s$ is a transmitted QAM signal that represents an input signal before MIMO-encoding. In addition, s is a unit for two signals used for MIMO transmission.

In Equation 8, $\|Y-HWS\|^2$ represents a difference between a received signal vector (two signals can be referred to as a vector because they are simultaneously transmitted) and a transmitted signal vector, and the receiver detects vector $S_s$ that minimize the difference. Since the receiver knows $y_{h,t}$, $H_{h,t}$ and W, the receiver can acquire a log likelihood ratio (LLR) by comparing probability S1 that a corresponding bit is 1 with probability S0 that the corresponding bit is 0 in the log domain.

As described above, the MIMO decoder 209120 uses a method of detecting a signal closest to a transmitted signal from a received signal using Equation 8, and information acquired from the detection is bit-based probability, and thus a plurality of output signals of the MIMO decoder 209120 bit-based data represented in an LLR. Here, the MIMO decoder 209120 compares all combinations of data used for MIMO encoding and channel information with received data in order to obtain the LLR. In this case, the MIMO decoder 209120 may use an approximated ML scheme that uses only a value closest to the received data, a sphere decoding scheme that uses only a combination of values within a predetermined distance from the received data, etc. That is, in FIG. 24, the MIMO decoder 209120 MIMO-decodes two signals received through the two antennas to output as many output signals S1 and S2 as the number of input signals of the transmitter. Here, the output signals S1 and S2 may be bitstreams. In this case, the output signals correspond to QAM types of the input signals of the transmitter.

In the expression used for decoding of the MIMO decoding, WS and W are MIMO encoding matrices and include all MIMO matrices of the aforementioned MIMO encoding methods. The transmitter may transmit information about a MIMO matrix used therein and the receiver may check the MIMO matrix using the information and perform decoding. Optionally, the receiver may use a predetermined MIMO matrix.

The frequency deinterleaver 209130 performs deinterleaving on the plurality of output signals of the MIMO decoder 209120 in order reverse to the interleaving operation of the frequency interleaver 209030 of the transmitter. While the frequency interleaver 209030 of the transmitter performs frequency interleaving on a symbol-by-symbol basis, the frequency deinterleaver 209130 of the receiver reorders LLR bit information included in one QAM symbol as symbols and outputs the symbols because it uses LLR bit information. The MIMO receiver may include a plurality of frequency deinterleavers to respectively perform frequency deinterleaving on MIMO input signals in parallel.

The frame parser 209140 acquires desired PLP data from the data output from the frequency deinterleaver 209130 and output the acquired PLP data. The time deinterleaver 209150 performs deinterleaving in reverse order to the interleaving operation of the time interleaver 209100 of the transmitter.

Here, the time deinterleaver 209150 performs deinterleaving on a bit-by-bit basis, distinguished from the transmitter, and thus it reorders bitstreams in consideration of LLR bit information and outputs the reordered bitstreams. The frame parser 209140 reorders a plurality of signals input thereto into one stream by performing frame parsing on the input signals and outputs the stream. That is, the frame parser 209140 performs the operation of the output signal generator illustrated in FIG. 22, and blocks following the frame parser 209140 in the receiver carry out signal processing on one stream.

The multiplexer 209160, the bit deinterleaver 209170 and the FEC decoder 209180 respectively perform operations reverse to the operations of the demultiplexer 209080, the bit interleaver 209070 and the FEC encoder 209060 of the transmitter, to output restored PLPs. That is, the multiplexer 209160 realigns the LLR bit information, the bit deinterleaver 209170 performs bit deinterleaving, and the FEC decoder 209180 performs LDPC/BCH decoding to correct errors and output PLP bit data. Operations following the operation of the frame parser may be regarded as BICM decoding operation of the BICM decoding module, which is reverse to the operation of the BICM module 209010 of the transmitter.

The MIMO transmitter and the MIMO receiver may include as many frequency interleavers 209030, frequency deinterleavers 209130, OFDM generators 209050 and OFDM demodulators 209110 as the number of MIMO transmitted/received signals so as to perform the aforementioned operations on the MIMO transmitted/received signals in parallel. Otherwise, the frequency interleaver 209030, frequency deinterleaver 209130, OFDM generator 209050 and OFDM demodulator 209110 may include memories that simultaneously process a plurality of data signals to reduce system complexity.

Figure 25:
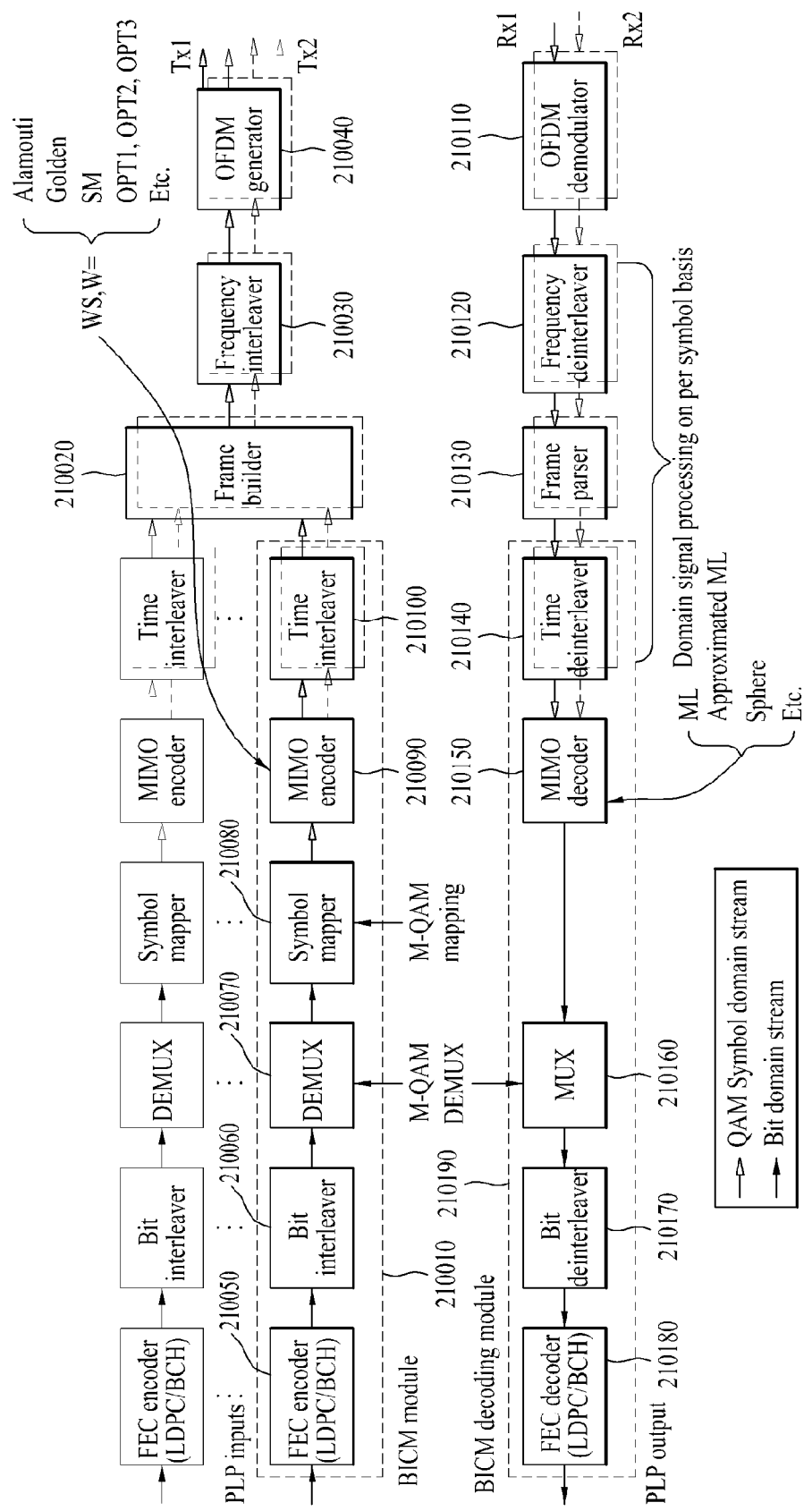
FIG. 25 illustrates an MIMO transmitter and an MIMO receiver according to another embodiment of the present invention.

FIG. 25 illustrates a MIMO transmitter and a MIMO receiver according to another embodiment of the present invention.

FIG. 25 shows a case in which each of the MIMO transmitter and the MIMO receiver uses two antennas to perform MIMO communication. Particularly, in the MIMO transmitter, it is assumed that the same modulation scheme is used for input signals. That is, two input signals to be transmitted using the two antennas are modulated through M-QAM (e.g. QPSK+QPSK, 16-QAM+16-QAM). Hereinafter, this may be expressed as M-QAM+M-QAM.

The MIMO transmitter includes a BICM module 210010, a frame builder 210020, a frequency interleaver 210030, and an OFDM generator 210040. The BICM module 210010 includes an FEC encoder 210050, a bit interleaver 210060, a demultiplexer 210070, a symbol mapper 210080, a MIMO encoder 210090 and a time interleaver 210100.

The MIMO receiver includes an OFDM demodulator 210110, a frequency deinterleaver 210120, a frame parser 210130, a time deinterleaver 210140, a MIMO ML detector 210050, a multiplexer 210160, a bit deinterleaver 210170, and an FEC decoder 210170. The time deinterleaver 210150, multiplexer 210160, bit deinterleaver 210170 and FEC decoder 210170 perform an operation reverse to the operation of the BICM module 210010 of the MIMO transmitter and may be referred to as a BICM decoding module 210190 in the following description.

Configurations and operations of the MIMO transmitter and MIMO receiver of FIG. 25 are similar to those of the MIMO transmitter and MIMO receiver of FIG. 24, and thus only a difference therebetween will be described now.

The MIMO encoder 210090 of the MIMO transmitter of FIG. 25 is located between the symbol mapper 210080 and the time interleaver 210100, that is, included in the BICM module 210010, distinguished from the MIMO encoder shown in FIG. 24. That is, the MIMO encoder 210090 receives symbols output from the symbol mapper 210080, arranges the symbols in parallel, MIMO-encodes the symbols and outputs the MIMO-encoded symbols in parallel, distinguished from the embodiment of FIG. 24 in which the frame builder outputs QAM symbols to be MIMO-encoded in parallel. The MIMO encoder 210090 additionally functions as an input signal generator to generate a plurality of input signals, perform MIMO encoding on the input signals and output a plurality of transmission signals. The MIMO transmission data output in parallel from the MIMO encoder 210090 are processed in parallel in the time interleaver 210100, frame builder 210020, frequency interleaver 210030 and OFDM generator 210040 and transmitted. Here, a plurality of time interleavers 210100, frame builders 210020, frequency interleavers 210030 and OFDM generators 210040 may be provided to process the MIMO transmission data in parallel. In the embodiment of FIG. 25 in which two transmit antennas are used, the MIMO transmitter may include two time interleavers 210100, two frame builders 210020, two frequency interleavers 210030, and two OFDM generators 210040 to process data output from the MIMO encoder 210090 in parallel.

In the MIMO receiver of FIG. 25, the MIMO decoder 210150 is located between the time deinterleaver 210140 and the multiplexer 210160. Accordingly, the OFDM demodulator 210110, frequency deinterleaver 210120, frame parser 210130 and time deinterleaver 210140 process MIMO signals received through a plurality of antennas on a symbol-by-symbol basis on a plurality of paths, and the MIMO decoder 210150 converts symbol-based data into LLR bit data and output the LLR bit data. In the embodiment of FIG. 25, the MIMO receiver may include a plurality of OFDM demodulators 210110, frequency deinterleavers 210120, frame parsers 210130, and time deinterleavers 210140. Alternatively, the OFDM demodulator 210110, frequency deinterleaver 210120, frame parser 210130 and time deinterleaver 210140 may include memories capable of performing the aforementioned parallel processing. Since all the frequency deinterleaver 210120, frame parser 210130 and time deinterleaver 210140 process symbol-based data, system complexity or memory capacity can be reduced, as compared to the embodiment of FIG. 24 in which LLR bit information is processed.

In FIGS. 24 and 25, the MIMO transmitters may transmit information representing a combination of QAM types of the input signals, used for MIMO encoding. That is, information representing QAM types of the first and second input signals output from the frame builder 210020 may be transmitted through a preamble. In the present embodiment, the first and second input signals have the same QAM type. That is, the MIMO decoder checks the information representing the combination of the QAM types of the input signals included in received signals and performs MIMO decoding using a MIMO matrix corresponding to the combination of the QAM types, to output signals corresponding to the combination of the QAM types. The output signals of the QAM types include bit-based data, and this bit-based data are soft decision values that represent the aforementioned probability of bits. These soft decision values can be converted into hard decision values through FEC decoding.

In FIGS. 24 and 25, devices corresponding to the input signal generator/output signal generator are the frame builder/frame parser and the MIMO encoder/MIMO decoder. However, the operations of the input signal generator/output signal generator may be performed by other device elements. For example, the demultiplexer serves as the input signal generator or is followed by the input signal generator in the transmitter, and the multiplexer serves as the output signal generator or is located behind the output signal generator in the receiver corresponding to the transmitter. Each element located behind the input signal generator may be provided as a plurality of elements to process output signals of the input signal generator in parallel along as many paths as the number of the output signals of the input signal generator, and each element located before the output signal generator may be provided as a plurality of elements to process input signals applied to the output signal generator in parallel along as many paths as the number of the input signals of the output signal generator, according to locations of the input signal generator/output signal generator.

Figure 26:
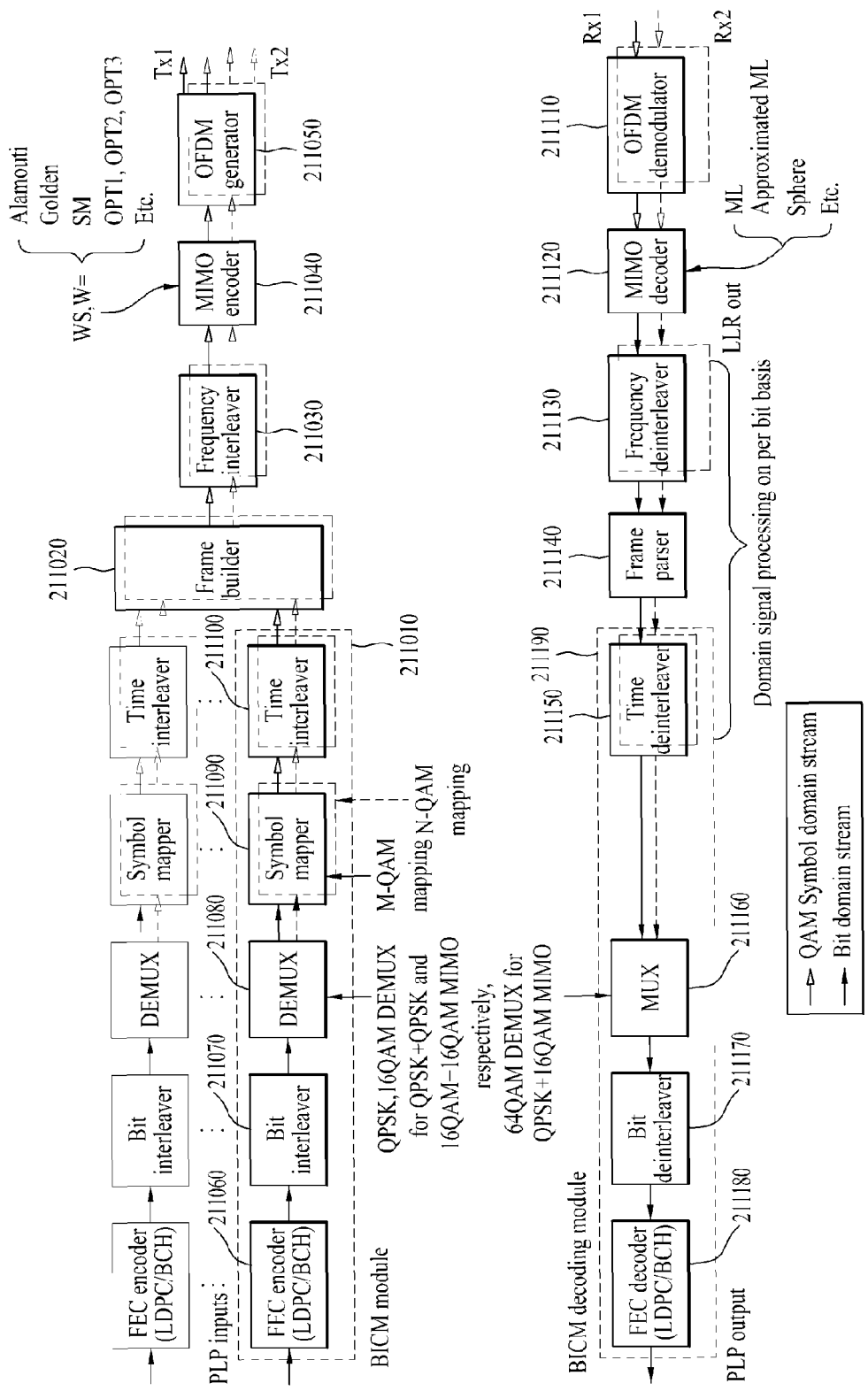
FIG. 26 illustrates an MIMO transmitter and an MIMO receiver according to another embodiment of the present invention.

FIG. 26 illustrates a MIMO transmitter and a MIMO receiver according to another embodiment of the present invention.

FIG. 26 shows an embodiment in which each of the MIMO transmitter and the MIMO receiver performs MIMO transmission using two antennas. Particularly, unlike FIGS. 24 and 25, different modulation schemes are used for respective input signals. That is, two input signals to be transmitted using the two antennas are modulated through M-QAM and N-QAM (e.g. BPSK+QPSK or QPSK+16-QAM). In the following, cases in which modulation schemes used for input signals are QPSK+QPSK, QPSK+16-QAM and 16-QAM+16-QAM will be also described in association with the operation of a demultiplexer.

Configurations of the MIMO transmitter and MIMO receiver of FIG. 26 are similar to those of the MIMO transmitter and MIMO receiver of FIG. 24 and operations thereof are distinguished by a combination of QAM types from those of the MIMO transmitter and MIMO receiver of FIG. 24. Accordingly, only a difference between the operations of the MIMO transmitter/MIMO receiver of FIG. 26 and the MIMO transmitter/MIMO receiver of FIG. 24 will now be described.

The MIMO transmitter may include a BICM module 211010, a frame builder 211020, a frequency interleaver 211030, a MIMO encoder 211040 and an OFDM generator 211050. The BICM module 211010 may include an FEC encoder 211060, a bit interleaver 211070, a demultiplexer 211080, a symbol mapper 211090 and a time interleaver 211100. The MIMO encoder 211040 may be referred to as a MIMO processor.

The MIMO receiver may include an OFDM demodulator 211110, a MIMO decoder 211120, a frequency deinterleaver 211130, a frame parser 211140, a time deinterleaver 211150, a multiplexer 211160, a bit interleaver 211170, and an FEC decoder 211180. The time interleaver 211150, multiplexer 211160, bit deinterleaver 211170 and FEC decoder 211180 may perform an operation reverse to the operation of the BICM module 211010 of the MIMO transmitter and may be referred to as a BICM decoding module 211190. The MIMO decoder 211120 may be referred to as a MIMO ML detector.

In MIMO transmitter, multiple PLPs may be inputted to respective BICM paths. FIG. 11 illustrates an embodiment that single PLP is being inputted to the BICM module 211010. Herein, a plurality of BICM modules may be provided, and each of the separately BICM-processed PLPs may be inputted to the frame builder 211020.

The demultiplexer 211080 demultiplexes bitstreams according to M-QAM and N-QAM and outputs demultiplexed bitstreams. The demultiplexer 211080 additionally functions as the input signal generator that generates or arranges a plurality of input signals for MIMO transmission, described with reference to FIG. 24. The symbol mapper 211090 performs M-QAM/N-QAM gray mapping on the bitstreams output from the demultiplexer 211080 to output an M-QAM symbol stream and an N-QAM symbol stream. Here, the MIMO transmitter may include a plurality of symbol mappers such that the symbol mappers perform M-QAM/N-QAM gray mapping on a bitstream demultiplexed according to M-QAM and a bitstream demultiplexed according to N-QAM in parallel to output an M-QAM symbol stream and an N-QAM symbol stream. The time interleaver 211100 interleaves the symbol streams in time and, particularly, time-interleaves symbols output from one or more LDPC blocks. In FIG. 26, signal processing by blocks following the symbol mapper may be performed on a symbol-by-symbol basis.

The demultiplexer 211080 may operate differently according to QAM size of an input signal used for MIMO. That is, a QAM demultiplexer and a 16-QAM demultiplexer may be used when a combination of input signals for MIMO transmission is QPSK+QPSK or 16-QAM+16-QAM, whereas a 64-QAM demultiplexer may be used in the case of QPSK+16-QAM. Otherwise, a 16-QAM demultiplexer and a 256-QAM demultiplexer may be used in the case of QPSK+QPSK and 16-QAM+16-QAM. This uses the fact that M+N-QAM MIMO transmission simultaneously transmits bits corresponding to bits transmitted by M*N QAM SISO.

The Frame builder 211020 arranges symbols of PLP units that are outputted through respective BICM paths in a frame.

In the MIMO receiver, the frequency deinterleaver 211130 deinterleaves a plurality of output signals from the MIMO decoder 211120 in order reverse to the interleaving operation of the frequency interleaver 211030 of the MIMO transmitter. The frequency deinterleaver 211130 may frequency-deinterleave MIMO input signals in parallel. Particularly, since the number of bits included in M-QAM symbol data and the number of bits included in N-QAM symbol data in the MIMO input signals may be different from each other, the frequency deinterleaver 211130 needs to perform deinterleaving in consideration of the difference between the number of bits included in M-QAM symbol data and the number of bits included in N-QAM symbol data. The frame parser 211140 and the time deinterleaver 211150, which will be described below, also needs to consider the difference between the number of bits included in M-QAM symbol data and the number of bits included in N-QAM symbol data.

The frame parser 211140 acquires desired PLP data from output data of the frequency deinterleaver 211130 and outputs the acquired PLP data, and the time deinterleaver 211150 performs deinterleaving in order reverse to the operation of the time interleaver 211100 of the MIMO transmitter. The frame parser 211140 performs frame parsing on a plurality of input signals to reorder the plurality of input signals and outputs the reordered signals. The multiplexer 46160, bit deinterleaver 46170 and FEC decoder 46180 respectively perform operations reverse to operations of the demultiplexer 46080, bit interleaver 46070 and FEC encoder 46060 of the MIMO transmitter to output restored PLPs. Accordingly, blocks following the multiplexer 211160 in the MIMO receiver perform signal processing of one stream. That is, the multiplexer 211160 functions as the merger.

Figure 27:
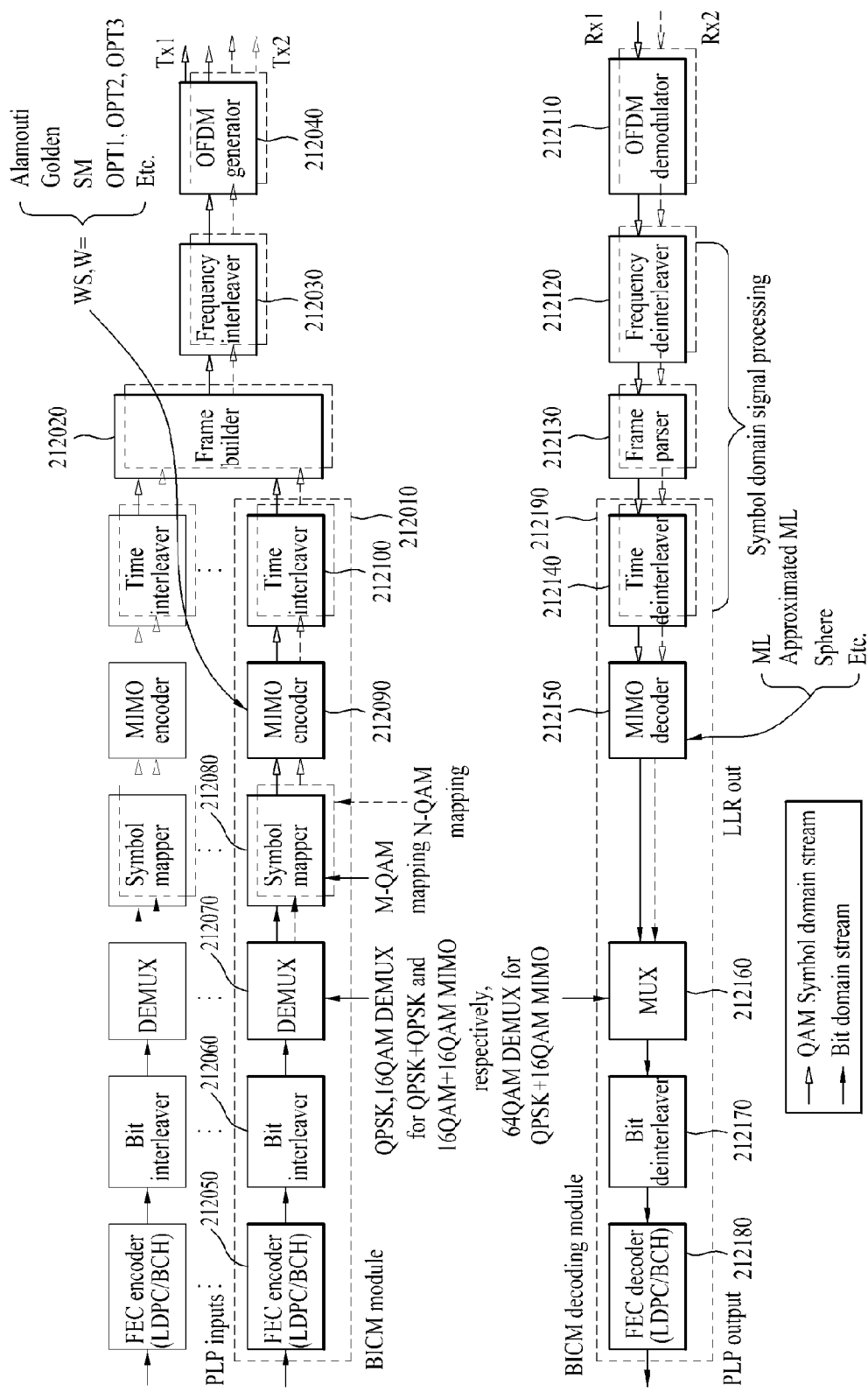
FIG. 27 illustrates an MIMO transmitter and an MIMO receiver according to another embodiment of the present invention.

FIG. 27 illustrates a MIMO transmitter and a MIMO receiver according to another embodiment of the present invention.

The MIMO transmitter and the MIMO receiver of FIG. 27 collectively correspond to a case of performing MIMO communication by each using 2 antennae. Most particularly, in case of the transmitter, this embodiment of the present invention corresponds to an example wherein the modulation method of each input signal is different from one another. More specifically, in this embodiment, the modulation methods for each of the 2 input signals that is used in order to transmit the input signals through 2 antennae respectively correspond to the M-QAM type modulation and the N-QAM type modulation (e.g., BPSK+QPSK or QPSK+16-QAM, etc.). However, hereinafter, with respect to the operations of the demultiplexer, the embodiment of the present invention will hereinafter be described in detail along with the descriptions on QPSK+QPSK, QPSK+16-QAM, and 16-QAM+16-QAM.

FIG. 27 shows a case when the QAM types of the input signal and or output signal are different from one another. And, accordingly, the operations of the device are similar to the operations of the case shown in FIG. 25. Therefore, only the operations that are different from FIG. 25 and FIG. 26 will hereinafter be omitted for simplicity.

The MIMO transmitter may include a BICM module 212010, a frame builder 212020, a frequency interleaver 212030, and an OFDM generator 212040. And, the BICM module 212010 may include an FEC encoder 212050, a bit interleaver 212060, a demux (or demultiplexer) 212070, a symbol mapper 212080, a MIMO encoder 212090, and a time interleaver 212100.

The MIMO receiver may include an OFDM demodulator 212110, a frequency deinterlever 212120, a frame parser 212130, a time deinterleaver 212140, an MIMO decoder 212150, a multiplexer 212160, a bit deinterleaver 212170, and an FEC decoder 212180. And, the time deinterleaver 212140, the MIMO decoder 212150, the multiplexer 212160, the bit deinterleaver 212170, and the FEC decoder 212180 perform an inverse process of the BICM module. Hereinafter, this may be referred to a BICM decoding module 212190.

More specifically, unlike FIG. 26, the MIMO encoder 212090 of FIG. 27 is positioned between the symbol mapper 212080 and the time interleaver 212100. The MIMO transmission data that are being transmitted in parallel may be processed in parallel and transmitted by multiple time interleavers 212100, frame builders 212020, frequency interleaver 212030, and OFDM generators 212040 or by a time interleaver 212100, a frame builder 212020, and an OFDM generator 212040, which internally process data in parallel, so as to be transmitted afterwards. In the embodiment using 2 antennae, as shown in FIG. 27, each of the time interleaver 212100, the frame builder 212020, frequency interleaver 212030, and the OFDM generator 212040 may be provided in pairs, so as to be capable of processing data, which are being outputted from the MIMO encoder 212090.

In the MIMO receiver of FIG. 27, the MIMO decoder 212150 is positioned between the time interleaver 212140 and the multiplexer 212160. Accordingly, the OFDM demodulator 212110, the frequency deinterleaver 212120, the frame parser 212030, the time deinterleaver 212140 may process a MIMO signal, which is received through multiple antennae, through multiple paths in symbol units. And, the MIMO decoder 212150 converts symbol-unit data to LLR bit data and outputs the converted data. In the embodiment shown in FIG. 12, a plurality of the OFDM demodulators 212110, the frequency deinterleavers 212120, the frame parsers 212130, and the time deinterleavers 212140 may be provided. And, by being equipped with a memory that can perform the above-described parallel processing, the above-described plurality of blocks may be replaced with single blocks. Since the frequency deinterleaver 212120, the frame parser 212130, and the time deinterleaver 212140 can collectively process the symbol-unit data, the complexity or required memory size may be reduced, as compared with the embodiment of FIG. 26, which processes the LLR bit information.

Referring to FIG. 26 to FIG. 27, the MIMO transmitter may also transmit information indicating the QAM type of input signals, which are used when performing MIMO encoding. More specifically, information indicating the QAM type of $1^{st}$ input signal and $2^{nd}$ input signal, which are outputted from the frame builder, may transmit through a preamble part. According to the embodiment of the present invention, the $1^{st}$ input signal and the $2^{nd}$ input signal may either have the same QAM type, or may have different QAM types. In this case, the MIMO decoder may use the information indicating the QAM type of the input signals, which are included in the reception signal, so as to perform MIMO decoding and to output QAM type output signals. However, such QAM type output signals include bit unit data, and such bit unit data correspond to a soft decision value indicating the above-described bit-unit probability (or likelihood). Such soft decision values may then be converted to hard decision values by performing FEC decoding.

A transmission frame according to present invention may include a preamble region, a data symbol region. In this case, the present invention may additionally allocate a preamble symbol to the preamble region within a transmission frame. Hereinafter, the additional preamble signal will be referred to as an AP1 symbol (Additional Preamble symbol) for simplicity in the description of the present invention. In order to enhance the detection performance for detecting a mobile broadcast (i.e., NGH) signal, in a considerably low SNR condition or a time-selective fading condition, at least one or more AP1 symbol is added to the transmission frame.

Accordingly, in a transmission frame according to the present invention, the preamble region is configured of a P1 symbol, at least one or more AP1 symbols, and at least one or more P2 symbols. And, the data region may be configured of a plurality of data symbols (or data OFDM symbols). The AP1 symbol may be positioned between the P1 symbol and the first P2 symbol within the preamble region of the transmission frame. More specifically, the P1 symbol and the AP1 symbol may be transmitted consecutively within single transmission frame or may be transmitted non-consecutively within single transmission frame according to the intention of a designer.

According to the embodiment of the present invention, the P1 symbol and the AP1 symbol may be inserted for each transmission frame by a P1 insertion module, which is included in the OFDM generator of the transmitter. More specifically, the P1 insertion module may insert at least 2 or more preamble symbols in each transmission frame. According to another embodiment of the present invention, an AP1 insertion module may be added behind (or after) the P1 insertion module, and an AP1 symbol may be inserted by the AP1 insertion module. As described in the embodiment of the present invention, when at least 2 or more preamble symbols are used, the present invention is advantageous in that the present invention can be more robust against a burst fading effect, which may occur in a mobile fading environment, and that a signal detection performance can be enhanced.

The AP1 symbol may be generated through the described processes above and may have a different structure from a conventional P1 symbol.

Figure 28:
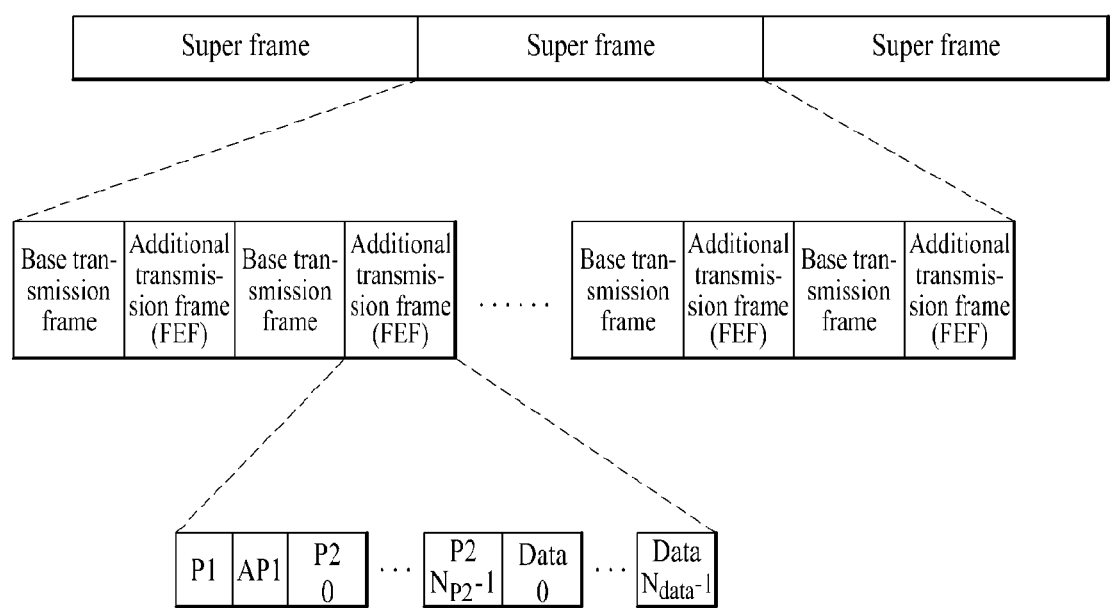
FIG. 28 illustrates a structure of a super frame for transmitting an additional broadcast signal according to an embodiment of the present invention.

FIG. 28 illustrates an exemplary super frame structure for transmitting an additional broadcast signal according to the present invention.

Figure 14:
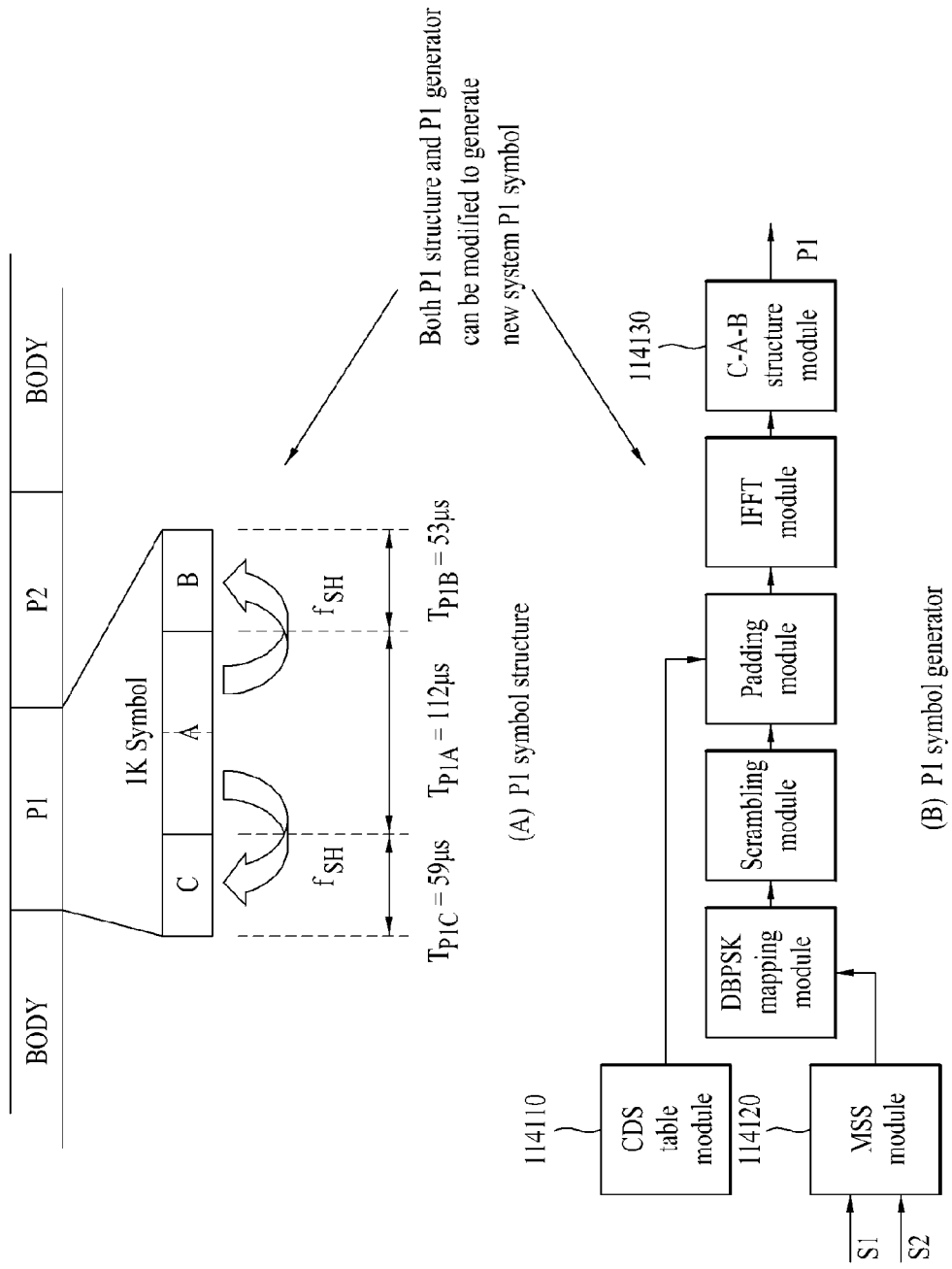
FIG. 14(A) and FIG. 14(B) illustrate a procedure of generating a P1 symbol for identifying a additional transmission frame according to an embodiment of the present invention.

A transmission frame configured to transmit an additional broadcast signal within the super frame, e.g., a mobile broadcast signal, may be an additional transmission frame as described in FIG. 14, and may include a P1 symbol, an AP1 symbol, at least one or more P2 symbols, and a plurality of data symbols, as shown in FIG. 28. Herein, the P1 symbol transmits P1 signaling information, the AP1 symbol transmits AP1 signaling information, and the P2 symbol transmits the L1 signaling information. Hereinafter, the detail description of the symbols that are identical to those described in FIG. 15 will be omitted for simplicity. And, only the AP1 symbol will be described in detail. The AP1 signaling information being transmitted by the AP1 symbol may include an additional transmission parameter. According to the embodiment of the present invention, the AP1 signaling information may include pattern information of a pilot, which is inserted in the corresponding transmission frame. When the L1-pre-signaling information is spread to the data region of the transmission frame, the AP1 signaling information further includes information required for decoding the L1 signaling information spread to the data region of the transmission frame.

Figure 29:
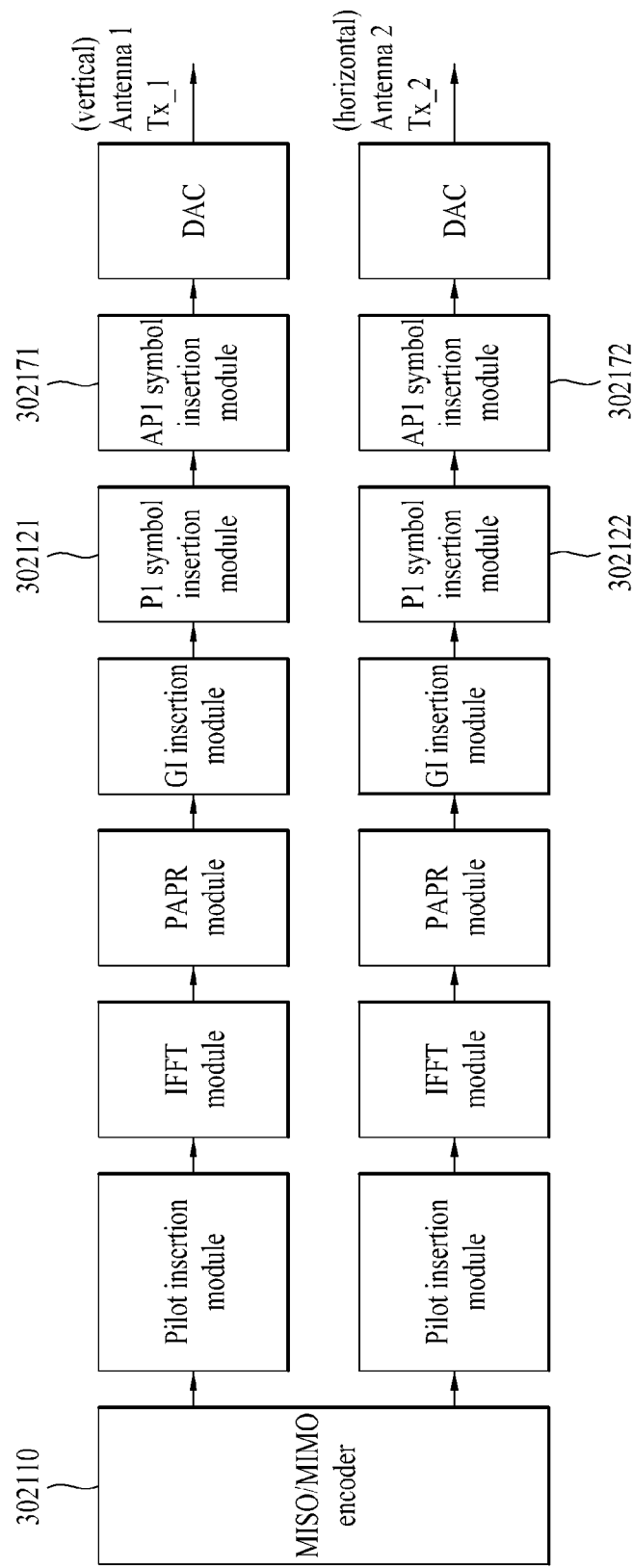
FIG. 29 illustrates an OFDM generator of the transmitter for inserting an AP1 symbol according to an embodiment of the present invention.

FIG. 29 illustrates a block diagram showing an exemplary structure of an OFDM generator, which is included in the transmitter, for inserting the AP1 symbol according to an embodiment of the present invention. The OFDM generator of FIG. 29 shows an example of transmitting a broadcast signal through 2 transmission antennae by using the MISO or MIMO method.

The OFDM generator of FIG. 29 is almost the same as the OFDM generator 101500 shown in FIG. 6. However, the OFDM generator of FIG. 29 is different from the OFDM generator 101500 shown in FIG. 6, in that the OFDM generator of FIG. 29 includes an MISO/MIMO encoder 302110 instead of the MISO encoder 106100, and 2 API symbol insertion modules 302171, 302172. Hereinafter, the detailed description for the blocks that are identical to the blocks included in the OFDM generator 101500 shown in FIG. 6 will be omitted for simplicity. And, only the MISO/MIMO encoder 302110 and the 2 API symbol insertion modules 302171, 302172 will be described in detail.

In order to perform transmission through 2 transmission antennae, the MISO/MIMO encoder 302110 may perform MISO and/or MIMO encoding on the signals being inputted through each path so that transmission diversity can be gained. The pilot insertion module may insert a pilot of a pre-decided pilot pattern in a respective position within the transmission frame and may then transmit the processed frame. And, in this case, the pilot pattern information may be signaled to AP1 signaling information, or may be signaled to L1 signaling information. Furthermore, the pilot pattern information may also be signaled to both AP1 signaling information and L1 signaling information.

The API symbol insertion modules 302171, 302172 may respectively insert an AP1 symbol after the P1 symbol, which are then transmitted to the DAC. For example, the AP1 symbol may transmit AP1 signaling information.

Meanwhile, when a pilot is inserted in each transmission frame and transmitted by the pilot insertion modules 302121, 302122 included in the OFDM generator, the receiver may detect the pilot and use the detected pilot in frame synchronization, frequency synchronization, time synchronization, channel estimation, transmission mode recognition, and so on.

The pilot according to the present invention may be divided into 2 different types, one being a scattered pilot and the other being continual pilot. More specifically, the scattered pilot is used to enable the receiver to estimate and compensate for any influence caused by a radio channel. And, the continual pilot to enable the receiver to remove any accurate frequency synchronization or phase error.

In the present invention, a plurality of scattered pilot patterns may exist. And, according to the embodiment of the present invention, among the plurality of scattered pilot patterns, one scattered pilot pattern may be selected in accordance with an FFT size and a guide interval (GI) size, so as to be inserted in OFDM symbols of a transmission frame and transmitting the pilot-inserted symbols. More specifically, according to the embodiment of the present invention, when the present invention uses the MIMO method, among 9 scattered pilot patterns (PP1~PP9), one scattered pilot pattern is selected based upon the FFT size and the GI size, so as to be inserted in the OFDM symbols of the corresponding transmission frame.

In the description of the present invention, according to the embodiment of the present invention, 1 k, 2 k, 4 k, 8 k, and 16 k may be used as the FFT size, and $\frac{1}{128}$, $\frac{1}{32}$, $\frac{1}{16}$, $\frac{19}{256}$, $\frac{1}{8}$, $\frac{19}{128}$, and $\frac{1}{4}$ may be used as the GI size. The FFT size refers to a number of subcarriers configuring a single OFDM symbol. And, the GI size refers to a ratio being occupied by the GI in a single OFDM symbol. Therefore, the length of an OFDM symbol may vary depending upon the FFT size and GI size.

The GI size may vary in a super frame unit, and the GI size information may be signaled to a GUARD_INTERVAL field of the L1 pre signaling information. That is, the GUARD_INTERVAL field indicates a GI of a current super frame. And, the pilot pattern information, which is being inserted in the current transmission frame, may be signaled to a PILOT_PATTERN field of the L1 pre signaling information and/or a PILOT_PATTERN field the AP1 signaling information. In single transmission frame, an FFT size of P2 symbols within the preamble region is identical to that of OFDM symbol within the data region. Furthermore, FFT size information of the transmission frame is signaled in an S2 field of P1 signaling information. For example, when a preamble format corresponds to a preamble (i.e., MISO or SISO) of a conventional transmission frame or an additional transmission frame, an FFT size and a portion of information about GI of P2 symbols and data symbols in the corresponding transmission frame are signaled in an S2 field 1. Herein, the S2 field 1 means a first 3-bit of the S2 field. In other words, in single transmission frame, the P2 symbol has the same FFT size and GI size as the data symbols.

Figure 30:
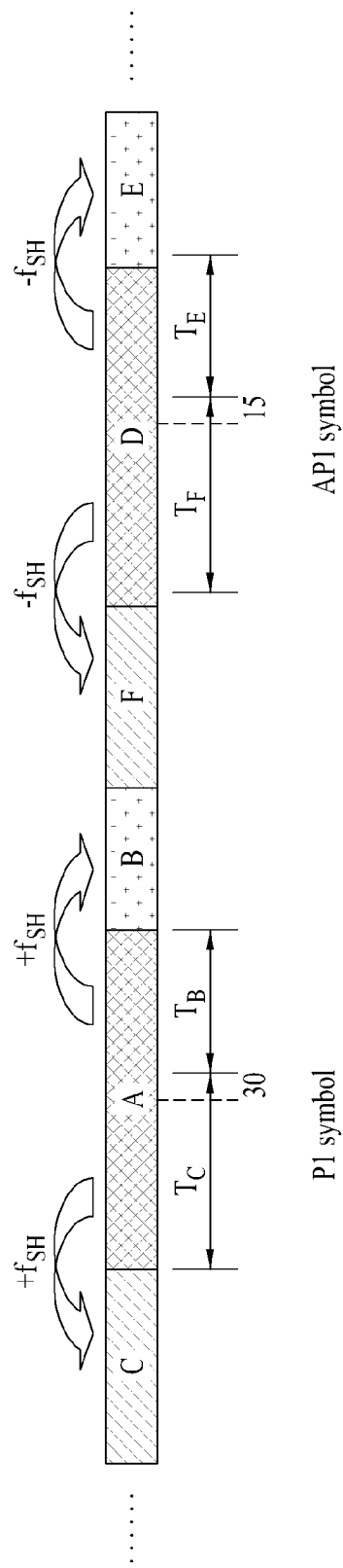
FIG. 30 illustrates a structure of a P1 symbol and a structure of an AP1 symbol according to an embodiment of the present invention.

FIG. 30 illustrates an exemplary structure of a P1 symbol and an exemplary structure of an AP1 symbol according to an embodiment of the present invention. FIG. 30 shows an example of generating an AP1 symbol by modifying the P1 symbol.

In FIG. 30, P1 symbol, which is shown on the left side, is generated by having each of a front portion and an end portion of an effective (or valid) symbol copied, by having a frequency shift performed as much as $+f_{sh}$, and by having the frequency-shifted copies respectively positioned at a front portion (C) and an end portion (B) of the effective symbol (A). In the present invention, the C portion will be referred to as a prefix, and the B portion will be referred to as a postfix. More specifically, P1 symbol is configured of a prefix portion, an effective symbol portion, and a postfix portion.

In FIG. 30, AP1 symbol, which is shown on the right side, is generated by having each of a front portion and an end portion of an effective (or valid) symbol copied, by having a frequency shift performed as much as $-f_{sh}$, and by having the frequency-shifted copies respectively positioned at a front portion (F) and an end portion (E) of the effective symbol (D). In the present invention, the F portion will be referred to as a prefix, and the E portion will be referred to as a postfix. More specifically, AP1 symbol is configured of a prefix portion, an effective symbol portion, and a postfix portion.

Herein, the two frequency-shift values $+f_{sh}$, $-f_{sh}$, which are used in the P1 symbol and the AP1 symbol, may have the same absolute value yet be given opposite signs. More specifically, the frequency-shift is performed in opposite directions. And, the lengths C and F, which are copied to the front portion of the effective symbol, may be set to have different values. And, the lengths B and E, which are copied to the end portion of the effective symbol, may be set to have different values. Alternatively, the lengths C and F may be set to have different values, and the lengths B and E may be set to have the same value, or vice versa. According to another embodiment of the present invention, an effective symbol length of the P1 symbol and an effective symbol length of the AP1 symbol may be differently determined. And, according to yet another embodiment of the present invention, a CSS (Complementary Set Sequence) may be used for tone selection and data scrambling within the AP1 may be scrambled by AP1.

According to the embodiment of the present invention, the lengths of C and F, which are copied to the front portion of the effective (or valid) symbol, may be set to have different values, and the lengths of B and E, which are copied to the end portion of the effective (or valid) symbol, may also be set to have different values.

The C,B,F,E lengths according to the present invention may be obtained by using Equation 9 shown below.

Length of $C(T_C)$={Length of $A(T_A)/2+30$}

Length of $B(T_B)$={Length of $A(T_A)/2-30$}

Length of $E(T_F)$={Length of $D(T_D)/2+15$}

Length of $E(T_E)$={Length of $D(T_D)/2-15$}   Equation 9

As shown in Equation 9, P1 symbol and AP1 symbol have the same frequency shift value. However, each of the P1 symbol and the AP1 symbol are given opposite signs. Additionally, in order to determine the lengths of C and B, the present invention determines an offset value being added to or subtracted from a value corresponding to the length of A $(T_A)/2$. And, in order to determine the lengths of F and E, the present invention determines an offset value being added to or subtracted from a value corresponding to the length of D $(T_D)/2$. Herein, each of the offset values is set up differently. According to the embodiment of the present invention, the offset value of P1 symbol is set to 30, and the offset value of AP1 symbol is set to 15. However, the values given in the above-described examples are merely exemplary. And, therefore, it will be apparent that the corresponding values may easily be varied or changed by anyone skilled in the art. Thus, the present invention will not be limited only to the values presented herein.

According to the present invention, by generating AP1 symbol and an AP1 symbol to configure the structure shown in FIG. 30, and by inserting the generated symbols to each transmission frame, the P1 symbol does not degrade the detection performance of the AP1 symbol, and, conversely, the AP1 symbol does not degrade the detection performance of the P1 symbol. Additionally, the detection performance of the P1 symbol is almost identical to the detection performance of the AP1 symbol. Furthermore, by configuring the symbols so that the P1 symbol and the AP1 symbol have similar symbol structures, the complexity level of the receiver may be reduced.

At this point, the P1 symbol and the AP1 symbol may be transmitted consecutively, or each of the symbols may be allocated to different positions within the transmission frame and may then be transmitted. And, in case the P1 symbol and AP1 symbol are each allocated to a different position within the transmission frame, so as to be transmitted, a high time diversity effect may be gained with respect to the preamble symbol. According to the embodiment of the present invention, the P1 symbol and the AP1 symbol are consecutively transmitted.

Figure 31:
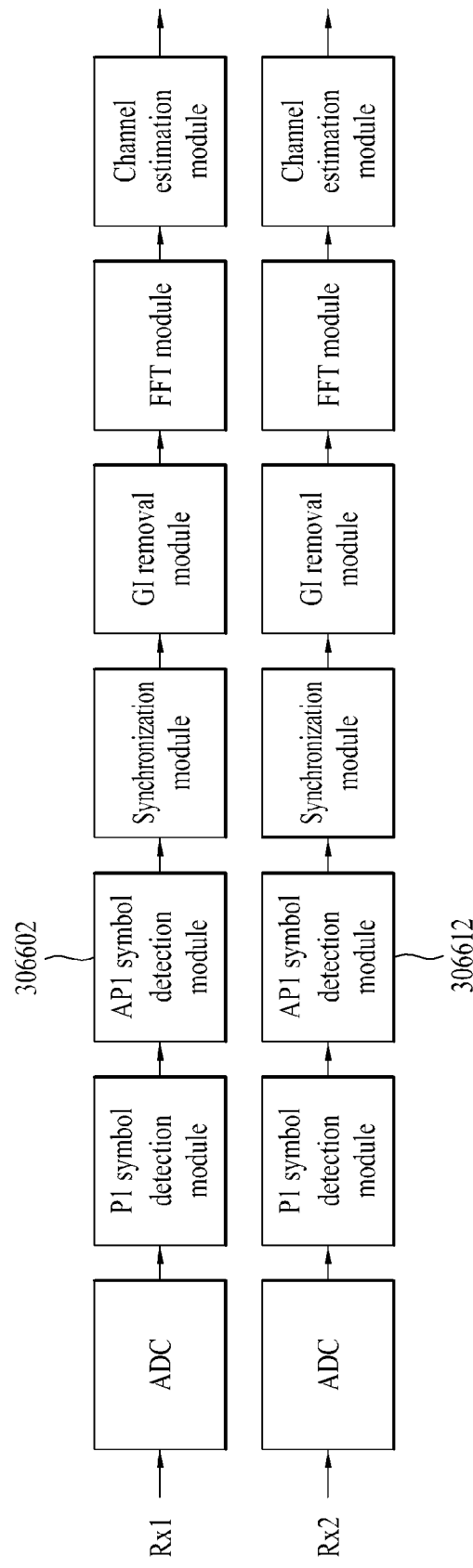
FIG. 31 illustrates an OFDM demodulator according to another embodiment of the present invention.

FIG. 31 illustrates an OFDM demodulator according to yet another embodiment of the present invention. The OFDM demodulator shown in FIG. 31 is almost identical to the OFDM demodulator 107100, which is described with reference to FIG. 8. However, the OFDM demodulator of FIG. 31 is different from the OFDM demodulator 107100 of FIG. 8 in that the OFDM demodulator includes AP1 symbol detection modules 306602, 306612. Therefore, detailed description on the blocks that are identical to the blocks included in the OFDM demodulator of FIG. 8 will be omitted for simplicity. And, only the AP1 symbol detection modules 306602, 306612 will be briefly described. Herein, among the digital broadcast signals, the AP1 symbol detection modules 306602, 306612 may detect and decode AP1 symbols that transmit (or carry) AP1 signaling information, The receiver may use the AP1 signaling information so as to gain pilot pattern information of the current transmission frame.

Hereinafter, when the data configuring a service of the broadcast signal corresponds to a TS (Transport Stream) format or an IP (Internet Protocol) stream/packet, the description of the present invention seeks to provide a signaling method that can perform transmission, while ensuring backward compatibility with the conventional terrestrial transmission method. As an example of the present invention, the TS may correspond to an MPEG-2 TS.

Figure 32:
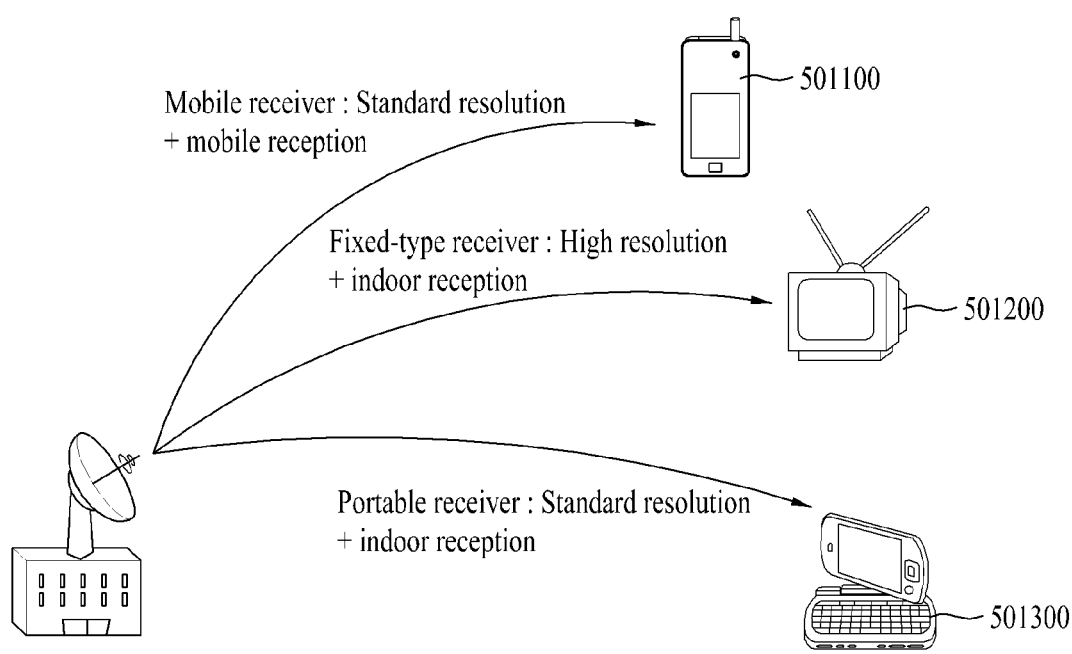
FIG. 32 illustrates a broadcast system according to another embodiment of the present invention.

FIG. 32 illustrates a broadcasting system according to an embodiment of the present invention.

FIG. 32 illustrates an exemplary broadcasting system configured to transmit a broadcast signal, so that each receiver can selectively receive a broadcast signal best-fitting the characteristics of the respective receiver, when a broadcast station transmits a broadcast signal.

When the broadcasting system according to the present invention is configured as shown in FIG. 32, a mobile receiver 501100, such as a mobile phone, may select a transmission frame having a high mobile receiving performance and may receive the selected transmission frame. And, a fixed-type receiver 501200 including a television receiver used in general households may select a transmission frame having high picture quality indoor receiving performance and may receive the selected transmission frame. And, a movable receiver 501300 including a movable television receiver may select a transmission having an adequate low resolution mobile receiving performance and an adequate high picture quality indoor receiving performance and may receive the selected transmission frame.

According to an exemplary embodiment of the present invention, the broadcasting system according to the present invention may use SVC (Scalable Video Coding) so as to be capable of receiving a required broadcast frame based upon the characteristics of the receiver.

Figure 33:
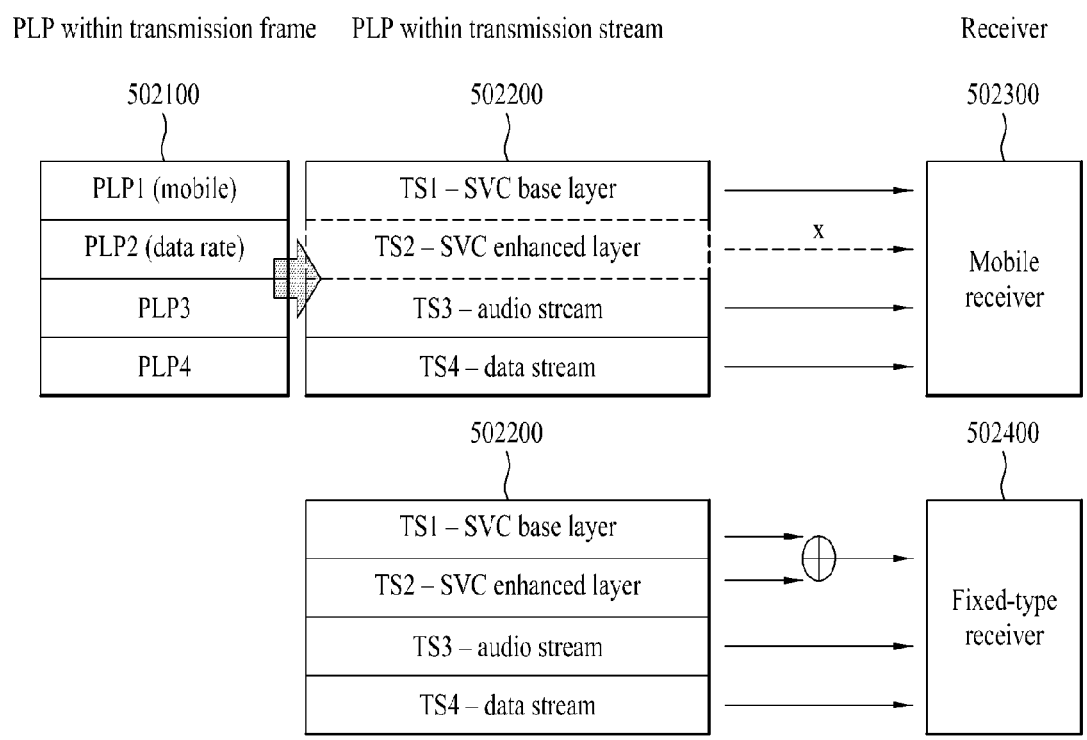
FIG. 33 illustrates a block diagram showing a process of receiving a PLP best-fitting the purpose of a receiver respective to the broadcasting system according to an embodiment of the present invention.

FIG. 33 illustrates a block view showing a process of receiving a PLP best-fitting the purpose of a receiver respective to the broadcasting system according to an embodiment of the present invention.

As shown in FIG. 33, one transmission frame 502100 may include a plurality of PLPs.

A PLP corresponds to a transmission data unit that is identified in the physical layer. Each PLP may transmit data having the same attribute of the physical layer, which is being processed in the transmission path. Additionally, according to the embodiment of the present invention the physical parameter may be differently set up for each PLP. Moreover, according to the embodiment of the present invention, data corresponding to a service may be categorized by components, such as video, audio, and so on, and may transmit the data corresponding to each component to separate PLPs. Furthermore, the component of the present invention may be used to indicate that the corresponding data are included in the component.

As shown in FIG. 33, the plurality of PLPs 502200, i.e., PLP1 to PLP4, being included in a single transmission frame 502100 may each carry one service. Herein, the present invention may use an SVC (Scalable Video Coding) method to perform encoding on a moving picture, so that a wanted (or desired) picture quality can be hierarchically generated. Then, each moving picture may be transmitted through the base layer and the enhancement layer. The base layer may transmit video data respective to an image having basic picture quality, and the enhancement layer may transmit additional video data that can recover an image having higher layer picture quality. Additionally, hereinafter, a SVC target may not correspond only to the video data. And, the base layer may be used to indicate data that can provide a basic service including the basic image (or video)/voice (or audio)/data corresponding to the base layer, and the enhancement layer may be used to indicate data that can provide a higher service including higher layer image (or video)/voice (or audio)/data corresponding to the enhancement layer.

Hereinafter, the definition of the base layer may include video data corresponding to the base layer, and the definition of the enhancement layer may include video data corresponding to the enhancement layer.

As shown in FIG. 33, PLP1 according to the present invention may transmit the base layer, PLP2 may transmit the enhancement layer, PLP3 may transmit an audio stream, and PLP4 may transmit a data stream.

In the present invention, the physical parameters may be adjusted in accordance with the characteristics of the data included in each PLP so as to differently set up the mobile receiving performance or the data communication performance, thereby enabling the receiver to selectively receive the required PLP in accordance with the characteristics of each receiver. An example of the same will hereinafter be described in detail.

As shown in FIG. 33, since PLP1, which transmits the base layer, is required to be received by both the general fixed type receiver 502300 and the mobile receiver 502400, the transmitting unit may set-up (or determine) physical parameters for a high mobile receiving performance with respect to PLP1 and may transmit the determined physical parameters.

Additionally, PLP2, which transmits the enhancement layer, cannot be received by the mobile receiver 502400 due to its lower mobile receiving performance, as compared to PLP1. Nevertheless, in order to allow the fixed type receiver 502300, which requires high resolution and high picture quality broadcast contents to be received, the transmitting unit may set-up (or determine) physical parameters for a high mobile receiving performance with respect to PLP2 and may transmit the determined physical parameters.

Therefore, as shown in FIG. 33, the mobile receiver 502300 may receive PLP1, which transmits the base layer having a high mobile receiving performance, and may also receive PLP3 and PLP4, which transmit audio and data stream, so as to provide services with general resolution.

Conversely, in order to receive high picture quality broadcast contents, the fixed type receiver 502400 may collectively receive PLP1 and PLP2, which transmit transport streams related to an enhancement layer having high resolution, and PLP3 and PLP4. Thus, by receiving a large amount of data, the fixed type receiver 502400 may provide high picture quality services.

Figure 34:
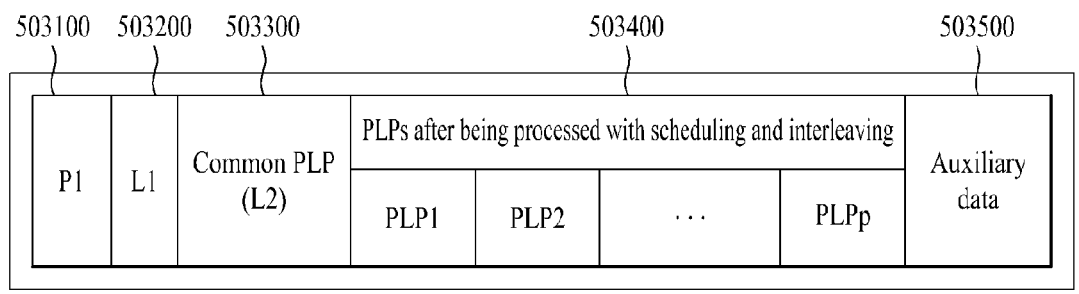
FIG. 34 illustrates a transmission frame according to an embodiment of the present invention.

FIG. 34 illustrates a transmission frame according to an embodiment of the present invention.

As shown in FIG. 34, the transmission frame may include a P1 signaling information region 503100, an L1 signaling information region 503200, a common PLP region 503300, scheduled and interleaved multiple PLP regions 503400, and an auxiliary data region 503500. In the description of the present invention, the common PLP region 503300 may also be referred to as an L2 signaling information region.

The signaling information corresponds to information being used by the receiver for recovering data included in multiple PLP regions. Herein, the signaling information may include P1 signaling information, L1 signaling information, and L2 signaling information. And, the P1 signaling information region 503100, the L1 signaling information region 503200, and the common PLP region 503300 may be collectively referred to as a preamble. Moreover, only the P1 signaling information region 503100 and the L1 signaling information region 503200 may be collectively referred to as a preamble.

Hereinafter, each region will be described in detail.

The P1 signaling information region 503100 may include P1 signaling information, which includes information for identifying (or recognizing) the preamble itself.

The L1 signaling information region 503200 may include L1 signaling information, which includes information required by the receiver for processing the PLP within the transmission frame.

The L2 signaling information 503300 may include L2 signaling information, which includes information that can be commonly applied to multiple PLPs. The L2 signaling information according to the present invention may include PSI/SI (Program and System Information/Signaling Information). More specifically, in case the broadcast signal corresponds to a TS format, the L2 signaling information may include network information, such as an NIT (Network Information Table), and PLP information, and may also include service information such as an SDT (Service Description Table), an EIT (Event Information Table), and a PMT (Program Map Table)/PAT (Program Association Table). And, depending upon the intentions of the system designer, service information, such as SDT and PMT/PAT, may be included in multiple PLP regions 503400, so as to be transmitted.

If the broadcast signal corresponds to an IP format, the L2 signaling information may include an IP information table, such as an INT (IP/MAC notification table). The plurality of scheduled and interleaved PLP regions 503400 may transmit service components, such as audio components, video components, data components, and so on, which are included in a service, through multiple PLPs. Herein, the PLP regions 503400 may also include PSI/SI, such as PMT/PAT.

The receiver may use the information included in the P1 signaling information region 503100 so as to decode the L1 signaling information region 503200, thereby gaining (or acquiring) information on the structure of the PLPs included in the transmission frame and information on the frame configuration. Most particularly, by referring to the information included in L1 signaling information region 503200 or the L2 signaling information region 503430, the receiver may be capable of knowing a specific PLP, through which each of the service components being included in the service is transmitted. The above-described decoding process may be performed by the BICM decoder 107300 of the broadcast signal receiver according to the present invention. The BICM encoder 101300 of the broadcast signal transmitter according to the present invention may perform encoding on signaling information associated with the broadcast service and may transmit the L1 signaling information, so that the receiver can perform decoding on the received information.

In case the L1 signaling information region 503200 includes information on the service components, the receiver may receive the transmission frame and may recognize and apply the information on the service components at the same time. However, since the size of the L1 signaling information region 503200 is limited, the amount (or size) of the information on the service components that can be transmitted from the transmitting end may also be limited. Therefore, the L1 signaling information region 503200 it adequate for receiving the transmission frame and recognizing the information on the service components at the same time, and for transmitting the information that can be applied to the receiver.

In case the L2 signaling information region 503300 included information on the service components, the receiver may acquire (or gain) information on the service components, after the decoding process of the L2 signaling information region 503300 is completed. Therefore, while the receiver receive the transmission frame, the receiver cannot recognize or change (or modify) the information on the service components at the same time. However, since the size of the L2 signaling information region 503300 is larger than the size of the L1 signaling information region 503200, data respective to a large number of service components may be transmitted. Accordingly, the L2 signaling information region 503300 is adequate for transmitting general information respective to the service components.

According to the embodiment of the present invention, the present invention uses both the L1 signaling information region 503200 and the L2 signaling information region 503300. More specifically, while the L1 signaling information region 503200 receives the transmission frame on a PLP level, such as a high mobile performance and a high speed data communication characteristic, the L1 signaling information region 503200 may also transmit information of the service components, which can be changed (or modified or varied) at any time during the transmission of the broadcast signal, at the same time. Furthermore, the L2 signaling information region 503300 may transmit information on the service components, which are included in the corresponding service, and general information on the channel reception.

FIG. 35 illustrates a list of fields being included in the L1 signaling information region of FIG. 34 according to the exemplary embodiment of the present invention.

FIG. 35 shows exemplary fields being included in an NUM_PLP loop, which is included in the L1 signaling information region 503200 of FIG. 34. According to the embodiment of the present invention, in the description of the present invention, the NUM_PLP loop shown in FIG. 34 is included in a table being included in a dynamic block of the L1-post signaling information, which is described above with reference to FIG. 16.

The NUM_PLP loop may include fields associated to each PLP of the multiple PLPs included in the transmission frame. And, although it is not shown in the drawing, the number of PLPs may be pre-determined in another field of the L1 signaling information region 503200. Additionally, in the description of the present invention, a field may also be referred to as information, and this may be commonly applied to all exemplary embodiments of the present invention.

As shown in FIG. 35, the NUM_PLP loop may include a PLP_ID field, a PLP_GROUP_ID field, a PLP_TYPE field, a PLP_PAYLOAD_TYPE field, a PLP_COMPONENT_TYPE field, a PLP_COD field, a PLP_MOD field, and a PLP_FEC_TYPE field. Hereinafter, each field will be described in detail.

The PLP_ID field has the size of 8 bits and may identify each PLP.

The PLP_GROUP_ID field also has the size of 8 bits and may identify a PLP group including the corresponding PLP. In the description of the present invention, according to the exemplary embodiment of the present invention, the PLP group may also be referred to as an LLP (Link-Layer-Pipe), and the PLP_GROUP_ID field may also be referred to as an LLP_ID field. Most particularly, the NIT, which will be described later on in more detail, may include a PLP_GROUP_ID field, which is identical to the PLP_GROUP_ID field, which is included in the L1 signaling information, and the NIT may also include a transport_stream_id field, which is used for identifying a transport stream associated to the PLP group. Accordingly, by using the NIT, the receiver may be capable of knowing (or recognizing) a specific PLP group to which a specific transport stream is associated. More specifically, in order to simultaneously decode transport streams being transmitting through the respective PLPs having the same PLP_GROUP_ID, transport streams that are indicated by the transport_stream_id field of the NIT may be merged, so as to recover a single service stream.

Accordingly, when the broadcast signal is being transmitted in a TS format, the receiver may merge PLPs having the same PLP_GROUP_ID field and may, then, recover the original (or initial) transport stream.

Alternatively, if the broadcast signal is being transmitted in an IP format, the receiver may use the PLP_GROUP_ID field so as to locate and find the service components associated with a single service. And, by merging such service components, a single service may be recovered. Accordingly, the receiver may simultaneously receive multiple PLPs having the same PLP_GROUP_ID.

The PLP_TYPE field has the size of 3 bits and may identify a PLP being included in multiple PLP groups and a group PLP being included in a single group.

The PLP_PAYLOAD_TYPE field has the size of 5 bits and may indicate whether a transport packet included in the PLP is configured in a TS format or in an IP format.

The PLP_COMPONENT_TYPE field has the size of 8 bits. And, as a field that can identify the type of the data (or service component) being transmitted through the PLP, the receiver may use the PLP_COMPONENT_TYPE field, so as to be capable of identifying whether the component type of the broadcast service, which is being transmitted through the PLP, corresponds to video data, video extension data, audio data, or data. The PLP_COD field corresponds to a 3-bit field and may indicate a coding rate of the PLP. In the description of the present invention, examples of the coding rate may include 1/2, 3/5, 2/3, 3/4, and so on.

The PLP_MOD field has the size of 3 bits and may indicate a modulation type of the PLP. In the description of the present invention, examples of the modulation type may include QPSK, 16QAM, 64QAM, 256QAM, and so on.

The PLP_FEC_TYPE field corresponds to a 2-bit field, which may indicate an FEC (Forward Error Correction) type of the PLP.

The PLP_GROUP_ID field, the PLP_TYPE field, and the PLP_COMPONENT_TYPE field may be used in order to signal the correlation between the PLP and the service components, and the correlation between the transport stream and service components. Additionally, the PLP_COD field and the PLP_MOD field may be used for signaling an operation characteristic, such as mobile performance and data communication characteristic, of the PLP.

FIG. 36 illustrates a list of fields being included in the L1 signaling information region of FIG. 34 according to another exemplary embodiment of the present invention.

FIG. 36 shows exemplary fields being included in an NUM_PLP loop, which is included in the L1 signaling information region 503200 of FIG. 34. According to the embodiment of the present invention, in the description of the present invention, the NUM_PLP loop shown in FIG. 34 is included in a table being included in a dynamic block of the L1-post signaling information, which is described above with reference to FIG. 16.

The NUM_PLP loop may include fields associated to each PLP of the multiple PLPs included in the transmission frame. And, although it is not shown in the drawing, the number of PLPs may be pre-determined in another field of the L1 signaling information region 503200. Additionally, in the description of the present invention, a field may also be referred to as information, and this may be commonly applied to all exemplary embodiments of the present invention.

The fields included in the NUM_PLP loop shown in FIG. 36 are identical to the fields included in the NUM_PLP loop shown in FIG. 35. However, the NUM_PLP loop shown in FIG. 36 may further include a PLP_PROFILE field. Hereinafter, detailed description of the fields that are identical to the fields described with reference to FIG. 35 will be omitted for simplicity. And, therefore, only the PLP_PROFILE field will be described in detail.

The PLP_PROFILE field has the size of 8 bits and may identify whether the corresponding PLP is a mandatory (or required) PLP or an optional (or selective) PLP. For example, in case the component being transmitted through the PLP is identified (or distinguished) as a base layer or an enhancement layer, the PLP transmitting the base layer becomes the mandatory PLP, and the PLP transmitting the enhancement layer becomes the optional PLP. More specifically, depending upon the receiver characteristic, such as a mobile receiver, an HD receiver, and so on, the receiver may use the PLP_PROFILE field so as to verify by which receiver the component of the broadcast service being transmitted to the current PLP may be used, and depending upon the receiver characteristic, the receiver may determine whether or not to receive the current PLP.

In the description of the present invention, a signaling method for signaling the PLP or for signaling the correlation between the PLP and the service components by using the PLP_ID field, the PLP_GROUP_ID field, the PLP_COMPONENT_TYPE field, and the PLP_PROFILE field.

Hereinafter, the present invention provides a signaling method according to 4 different exemplary embodiments of the present invention. The 4 different exemplary embodiments may be divided into cases when the broadcast signal is being transmitted in a TS format and cases when the broadcast signal is being transmitted in an IP format. In the description of the present invention, the first exemplary embodiment to the third exemplary embodiment correspond to a signaling method wherein the broadcast signal is transmitted in the TS format, and the fourth exemplary embodiment corresponding to a signaling method wherein the broadcast signal is transmitted in the IP format.

Each exemplary embodiment of the present invention will be described in detail as presented below.

The first embodiment of the present invention corresponds to a signaling method enabling the receiver to merge PLPs included in the same PLP group by using the correlation between the PLP group, which is included in the L1 signaling information region, and a service, thereby enabling the receiver to recover a transport stream.

Just as in the first embodiment of the present invention, in addition to enabling the receiver to merge PLPs included in the same PLP group by using the correlation between the PLP group, which is included in the L1 signaling information region, and a service, thereby enabling the receiver to recover a transport stream, the second embodiment of the present invention corresponds to a signaling method also enabling the receiver to selectively receive desired PLPs in accordance with the receiver characteristic, by using the correlation between a component, which configures the service included in the PLP, and a service.

The third embodiment of the present invention is similar to the second embodiment of the present invention. However, the third embodiment of the present invention corresponds to a signaling method enabling information associated with the component, which configures the same service, to be transmitted through a base PLP, and enabling the receiver to selectively receive a PLP, which configures the service desired by the receiver, in the physical layer.

The fourth embodiment of the present invention corresponds to a signaling method respective to a case when the broadcast signal is being transmitted in an IP format. In the signaling method according to the fourth embodiment of the present invention, the receiver may merge the component being transmitted by the PLPs included in the same PLP group, by using a correlation between a service and a PLP, which transmits the components being included in the service, and then the receiver may recover a service.

Hereinafter, each exemplary embodiment of the present invention will be described in detail.

Figure 37:
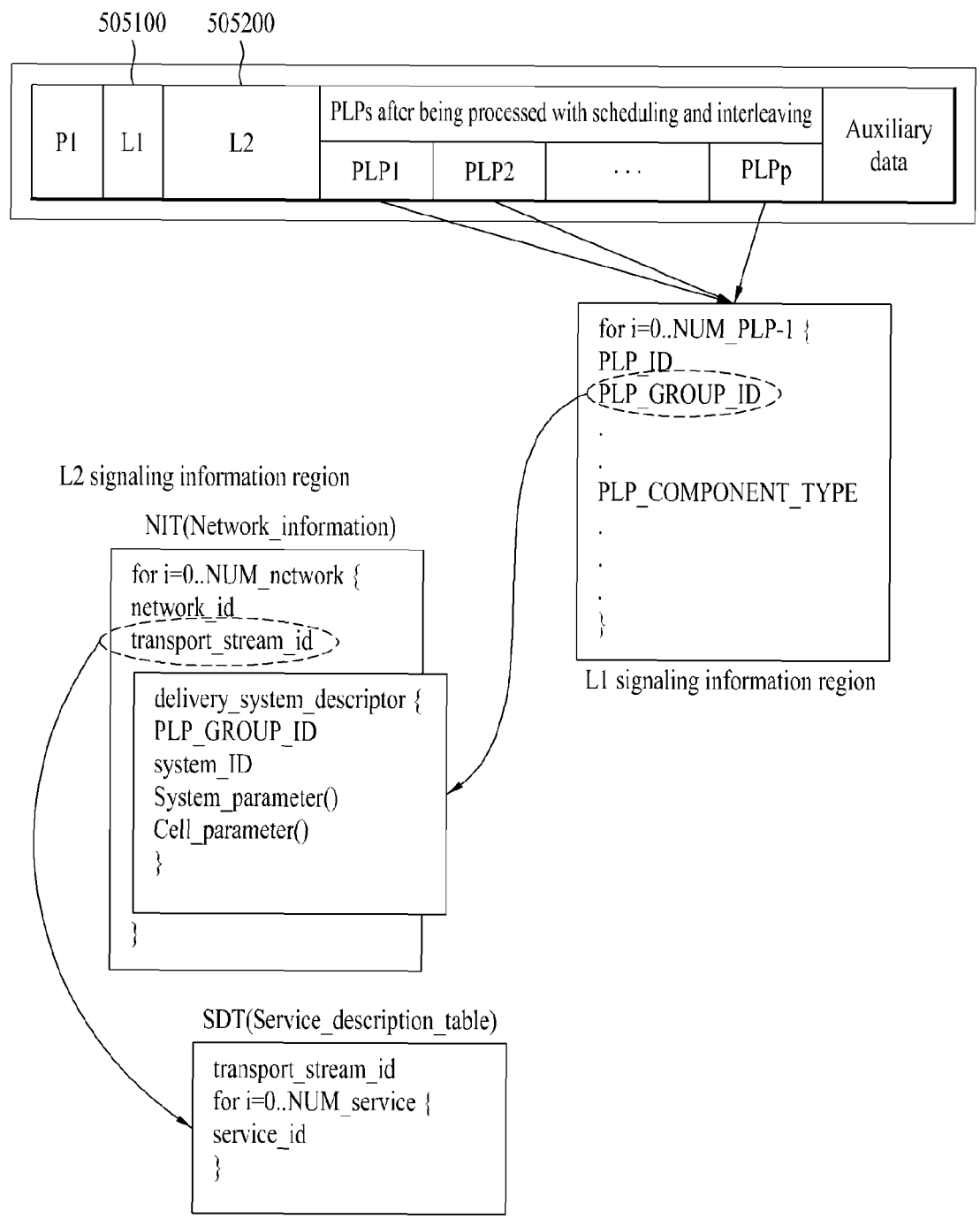
FIG. 37 illustrates a conceptual diagram of a correlation between a service and a PLP group according to a first embodiment of the present invention.
Figure 39:
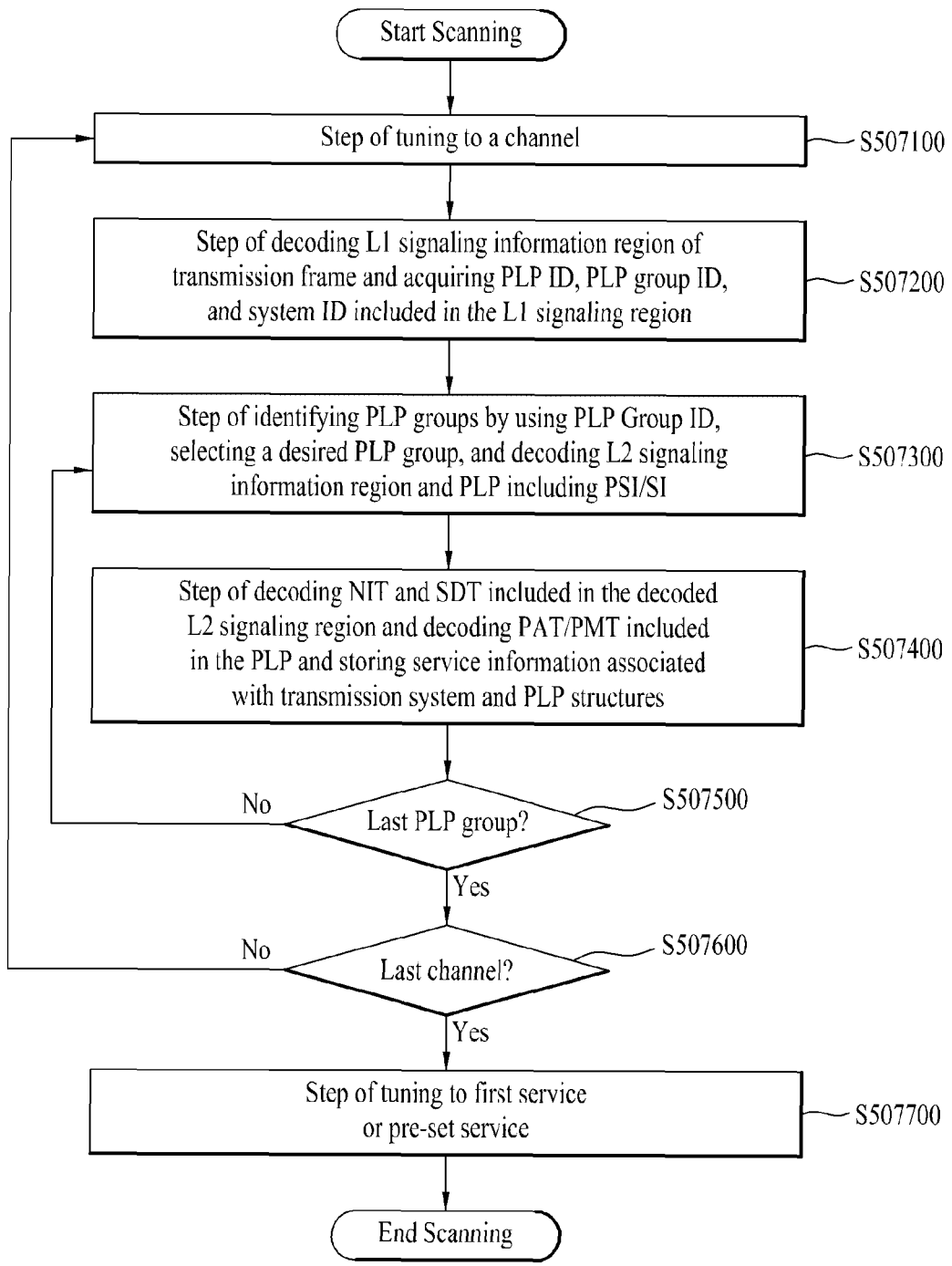
FIG. 39 illustrates a flow chart showing the process steps of a service scanning method of the receiver according to the first embodiment of the present invention.

FIG. 37 to FIG. 39 will hereinafter describe the first embodiment of the present invention.

FIG. 37 illustrates a conceptual view of a correlation between a service according to the first embodiment of the present invention and a PLP group.

In case of transmitting a broadcast signal of a TS format, the first embodiment of the present invention corresponds to a signaling method for recovering a transport stream by acquiring a service ID from the receiver, by using a PLP group ID associated to the acquired service ID, and by merging multiple PLPs being included in the same PLP group.

As shown in FIG. 37, the L1 signaling information region 505100 according to the first embodiment of the present invention may include information related to each of the multiple PLPs, i.e., a PLP_GROUP ID field, a PLP_ID field, and so on. Also, the L2 signaling information region 505200 may include an NIT and an SDT.

The NIT may include a PLP_GROUP_ID field, which is identical to the PLP_GROUP_ID field included in the L1 signaling information region 505100, and a transport_stream_id field. By using these fields, the receiver may be capable of knowing to which PLP group a specific transport stream is correlated. Also, the SDT may include a transport_stream_id field, which is identical to the transport_stream_id included in the NIT, and a service_id field. By using these fields, the receiver may be capable of differentiating (or identifying) each of the services being transmitted through a specific transport stream.

Eventually, among the many services included in a specific transport stream, the receiver may identify the desired service by using the service_id field, which is included in the SDT. And, by using the transport_stream_id field and the PLP_GROUP_ID field, which are included in the NIT, the receiver may identify a PLP group, which is related with the specific transport stream. Thereafter, the receiver may receive a PLP having the same PLP_GROUP_ID field, which is included in the L1 signaling information region 505100. More specifically, the receiver may merge multiple PLPs, which are included in a PLP group being correlated with the desired service, so as to recover a transport stream.

Hereinafter, the fields, the NIT, and the SDT being included in the L1 signaling information region 505100 according to the first embodiment of the present invention will be described in detail.

Since the L1 signaling information region 505100 according to the first embodiment of the present invention includes the same fields, which are described with reference to FIG. 3, the detailed description of the same will be omitted for simplicity.

The NIT corresponds to a table transmitting information related to the physical structure of a multiplexer/transport stream being transmitted through the network, and diverse information respective to the characteristics of the network itself. The receiver may gain information on the transport stream from the NIT.

The NIT according to the first embodiment of the present invention may include a network_id field, a transport_stream_id field, and a delivery_system_descriptor loop.

Hereinafter, each field included in the NIT shown in FIG. 37 will be described in detail.

The network_id field is used for identifying a network through which the current broadcast signal is being transmitted.

The transport_stream_id field is used for identifying a transport stream that is currently being transmitted.

The delivery_system_descriptor field may include fields required (or necessary) for matching the transport stream with the PLP and the transmitting system. Most particularly, the delivery_system_descriptor field according to the present invention may include a PLP_GROUP_ID field that is identical to the PLP_GROUP_ID field included in the L1 signaling information.

Detailed contents of the delivery_system_descriptor field will be described later on.

The delivery_system_descriptor field according to the first embodiment of the present invention may include a PLP ID loop, which is included in the L1 signaling information region 505100. In this case, the PLP ID loop may include diverse fields related to each of the plurality of PLPs included in the transmission frame.

A system_id field is used for identifying a system that is unique to the broadcast network performing transmission.

A system_parameters( ) field may include parameters indicating the transmitting system characteristics, such as whether the communication is performed in a SISO/MIMO mode, a bandwidth, a guard interval, a transmission mode, and so on.

A cell_parameters( ) field may include parameters indicating cell information, such as a center frequency, a cell identifier, and so on.

The SDT corresponds to a table including information on multiple services, which are included in a single transport stream. The SDT according to the first embodiment of the present invention may include a transport_stream_id field, and a NUM_service loop. And, the NUM_service loop may include a service_id field.

Hereinafter, each field included in the SDT shown in FIG. 37 will be described in detail.

Since the transport_stream_id field is identical to the transport_stream_id field, which is included in the NIT, a detailed description of the same will be omitted for simplicity.

The service_id field is used for identifying multiple services included in the transmission frame.

FIG. 38 illustrates an exemplary delivery system descriptor field according to the first embodiment of the present invention.

As described above, FIG. 38 shows a delivery_system_descriptor field of the NIT according to the first embodiment of the present invention. Herein, the delivery_system_descriptor field is used for connecting the PLP_GROUP_ID field of the L1 signaling information region 505100 to the transport stream.

As shown in FIG. 38, the delivery_system_descriptor field may include a descriptor_tag field, a descriptor_length field, a system_id field, a PLP_GROUP_ID field, and a first loop.

The first loop is used when the descriptor_length field has a size larger than 3. And, in this case, the first loop may include a system_parameters( ) field and a second loop.

The second loop may include a cell_parameters( ) field.

Hereinafter, each field will be described in detail.

The descriptor_tag field is used for identifying each descriptor.

The descriptor_length field is used for indicating a total length of the data portion of each descriptor.

The system_id field is used for identifying a system that is unique to the broadcast network performing transmission.

The PLP_GROUP_ID field may identify a PLP group that is to be matched and merged with the transport_stream_id field. Since the essential details of the PLP_GROUP_ID field are identical to those of the PLP_GROUP_ID field shown in FIG. 34, a detailed description of the same will be omitted for simplicity.

Since the system_parameters( ) field included in the first loop and the cell_parameters( ) field included in the second loop are identical to those described in FIG. 37, a detailed description of the same will be omitted for simplicity.

FIG. 39 illustrates a flow chart showing the process steps of a service scanning method of the receiver according to the first embodiment of the present invention.

After receiving a TP type broadcast signal, the receiver may tune to a next channel (S507100). In this case, in order to receive a service desired by the user, the receiver requires information on the service included in the transmission frame, which is being transmitted through the respective channel. Although this process step is not shown in the drawing, this process step may be performed by the tuner of the receiver and may be modified or varied in accordance with the intentions of the system designer.

Then, the receiver may decode the L1 signaling information region 505100 included in the transmission frame, so as to acquire a PLP ID, a PLP Group ID, and a system ID, which are included in the transmission frame (S507200). The system ID may be included in a signaling information region other than the L1 signaling information region 505100. Thereafter, the receiver may identify the PLP groups by using the decoded PLP Group ID, so as to select the desired PLP group, and may decode the PLP including the L2 signaling information region 505200 and the PSI/SI (S507300). This process step may be performed by the BICM decoder 107300 of the broadcast signal receiver according to the present invention. And, more specifically, this process step may be performed by a second decoding block 110200. Respectively, the BICM encoder 101300 of the broadcast signal transmitter according to the present invention may encode the signaling information, so as to generate and transmit L1 signaling information. This is a detail that can be varied or modified by the intentions of the system designer.

The receiver may decode the NIT and the SDT included in the decoded L1 signal information region 505200, and the receiver may also decode a PAT/PMT included in the PLP, thereby being capable of storing service information associated with the transmitting system and the PLP structure (S507400). The service information according to the present invention may include a service ID for identifying a service. This process step may be performed by the BICM decoder 107300 of the broadcast signal receiver according to the present invention. And, more specifically, this process step may be performed by a first decoding block 110100. This is a detail that can be varied or modified by the intentions of the system designer.

Subsequently, the receiver may determine whether or not the currently selected PLP group corresponds to the last PLP group (S507500).

Based upon the determined result, when it is determined that the selected PLP group does not correspond to the last PLP group, the receiver may return to the process step S507300, so as to select the next PLP group. Alternatively, when it is determined that the selected PLP group corresponds to the last PLP group, the receiver may determine whether or not the current channel corresponds to the last channel (S507600).

Then, based upon the determined result, when it is determined that the current channel does not correspond to the last channel, the receiver may return to the process step S507100, so as to tune to the next channel. And, alternatively, when it is determined that the current channel corresponds to the last channel, the receiver may use the stored service information so as to tune to a first service or a pre-set service (S507700).

Figure 40:
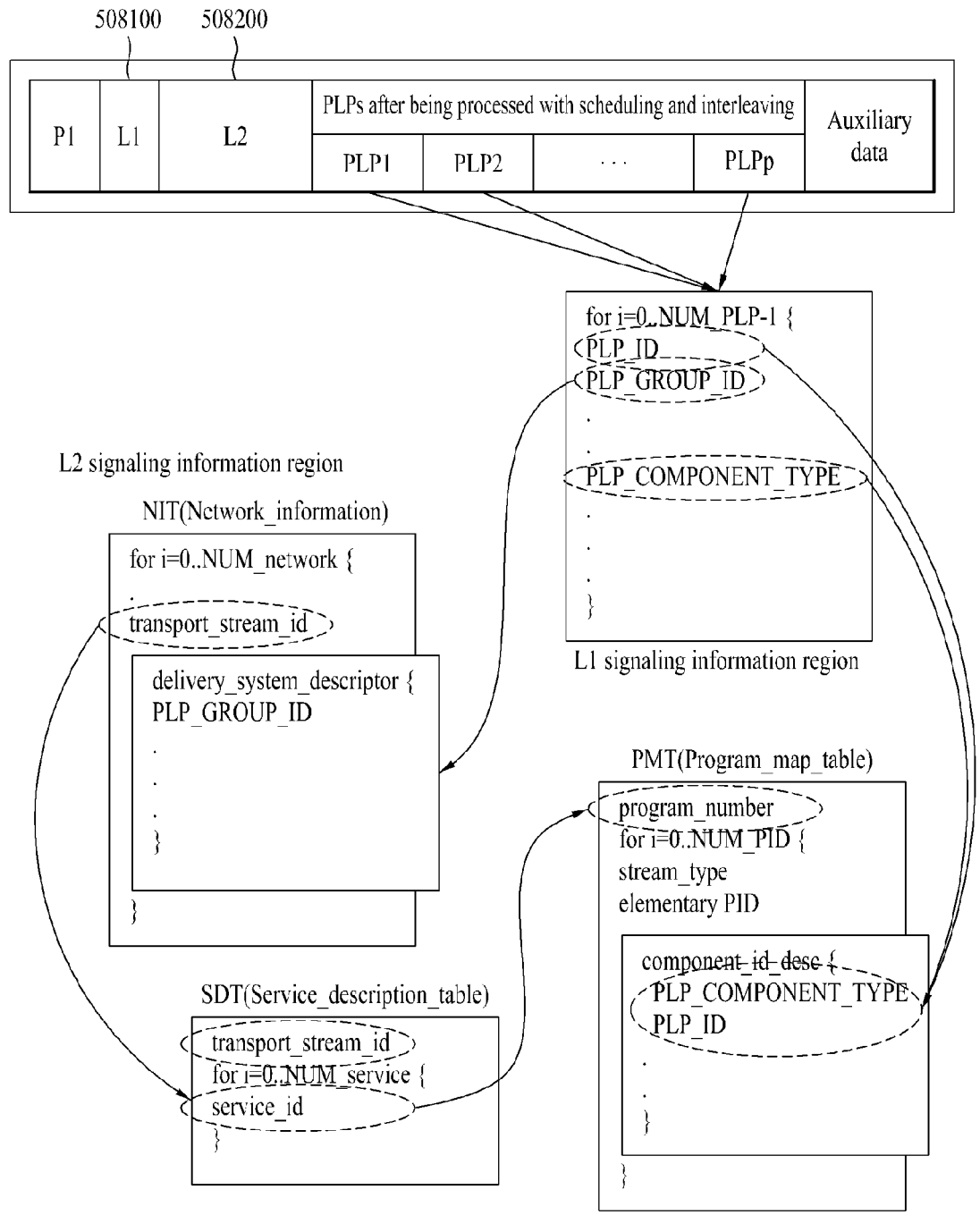
FIG. 40 illustrates a conceptual diagram of a correlation between a service and a PLP group according to a second embodiment of the present invention.
Figure 42:
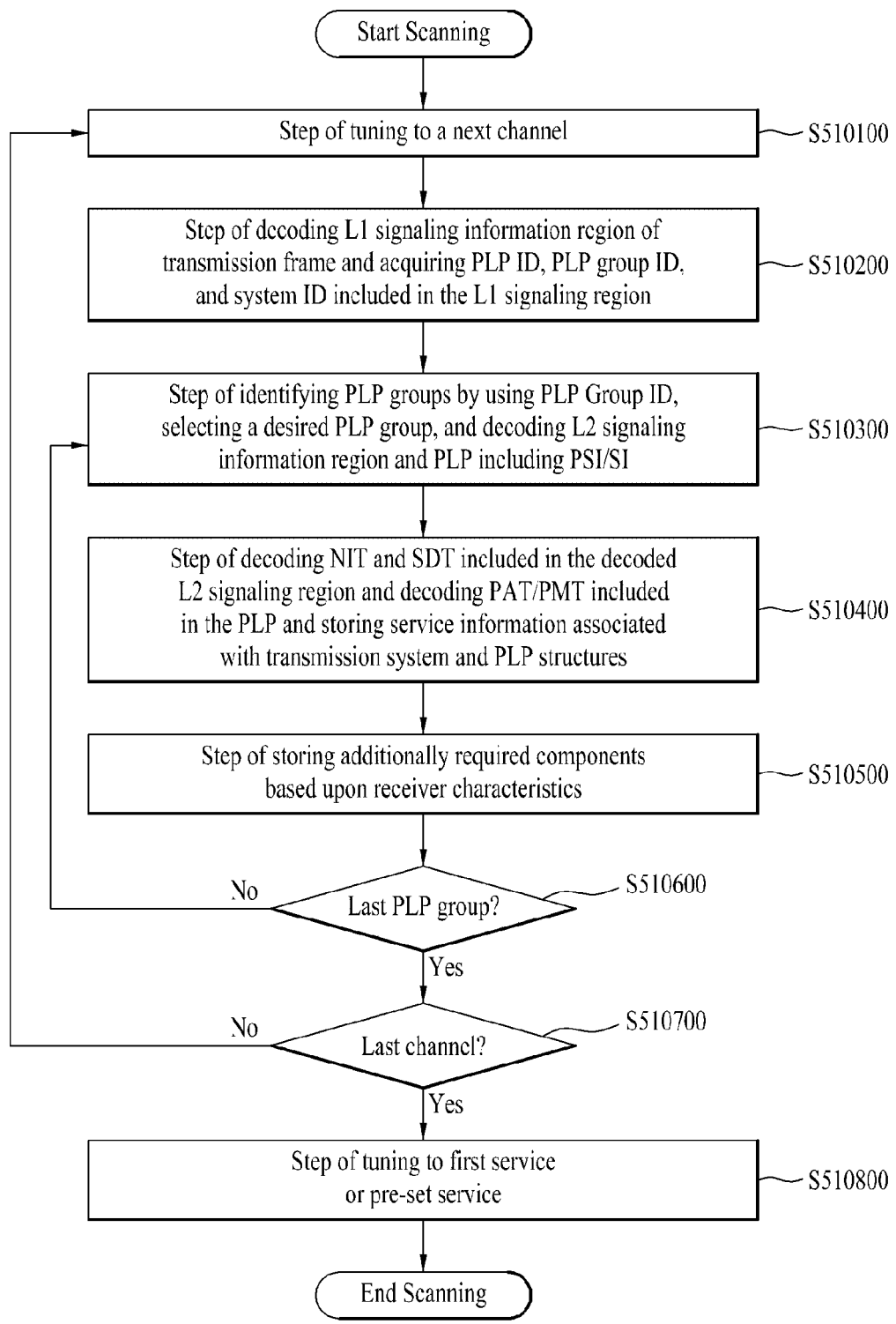
FIG. 42 illustrates a flow chart showing the process steps of a service scanning method of the receiver according to the second embodiment of the present invention.

FIG. 40 to FIG. 42 will hereinafter describe the second embodiment of the present invention.

FIG. 40 illustrates a conceptual view of a correlation between a service according to the second embodiment of the present invention and a PLP group.

The first embodiment of the present invention corresponds to a signaling method using a PLP Group ID and a service ID. And, in this case, the receiver may use a correlation between a service and a PLP group one a service level, so as to recover a service.

However, as shown in FIG. 32, depending upon the characteristics of the receiver, when a video layer is to be selectively received so as to provide a high picture quality image, the signaling method according to the first embodiment of the present invention is disadvantageous in that the information on a video stream, which is included in the PLP, cannot be acquired.

Therefore, according to the second embodiment of the present invention, when receiving a TS format broadcast signal, in addition to the signaling method using the correlation between a service and a PLP group, a signaling method that can determine the type of the current transport stream and that can acquire information related to the components included in each PLP, thereby being capable of selectively receiving the transport stream and the PLP based upon the acquired information.

As shown in FIG. 40, the L1 signaling information region 508100 according to the second embodiment of the present invention may include diverse information related to each of the multiple PLPs, i.e., a PLP_GROUP ID field, a PLP_ID field, a PLP_COMPONENT_TYPE field, and so on. Also, the L2 signaling information region field 508200 may include an NIT and an SDT. Herein, the NIT may include a PLP_GROUP_ID field, which is identical to the PLP_GROUP_ID field included in the L1 signaling information region 508100, and a transport_stream_id field. By using these fields, the receiver may be capable of knowing to which PLP group a specific transport stream is correlated. Also, the SDT may include a transport_stream_id field, which is identical to the transport_stream_id included in the NIT, and a service_id field. By using these fields, the receiver may be capable of differentiating (or identifying) each of the services being transmitted through a specific transport stream. Additionally, since the PMT include a program_number field, which matches with the service_id field included in the SDT, the receiver may use the program_number field so as to verify a program number included in the selected service. Moreover, since the PMT includes a stream type field, a PLP_ID field, and a PLP_COMPONENT field, the receiver may determine the type of the current stream by using the stream type field. And, by using the PLP_COMPONENT field, the receiver may determine the type of the component included in the current PLP, so as to selectively receive the PLP.

Eventually, as described in the first embodiment of the present invention, the receiver may acquire the service_id field from the parsed SDT, so as to be capable of identifying a desired service, among a plurality of services included in a specific transport stream. Then, by using the NIT, the receiver may identify a PLP group, which is related to the specific transport stream. Thereafter, the receiver may receive a PLP having a PLP_GROUP_ID field included in the L1 signaling information region 508100, thereby being capable of recovering a service stream. Additionally, the receiver may also use the component information included in the PLP, so as to selectively receive the PLP and to be capable of providing an image best-fitting the receiver characteristic.

Hereinafter, the fields, the NIT, and the SDT being included in the L1 signaling information region 508100 according to the second embodiment of the present invention will be described in detail.

Since the L1 signaling information region 508100 according to the second embodiment of the present invention includes the same fields, which are included in the L1 signaling information region described with reference to FIG. 35, and since the NIT and the SDT are identical to the NIT and SDT described with reference to FIG. 37, detailed description of the same will be omitted for simplicity. The PMT corresponds to a table including information indicating or identifying the positions of the streams being included in each service.

The PMT according to the second embodiment of the present invention may be transmitted through a PLP, and the transmitting end may process and transmit the PMT as data. Furthermore, the PMT may also include a program_number field, and a PID loop.

Hereinafter, each field included in the PMT shown in FIG. 40 will be described in detail.

A program_number field is used for identifying each program service within the current transport stream. Herein, the program_number field is matched with the service_id field of the SDT. The PID loop may include a stream_type field, an elementary_PID field, and a component_id_descriptor field, which include information related to each of the multiple packets.

A stream_type field is used for identifying the type of the stream through which the program is being transmitted. Examples of the streams types according to the present invention may include an SVC stream, an AVC stream, and so on.

An elementary_PID field is used for identifying a packet of an ES (Elementary Stream).

A component_id_descriptor field may include a PLP_ID field and a PLP_COMPONENT_TYPE field. Herein, since the PLP_ID field and the PLP_COMPONENT_TYPE field are identical to the PLP_ID field and the PLP_COMPONENT_TYPE field, which are included in the L1 signaling information region 508100, a detailed description of the same will be omitted for simplicity.

Therefore, when multiple stream types exist, the receiver may identify a specific stream by using the stream_type field and may select the identified stream. Also, by using the PLP_COMPONENT_TYPE field, the receiver may also determine whether the component being transmitted by the PLP corresponds to a base layer or an enhancement layer, and the receiver may then selectively receive or process the PLP in accordance with the receiver characteristic.

FIG. 41 illustrates an exemplary component ID descriptor field according to the second embodiment of the present invention.

Herein, FIG. 41 corresponds to an exemplary component_id_descriptor field, which is included in the PID loop of the PMT. Herein, the component_id_descriptor field is being used for connecting the PLP_COMPONENT_TYPE field of the L1 signaling information region 508100 to the transport stream.

The component_id_descriptor field may include a descriptor_tag field, a descriptor_length field, a system_id field, a PLP_ID field, and a PLP_COMPONENT_TYPE field. Herein, the PLP_ID field is used for identifying a PLP that matches with a PID sub stream of the corresponding stream type.

Since the contents of each field are identical to those described in FIG. 35 and FIG. 38, detailed description of the same will be omitted for simplicity.

FIG. 42 illustrates a flow chart showing the process steps of a service scanning method of the receiver according to the second embodiment of the present invention.

After receiving a TP type broadcast signal, the receiver may tune to a next channel (S510100). In this case, in order to receive a service wanted (or desired) by the user, the receiver requires information on the service included in the transmission frame, which is being transmitted through the respective channel. Although this process step is not shown in the drawing, this process step may be performed by the tuner of the receiver and may be modified or varied in accordance with the intentions of the system designer.

Then, the receiver may decode the L1 signaling information region 508100 included in the transmission frame, so as to acquire a PLP ID, a PLP Group ID, and a system ID, which are included in the transmission frame (S510200). This process step may be performed by the BICM decoder 107300 of the broadcast signal receiver according to the present invention. And, more specifically, this process step may be performed by a second decoding block 110200. Respectively, the BICM encoder 101300 of the broadcast signal transmitter according to the present invention may encode the signaling information, so as to generate and transmit L1 signaling information. This is a detail that can be varied or modified by the intentions of the system designer.

Thereafter, the receiver may identify the PLP groups by using the decoded PLP Group ID, so as to select the desired PLP group, and may decode the PLP including the L2 signaling information region 508200 and the PSI/SI (S510300). This process step may be performed by the BICM decoder 107300 of the broadcast signal receiver according to the present invention. And, more specifically, this process step may be performed by a first decoding block 110100. Respectively, the BICM encoder 101300 of the broadcast signal transmitter according to the present invention may encode the signaling information, so as to generate and transmit L1 signaling information. This is a detail that can be varied or modified by the intentions of the system designer.

The receiver may decode the NIT and the SDT included in the decoded L1 signal information region 508200, and the receiver may also decode a PAT/PMT included in the PLP, thereby being capable of storing service information associated with information on the structures of the transmitting system and the PLP (S510400). The service information according to the present invention may include a service ID for identifying a service. This process step may be performed by the BICM decoder 107300 of the broadcast signal receiver according to the present invention. And, more specifically, this process step may be performed by a first decoding block 110100. This is a detail that can be varied or modified by the intentions of the system designer.

Additionally, the receiver may use the PLP_COMPONENT_TYPE field included in the decoded PMT, so as to verify the type of the component being transmitted by the current PLP, and then the receiver may store the component that is to be additionally received in accordance with the receiver characteristics (S510500). More specifically, the receiver may use the above-described stream_type and PLP_component_type information, so as to additionally receiver/store a component corresponding to the service, which may be provided in accordance with the receiver characteristic.

Subsequently, the receiver may determine whether or not the currently selected PLP group corresponds to the last PLP group (S510600).

Based upon the determined result, when it is determined that the selected PLP group does not correspond to the last PLP group, the receiver may return to the process step S510300, so as to select the next PLP group. Alternatively, when it is determined that the selected PLP group corresponds to the last PLP group, the receiver may determine whether or not the current channel corresponds to the last channel (S510600).

Then, based upon the determined result, when it is determined that the current channel does not correspond to the last channel, the receiver may return to the process step S510100, so as to tune to the next channel. And, alternatively, when it is determined that the current channel corresponds to the last channel, the receiver may use the stored service information so as to tune to a first service or a pre-set service (S510700).

FIG. 43 to FIG. 47 will hereinafter describe the third embodiment of the present invention.

Figure 43:
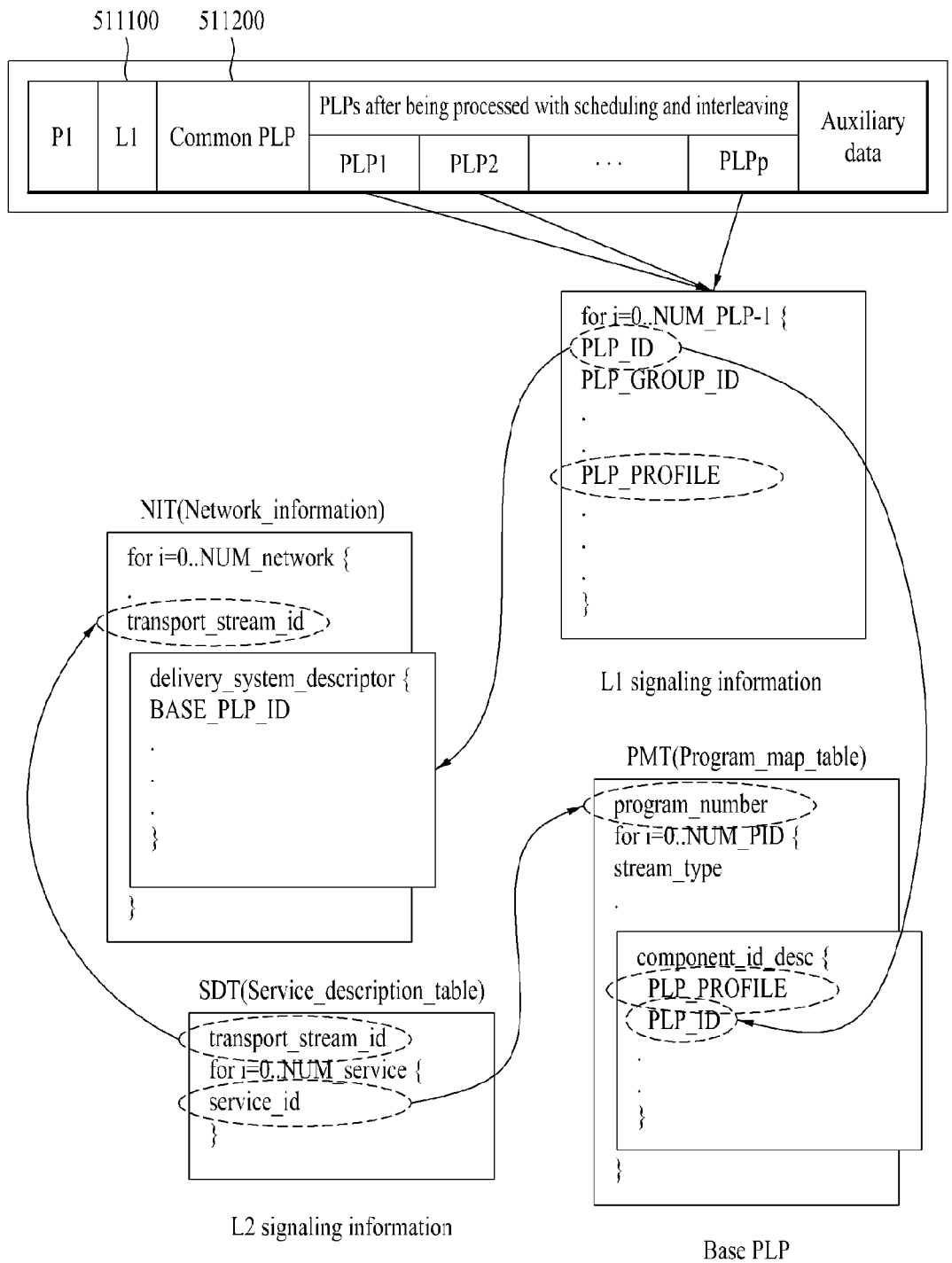
FIG. 43 illustrates a conceptual diagram of a correlation between a service and a PLP according to a third second embodiment of the present invention.

FIG. 43 illustrates a conceptual view of a correlation between a service according to the third embodiment of the present invention and a PLP group.

When a channel is scanned by the receiver according to the second embodiment of the present invention, the receiver may not be capable of scanning (or searching through) the entire PLP, which transmits the components included in a single service. Since the components included in each of the multiple services are transmitted through each PLP, a PLP that does not include PSI/SI may also exist.

Therefore, in the third embodiment of the present invention, PSI/SI, such as the PAT/PMT, may be transmitted to a random PLP included in the multiple PLP regions, so that the entire PLP transmitting the components included in a single service can be scanned (or searched). As described above, in the description of the present invention, the PLP transmitting service configuration information, such as the PAT/PMT, may also be referred to as a base PLP. More specifically, when the receiver decodes the base PLP, information on the remaining component PLPs included in a single service may be acquired. Eventually, according to the third embodiment of the present invention, instead of acquiring signaling information by processing the entire transport stream, by processing the signaling information included in a physical layer, so as to acquire signaling information included in the base PLP, the receiver may acquire signaling information respective to the transport stream.

As shown in FIG. 43, the L1 signaling information region 511100 according to the third embodiment of the present invention may include information respective to each of the multiple PLPs, i.e., a PLP_GROUP ID field, a PLP_ID field, a PLP_COMPONENT_TYPE field, and so on. Additionally, the L2 signaling information region 511200 may include an NIT and an SDT. Herein, the NIT may include a BASE_PLP_ID field, which is matched with the PLP_ID field being included in the L1 signaling information region 511100. And, by using the BASE_PLP_ID field, the receiver may identify a base PLP, which transmits the PMT/PAT. Furthermore, the SDT may include a transport_stream_id field, which is identical to the transport_stream_id included in the NIT, and a service_id field. And, by using the SDT, the receiver may differentiate each of the services being transmitted through a specific transport stream.

Additionally, since the PMT being transmitted through the base PLP include a program_number field, which is matched with the service_id field included in the SDT, by using the program_number field, the receiver may verify the program number included in the selected service. Also, by referring to the stream type field included in the PMT, the receiver may recognize the type of the current stream, and by using the PLP_ID field of the component_id_descriptor included in the PMT, the receiver may determine the correlation between the PLP and the component, thereby being capable of receiving/processing the PLP best-fitting the PLP.

Moreover, by using the PLP_PROFILE field included in the PMT, the receiver may receive a PLP transmitting a specifically distinguished service component, such as a mobile service, high picture quality service, and so on, in accordance with the receiver characteristic. Thus, a transport stream corresponding to the receiver characteristic may be recovered.

Eventually, the receiver may identify and select the base PLP of each transport stream by using the BASE_PLP_ID field, which is included in the NIT, and the receiver may receive a PMT, which is transmitted through the base PLP. Additionally, the receiver may identify and select a wanted (or desired) service by using the service_id field, which is included in the SDT. Moreover, in addition to being capable of selecting all of the PLPs that are included in a component, which is included in a single service, by using the PLP_PROFILE field, the receiver may receive a PLP in accordance with the receiver characteristic.

Hereinafter, the L1 signaling information region L1 511100, the NIT, the SDT, and the PMT according to the third embodiment of the present invention will be described in detail.

Since the L1 signaling information region 511100 according to the third embodiment of the present invention is identical to the L1 signaling information region 503200 shown in FIG. 36, a detailed description of the same will be omitted for simplicity.

The PLP_PROFILE field may identify whether the corresponding PLP is a mandatory (or required) PLP or an optional (or selective) PLP. For example, in case the component being transmitted through the PLP is identified (or distinguished) as a base layer or an enhancement layer, the PLP transmitting the base layer becomes the mandatory PLP, and the PLP transmitting the enhancement layer becomes the optional PLP. More specifically, depending upon the receiver characteristic, such as a mobile receiver, an HD receiver, and so on, the receiver may use the PLP_PROFILE field so as to verify by which receiver the component of the broadcast service being transmitted to the current PLP may be used, and depending upon the receiver characteristic, the receiver may determine whether or not to receive the current PLP.

The NIT according to the third embodiment of the present invention is similar to the NIT according to the second embodiment of the present invention, which is described above with reference to FIG. 40. However, unlike the NIT according to the second embodiment of the present invention, the NIT according to the third embodiment of the present invention may further include a BASE_PLP_ID field.

Herein, the BASE_PLP_ID field is used for identifying the base PLP. And, the base PLP may transmit PSI/SI information of a corresponding transport stream, such as the PMT/PAT. Additionally, the BASE_PLP_ID field may be included in a delivery_system_descriptor loop of the NIT.

The PMT according to the third embodiment of the present invention may include a program_number field and a PID loop. And, the PID loop may include a component_id_descriptor field. Herein, the component_id_descriptor field may include a PLP_PROFILE field and a PLP_ID field.

The contents of the program_number field and the PLP_ID field are identical to those described above with reference to FIG. 35 and FIG. 40. And, since the PLP_PROFILE field is identical to the PLP_PROFILE field included in the L1 signaling information region 511100, a detailed description of the same will be omitted for simplicity.

FIG. 44 illustrates an exemplary delivery system descriptor field according to the third embodiment of the present invention.

As shown in FIG. 44, the delivery_system_descriptor field according to the third embodiment of the present invention is identical to the delivery_system_descriptor field according to the first embodiment of the present invention, which is shown in FIG. 38. However, unlike the delivery_system_descriptor field according to the first embodiment of the present invention, the delivery_system_descriptor field according to the third embodiment of the present invention may further include a BASE_PLP_ID field. Since the description of the BASE_PLP_ID field is identical to that of FIG. 43, a detailed description of the same will be omitted for simplicity.

FIG. 45 illustrates an exemplary component ID descriptor field according to the third embodiment of the present invention.

As shown in FIG. 45, the component_id_descriptor field, which is included in the PID loop of the PMT according to the third embodiment of the present, is identical to the component_id_descriptor field according to the second embodiment of the present invention, which is shown in FIG. 40. However, the component_id_descriptor field according to the third embodiment of the present invention may include a PLP_PROFILE field instead of the PLP_COMPONENT_TYPE field. Herein, since the description of the PLP_PROFILE field is identical to that of FIG. 43, a detailed description of the same will be omitted for simplicity.

Figure 46:
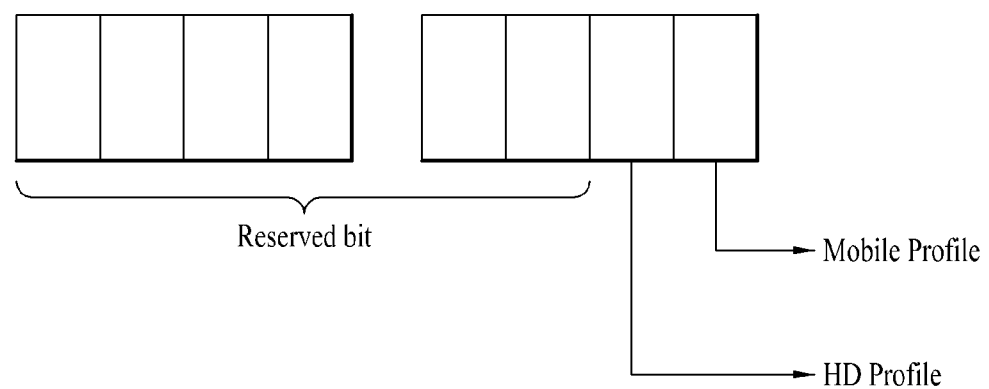
FIG. 46 illustrates an exemplary PLP_PROFILE field according to the third embodiment of the present invention.

FIG. 46 illustrates an exemplary PLP_PROFILE field according to the third embodiment of the present invention.

As shown in FIG. 46, the PLP_PROFILE field may provide information in a bit-unit selector format.

The PLP_PROFILE field may indicate information on a video component in accordance with the field value. For example, when the field value is equal to 0x00, this signifies a common profile and indicates that the video component corresponds to a component that can be received and used by any receiver. When the field value is equal to 0x01, this indicates that the video component corresponds to a component that can be used only by mobile receivers, and when the field value is equal to 0x02, this indicates that the video component corresponds to an HD profile component that can be used only by HD receivers. And, when the field value is equal to 0x03, this indicates that the component can be applied to both mobile receivers and HD receivers.

Figure 47:
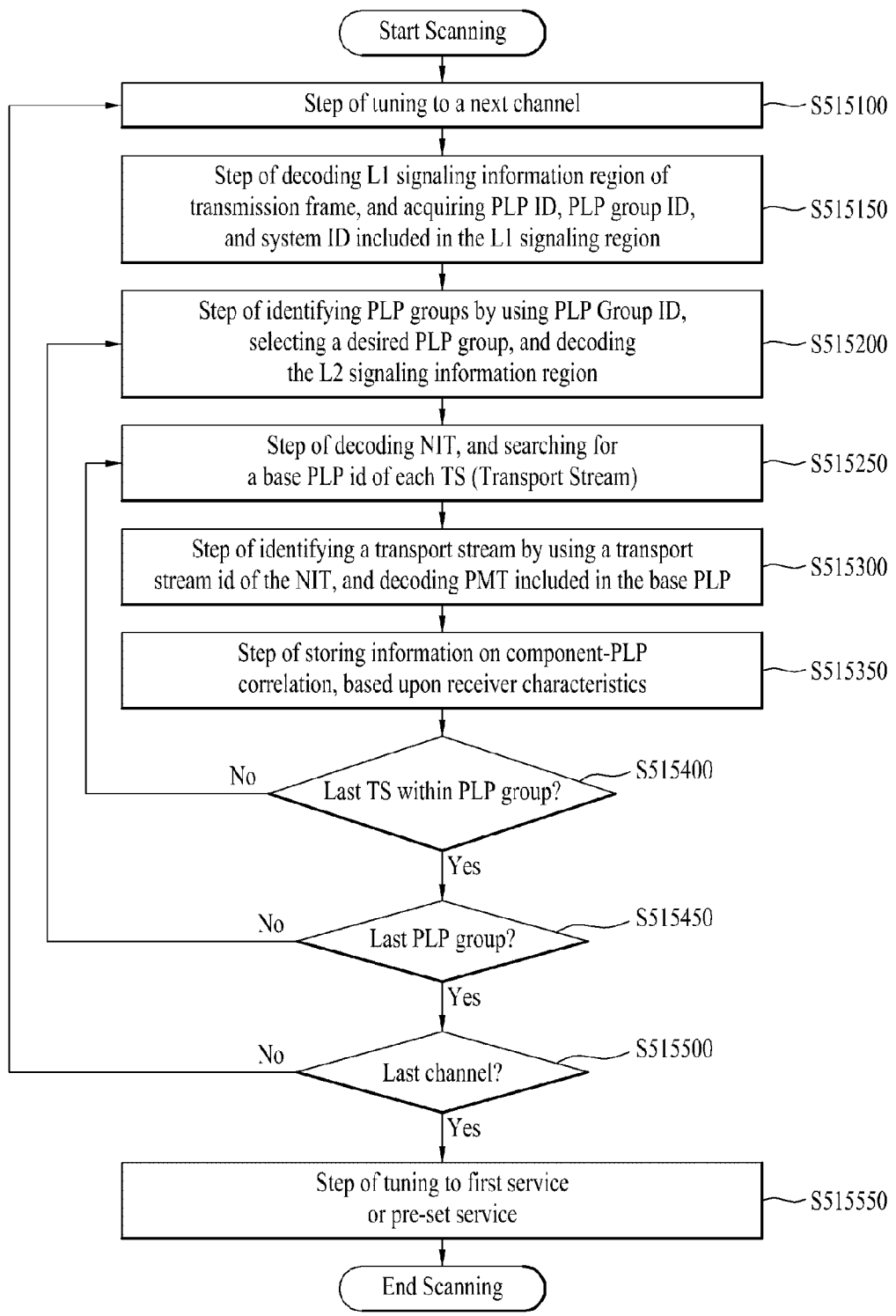
FIG. 47 illustrates a flow chart showing the process steps of a service scanning method of the receiver according to the third embodiment of the present invention.

FIG. 47 illustrates a flow chart showing the process steps of a service scanning method of the receiver according to the third embodiment of the present invention.

After receiving a TP type broadcast signal, the receiver may tune to a next channel (S515100). In this case, in order to receive a service wanted (or desired) by the user, the receiver requires information on the service included in the transmission frame, which is being transmitted through the respective channel. Although this process step is not shown in the drawing, this process step may be performed by the tuner of the receiver and may be modified or varied in accordance with the intentions of the system designer.

Then, the receiver may decode the L1 signaling information region 511100 included in the transmission frame, so as to acquire a PLP ID, a PLP Group ID, and a system ID, which are included in the transmission frame (S515150). This process step may be performed by the BICM decoder 107300 of the broadcast signal receiver according to the present invention. And, more specifically, this process step may be performed by a second decoding block 110200. Respectively, the BICM encoder 101300 of the broadcast signal transmitter according to the present invention may encode the signaling information, so as to generate and transmit L1 signaling information. This is a detail that can be varied or modified by the intentions of the system designer.

Thereafter, the receiver may identify the PLP groups by using the decoded PLP Group ID, so as to select the desired PLP group, and may decode the PLP including the L2 signaling information region 511200. This process step may be performed by the BICM decoder 107300 of the broadcast signal receiver according to the present invention. And, more specifically, this process step may be performed by a first decoding block 110100. Respectively, the BICM encoder 101300 of the broadcast signal transmitter according to the present invention may encode the signaling information, so as to generate and transmit L1 signaling information. This is a detail that can be varied or modified by the intentions of the system designer.

Additionally, the receiver may decode the NIT included in the L2 signaling information region 511200 and may use the BASE_PLP_ID field, which is included in the NIT, so as to locate (or find) the base PLP of each TS (S515250). This process step may be performed by the BICM decoder 107300 of the broadcast signal receiver according to the present invention. And, more specifically, this process step may be performed by a first decoding block 110100. Respectively, the BICM encoder 101300 of the broadcast signal transmitter according to the present invention may encode the signaling information, so as to generate and transmit L1 signaling information. This is a detail that can be varied or modified by the intentions of the system designer.

Subsequently, the receiver may use the transport_stream_id field, which is included in the NIT, so as to identify the transport stream included in the base PLP (S515300). This process step may be performed by the BICM decoder 107300 of the broadcast signal receiver according to the present invention. And, more specifically, this process step may be performed by a first decoding block 110100. Respectively, the BICM encoder 101300 of the broadcast signal transmitter according to the present invention may encode the signaling information, so as to generate and transmit L1 signaling information. This is a detail that can be varied or modified by the intentions of the system designer.

The receiver may use the PLP_PROFILE field, which is included in a component ID descriptor field of the decoded PMT, so as to verify which receiver may use the component of the broadcast service, which is being transmitted to the current PLP in accordance with the receiver characteristic, such as mobile receiver, HD receiver, and so on. Accordingly, by using the PLP_ID field, the receiver may selectively receive the PLP that is requested to be received.

Thereafter, the receiver may store the information related to the correlation between the component and the PLP, based upon the receiver characteristic (S515350). The information related to the correlation between the component and the PLP may include a correlation (or connection) between the PID information of the PMT and the PLP_id field, which is included in the component ID descriptor field.

Subsequently, the receiver may determine whether or not the current TS corresponds to the last TS within the PLP group (S515400).

When it is determined that the current TS does not correspond to the last TS, the receiver may return to the process step S515250, so as to parse the NIT and to acquire the base PLP of each TS by using the BASE_PLP_ID field. Alternatively, when it is determined that the current TS corresponds to the last TS, the receiver may determine whether or not the current PLP group corresponds to the last PLP group (S515450).

When it is determined that the selected PLP group does not correspond to the last PLP group, the receiver may return to the process step S515200, so as to select the next PLP group and to decode a common PLP. Alternatively, when it is determined that the selected PLP group corresponds to the last PLP group, the receiver may determine whether or not the current channel corresponds to the last channel (S515500).

Thereafter, when it is determined that the current channel does not correspond to the last channel, the receiver may return to the process step S515100, so as to tune to the next channel. And, alternatively, when it is determined that the current channel corresponds to the last channel, the receiver may tune to a first service or a pre-set service (S515550).

Figure 48:
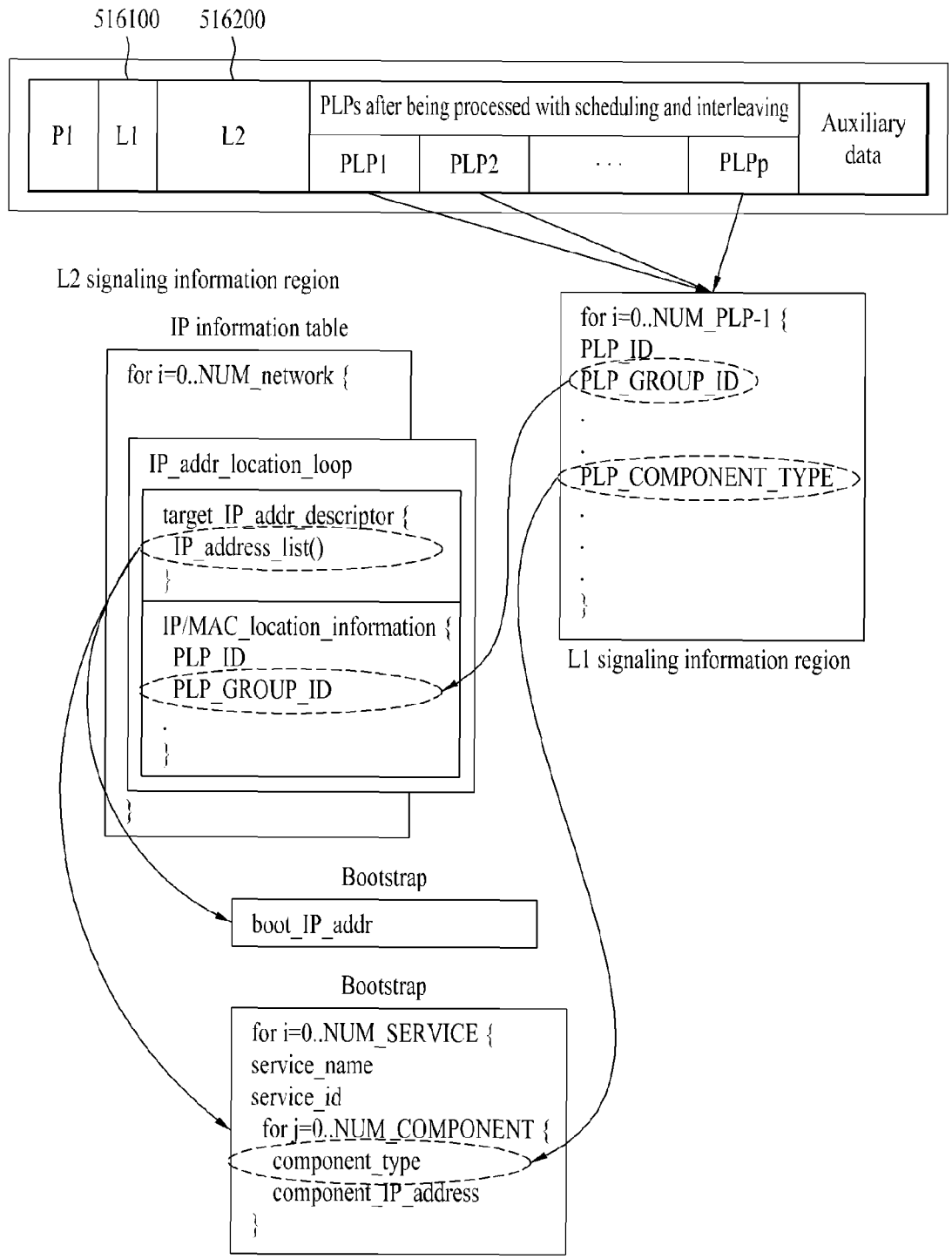
FIG. 48 illustrates a conceptual diagram of a correlation between a service and a PLP according to a fourth second embodiment of the present invention.
Figure 50:
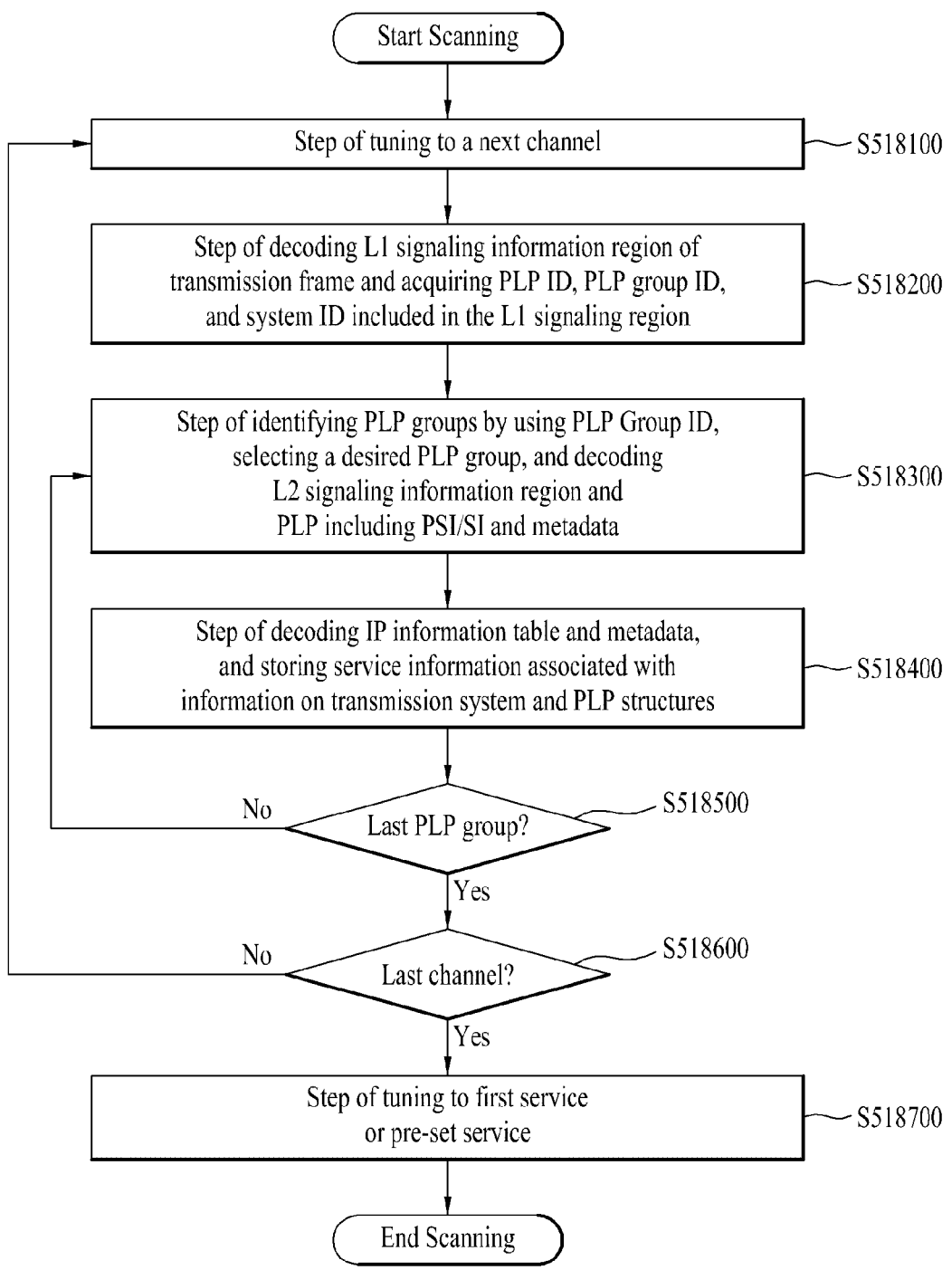
FIG. 50 illustrates a flow chart showing the process steps of a service scanning method of the receiver according to the fourth embodiment of the present invention.

FIG. 48 to FIG. 50 will hereinafter describe the fourth embodiment of the present invention.

FIG. 48 illustrates a conceptual view of a correlation between a service according to the fourth embodiment of the present invention and a PLP group.

In case of transmitting a broadcast signal of a IP format, the fourth embodiment of the present invention corresponds to a signaling method for recovering a transport stream by acquiring a service IP address and information on a component type and information on a component address, which are included in a PLP, and by merging multiple PLPs being included in the same PLP group.

As shown in FIG. 48, the L1 signaling information region 516100 according to the fourth embodiment of the present invention may include information related to each of the multiple PLPs, i.e., a PLP_GROUP ID field, a PLP_ID field, and so on. Also, the L2 signaling information region 516200 may include an IP information table, and the IP information table may include a IP_address_list( ) field and a descriptor. The IP_address_list( ) field may include IP address information for receiving a Bootstrap, and the descriptor may include the same PLP_GROUP_ID field and PLP_ID field that are included in the L1 signaling information region 516100. Since the IP_address_list( ) field and the descriptor form a pair, by using this pair, the receiver may be capable of knowing which PLP group is correlated to a specific IP stream. Thereafter, the receiver may use the IP_address_list( ) field, so as to receive a Bootstrap. Herein, the bootstrap includes a boot_IP_address field. And, by using the boot_IP_address field, the receiver may acquire an IP address that can receiver (or acquire) a service guide information or broadcast content guide information.

Subsequently, by using the received bootstrap, the receiver may receiver service guide information, such as ESG (Electronic Service Guide)/BCG (Broadcast Contents Guide). The service guide information or broadcast contents guide information may be transmitted through an interactive channel and may be received through an IP stream, which is included in a specific PLP. This may vary depending upon the intentions of the system designer. The receiver may use the service_id field, the component_type field, and the component_IP_address field, which are included in the ESG/BCG, so as to receive a desired (or wanted) service and service components.

Eventually, by using the component_IP_address included in the ESG/BCG, or by using the boot_IP_address field of the bootstrap, the receiver may acquire an IP address for each service and service components. And, by using the IP_address_list( ) field and the PLP_GROUP_ID field of the IP information table, the receiver may be capable of knowing which IP stream/packet is correlated to the PLP group. Thereafter, the receiver may merge the service components that are included in a PLP having the same PLP_GROUP_ID field included in the L1 signaling information region 516100, so as to recover a service.

Hereinafter, the L1 signaling information, the IP information table, a bootstrap, and an ESG/BCG will be described in detail.

The L1 signaling information region 503200 according to the fourth embodiment of the present invention may include the same fields included in the L1 signaling information region 503200, which is described in FIG. 35. And, the receiver may use the PLP_COMPONENT_TYPE field so as to determine whether or not the L1 signaling information region 503200 is matched with the component_type field included in the ESG/BCG.

The IP information table according to the fourth embodiment of the present invention corresponds to a table include IP-related information, i.e., information on an IP address and so on. Herein, the receiver may be capable of knowing how the IP is being transmitted from the IP information table through the transport stream.

The IP information data may include an IP_addr_location loop, and the IP_addr_location loop may include a target_IP_add_descriptor field and an IP/MAC_location_information field.

The target_IP_add_descriptor( ) field may include an IP_address_list( ) field, and the IP_address_list( ) field may include information related to the IP address. According to the embodiment of the present invention, the present invention includes an IP address/port field. Depending upon the number of ports, a plurality of the IP address/port fields may be included. The IP/MAC_location_information field may also be referred to as an IP/MAC_location_description field, which may be used for connecting the PLP_COMPONENT_TYPE field included in the L1 signaling information field 516100 to the IP. The IP/MAC_location_information field may include the same PLP_ID field and PLP_GROUP_ID field as the PLP_ID field and the PLP_GROUP_ID field, which are included in the L1 signaling information field.

Hereinafter, each field included in the bootstrap and ESG/BCG shown in FIG. 48 will be described in detail.

Herein, the Bootstrap may include a boot_IP_addr field, and the boot_IP_addr field may identify a booting address of the IP.

The ESG/BCG may include a NUM_SERVICE loop. Herein, the NUM_SERVICE loop may include a respective service_name field, service_id field, and a NUM_COMPONENT loop for each of the multiple services.

The service_name field may be used for indicating the name of each service, and the service_id field may be used for identifying each service.

The NUM_COMPONENT loop corresponds to a loop include information on the multiple components, which are included in a service. Herein, the NUM_COMPONENT loop may include a component_type field and a component_IP_address field.

The component_type field may be used for identifying component types of the service. And, examples of the components according to the present invention may include video components, video extension components, audio components, data components, and so on. Also, the component_type field may be matched with the PLP_COMPONENT_TYPE field, which is included in the L1 signaling information region 516100.

The component_IP_address field may identify the IP address of each component.

FIG. 49 illustrates an exemplary IP/MAC_loc_information field according to the fourth embodiment of the present invention.

As shown in FIG. 49, the IP/MAC_loc_information field according to the fourth embodiment of the present invention may include the same fields as the component_id_descriptor field according to the second embodiment of the present invention, which is described above with reference to FIG. 41. Herein, however, the IP/MAC_loc_information field according to the fourth embodiment of the present invention may include a PLP_GROUP_ID field instead of the PLP_COMPONENT_TYPE field. Since the description of each field is identical to that of FIG. 35 and FIG. 41, detailed description of the same will be omitted for simplicity.

FIG. 50 illustrates a flow chart showing the process steps of a service scanning method of the receiver according to the fourth embodiment of the present invention.

After receiving an IP type broadcast signal, the receiver may tune to a next channel (S518100). In this case, in order to receive a service desired by the user, the receiver requires information on the service included in the transmission frame, which is being transmitted through the respective channel. Although this process step is not shown in the drawing, this process step may be performed by the tuner of the receiver and may be modified or varied in accordance with the intentions of the system designer.

Then, the receiver may decode the L1 signaling information region 516100 included in the transmission frame, so as to acquire a PLP ID and a PLP Group ID, which are included in the transmission frame (S518200). This process step may be performed by the BICM decoder 107300 of the broadcast signal receiver according to the present invention. Respectively, the BICM encoder 101300 of the broadcast signal transmitter according to the present invention may encode the signaling information, so as to generate and transmit L1 signaling information. This is a detail that can be varied or modified by the intentions of the system designer.

Thereafter, the receiver may identify the PLP groups by using the decoded PLP group ID so as to select a desired PLP group, and the receiver may then decode the L2 signaling information region 516200 and the PLP including the PSI/SI and metadata (S518300). This process step may be performed by the BICM decoder 107300 of the broadcast signal receiver according to the present invention.

The receiver may decode the IP information table included in the decoded L2 signaling information region 516200, and the receiver may also decode the metadata included in the PLP (S518400). Additionally, the receiver may acquire service information associated with information on the transmitting system and PLP structures, thereby being capable of storing the acquired service information (S518400). The service information according to the present invention may include a service IP address, a component IP address, and so on. This process step may be performed by the BICM decoder 107300 of the broadcast signal receiver according to the present invention.

Subsequently, the receiver may determine whether or not the currently selected PLP group corresponds to the last PLP group (S518500).

Based upon the determined result, when it is determined that the selected PLP group does not correspond to the last PLP group, the receiver may return to the process step S518300, so as to select the next PLP group. Alternatively, when it is determined that the selected PLP group corresponds to the last PLP group, the receiver may determine whether or not the current channel corresponds to the last channel (S518600).

Then, based upon the determined result, when it is determined that the current channel does not correspond to the last channel, the receiver may return to the process step S518100, so as to tune to the next channel. And, alternatively, when it is determined that the current channel corresponds to the last channel, the receiver may use the stored service information so as to tune to a first service or a pre-set service (S518700).

Figure 51:
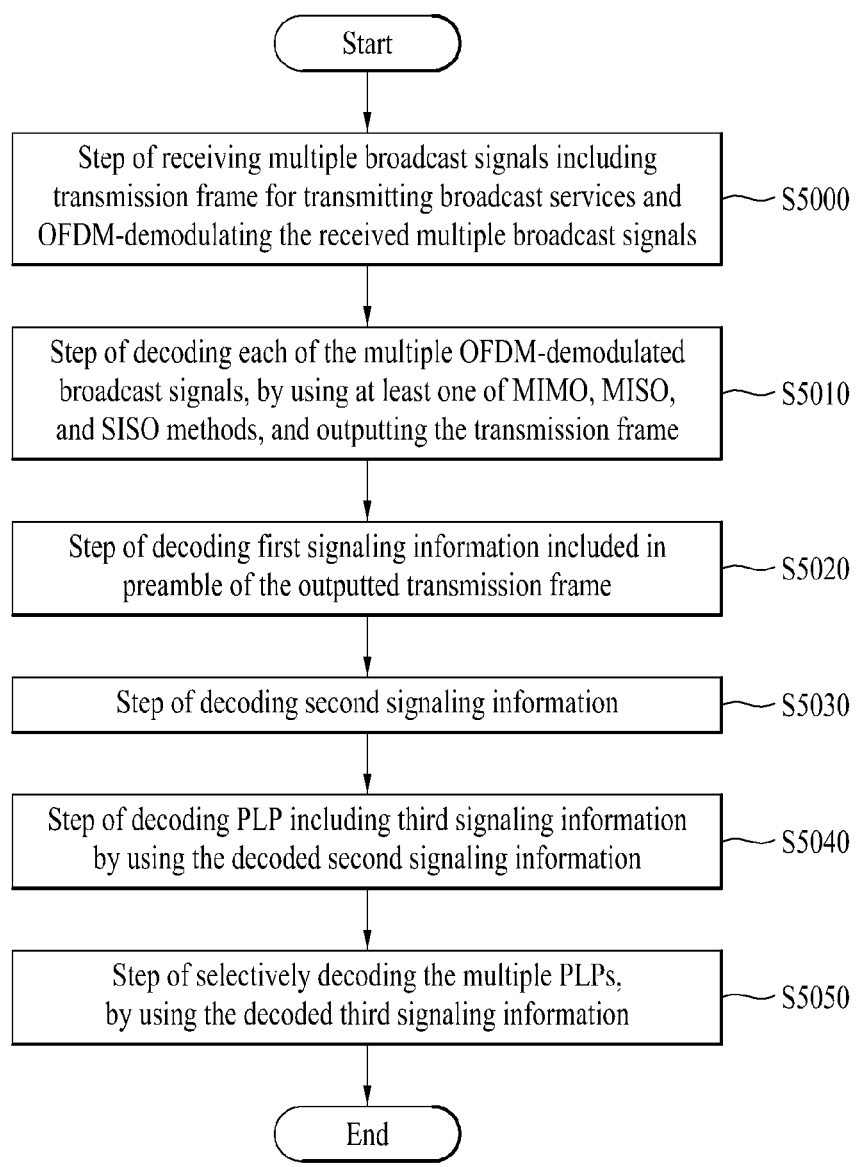
FIG. 51 illustrates a flow chart showing a method of receiving a broadcast signal according to the fourth embodiment of the present invention.

FIG. 51 illustrates a flow chart showing the process steps of a broadcast signal receiving method according to an embodiment of the present invention.

An OFDM demodulator 107100 of the receiver according to the embodiment of the present invention may receive multiple broadcast signals including a transmission frame for transmitting broadcast services and may then perform OFDM demodulation on the received broadcast signals (S5000). In this case, the transmission frame may include a preamble and multiple PLPs including a base layer and an enhancement layer of a broadcast service. Additionally, the preamble may include first signaling information, and the multiple PLPs may include second signaling information and third signaling information. As described above, in the description of the present invention, the P1 signaling information region 503100, the L1 signaling information region 503200, and the common PLP region 503300 may be collectively referred to as a preamble. Furthermore, only the P1 signaling information region 503100 and the L1 signaling information region 503200 may be collectively referred to as the preamble. This may be varied depending upon the intentions of the system designer.

The first signaling information may include L1 signaling information, and the first signaling information may be located after a P1 symbol of the transmission frame. The second signaling information may include L2 signaling information. And, according to the embodiment of the present invention, the second signaling information may include the NIT shown in FIG. 43.

Among the multiple PLPs, the common PLP may include the second signaling information, and the common PLP may be located after the first signaling information of the transmission frame. Moreover, as described above, depending upon the intentions of the system designer, the common PLP may also be included in the preamble.

Furthermore, among the multiple PLPs, one PLP may include third signaling information, and such PLP may be referred to as a base PLP. The second signaling information may include NIT, SDT, and so on, and the third signaling information may include PMT/PAT, and so on.

The first signaling information may include an identifier, e.g., the PLP_ID field shown in FIG. 43, for identifying each of the multiple PLPs. And, the second signaling information may include a descriptor, e.g., the delivery_system_descriptor shown in FIG. 43, which includes an identifier, e.g., the BASE_PLP_ID field shown in FIG. 43, for indicating a PLP including the third signaling information. Herein, the third signaling information may include an identifier, e.g., the PLP_PROFILE field shown in FIG. 43, for identifying which type of data, among the base layer and the enhancement layer of a broadcast service, are included in each of the multiple PLPs.

Afterwards, a MISO decoder 108170 of the broadcast signal receiver according to the embodiment of the present invention may decode each of the OFDM-demodulated broadcast signals by using any one of the MIMO, MISO, and SISO methods, and may then output the transmission frame (S5010).

Subsequently, a second decoding block 110200, which is included in the BICM decoder 107300 of the broadcast signal receiver according to the embodiment of the present invention, may decoder the first signaling information, which is included in the preamble of the outputted transmission frame (S5020).

Thereafter, a first BICM decoding block 110100, which is included in the BICM decoder 107300 of the broadcast signal receiver according to the embodiment of the present invention, may decode the second signaling information (S5030). And, the first BICM decoding block 110100 may use the decoded second signaling information so as to decode the PLP including the third signaling information (S5040). Then, the first BICM decoding block 110100 may use the third signaling information so as to selectively decode the plurality of PLPs (S5050). More specifically, in the method of selectively decoding the plurality of PLPs by using the third signaling information, a specific PLP may be selectively decoded by using an identifier for identifying each of the multiple PLPs and by using an identifier for identifying which type of data, among the base layer and the enhancement layer of a broadcast service, are included in each of the multiple PLPs.

MODE FOR CARRYING OUT THE PRESENT INVENTION

As described above, the present invention is described with respect to the best mode for carrying out the present invention.

INDUSTRIAL APPLICABILITY

As described above, the present invention may be fully (or entirely) or partially applied to digital broadcasting systems.

What is claimed is:

1. A method for transmitting broadcast signals, the method comprising:
generating signaling information;
encoding broadcast data, the generated signaling information;
generating a signal frame having a preamble and a plurality of Physical Layer Pipes (PLPs) including the encoded broadcast data, the encoded signaling information,
wherein the preamble includes PLP ID information identifying each PLP and a PLP includes at least one service component;
modulating data in the generated signal frame by an OFDM scheme; and
transmitting the broadcast signals including the modulated data,
wherein service component information include service ID identifying a service and address information for at least one service component belong to the service,
wherein the broadcast signals include a first symbol and a second symbol at a beginning of the modulated data,
wherein the first symbol includes a suffix in a time domain which is obtained from a part of the first symbol based on a frequency shifting method, and
wherein the second symbol includes a prefix in the time domain which is obtained from a part of the second symbol based on a frequency shifting method,
wherein a first PLP among the plurality of PLPs carries service signaling data describing the service and a second PLP among the plurality of PLPs which is different from the first PLP and which carries a mapping table that include a PLP identifier, and
wherein the mapping table carries information for mapping between a PLP corresponding to the PLP identifier and components of the service described in the service signaling data carried in the first PLP.

2. The method of claim 1, wherein the service component information is transmitted in the broadcast signals or different path from the broadcast signals.

3. The method of claim 1, wherein the service component information further include information indicating a type of each component.

4. An apparatus for transmitting broadcast signals, the apparatus comprising:
a generator to generate first signaling information;
an encoder to encode broadcast data, the generated signaling information;
a frame builder to generate a signal frame having a preamble and a plurality of Physical Layer Pipes (PLPs) including the encoded broadcast data, the encoded signaling information,
wherein the preamble includes PLP ID information identifying each PLP and a PLP includes at least one service component;
a modulator to modulate data in the generated signal frame by an OFDM scheme; and
a transmitter to transmit the broadcast signals including the generated signal frame, wherein service component information include service ID identifying a service and address information for at least one service component belong to the service,
wherein the broadcast signals include a first symbol and a second symbol at a beginning of the modulated data,
wherein the first symbol includes a suffix in a time domain which is obtained from a part of the first symbol based on a frequency shifting method, and
wherein the second symbol includes a prefix in the time domain which is obtained from a part of the second symbol based on a frequency shifting method, and
wherein a first PLP among the plurality of PLPs carries service signaling data describing the service and a second PLP among the plurality of PLPs which is different from the first PLP and which carries a mapping table that include a PLP identifier, and
wherein the mapping table carries information for mapping between a PLP corresponding to the PLP identifier and components of the service described in the service signaling data carried in the first PLP.

5. The apparatus of claim 4, wherein the service component information is transmitted in the broadcast signals or different path from the broadcast signals.

6. The apparatus of claim 4, wherein the service component information further include information indicating a type of each component.

7. A method for receiving broadcast signals, the method comprising:

receiving at least one broadcast signal,
wherein the broadcast signal includes a first symbol and a second symbol at a beginning of the modulated data,
wherein the first symbol includes a suffix in a time domain which is obtained from a part of the first symbol based on a frequency shifting method, and
wherein the second symbol includes a prefix in the time domain which is obtained from a part of the second symbol based on a frequency shifting method;
demodulating the received at least one broadcast signal by an OFDM scheme;
parsing a signal frame from the demodulated at least one broadcast signal, wherein the signal frame includes a preamble and Physical Layer Pipes (PLPs), and
wherein the preamble includes PLP ID information identifying each PLP and wherein the PLPs include signaling information and broadcast data, wherein a PLP includes at least one service component, and
wherein a first PLP among the plurality of PLPs carries service signaling data describing the service and a second PLP among the plurality of PLPs which is different from the first PLP and which carries a mapping table that include a PLP identifier, and
wherein the mapping table carries information for mapping between a PLP corresponding to the PLP identifier and components of the service described in the service signaling data carried in the first PLP;
decoding data in the parsed signal frame, wherein service component information include service ID identifying a service and address information for at least one service component belongs to the service.

8. The method of claim 7, wherein the service component information is received in the broadcast signals or different path from the broadcast signals.

9. The method of claim 7, wherein the service component information further include information indicating a type of each component.

10. An apparatus for receiving broadcast signals, the apparatus comprising:

a receiver to receive at least one broadcast signal, wherein the broadcast signal includes a first symbol and a second symbol at a beginning of the modulated data,
wherein the first symbol includes a suffix in a time domain which is obtained from a part of the first symbol based on a frequency shifting method, and
wherein the second symbol includes a prefix in the time domain which is obtained from a part of the second symbol based on a frequency shifting method;
a demodulator to demodulate the received at least one broadcast signal by an OFDM scheme;
a frame parser to parse a signal frame from the demodulated at least one broadcast signal, wherein the signal frame includes a preamble and Physical Layer Pipes (PLPs), and
wherein the preamble includes PLP ID information identifying each PLP and wherein the PLPs include signaling information and broadcast data, wherein a PLP includes at least one service component, and
wherein a first PLP among the plurality of PLPs carries service signaling data describing the service and a second PLP among the plurality of PLPs which is different from the first PLP and which carries a mapping table that include a PLP identifier, and
wherein the mapping table carries information for mapping between a PLP corresponding to the PLP identifier and components of the service described in the service signaling data carried in the first PLP;
a decoder to decode data in the parsed signal frame, wherein service component information include service ID identifying a service and address information for at least one service component belongs to the service.

11. The apparatus of claim 10, wherein the service component information is received in the broadcast signals or different path from the broadcast signals.

12. The apparatus of claim 10, wherein the service component information further include information indicating a type of each component.

* * * * *